United States Patent
Matsuda et al.

(10) Patent No.: US 7,498,387 B2
(45) Date of Patent: Mar. 3, 2009

(54) MODIFIED POLYMERS AND COMPOSITIONS CONTAINING THE SAME

(75) Inventors: Takaaki Matsuda, Fujisawa (JP); Shigeki Takayama, Tokyo (JP); Toshinori Shiraki, Yamato (JP); Shigeo Nakajima, Fujisawa (JP); Yasuhiro Kusanose, Yokosuka (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 509 days.

(21) Appl. No.: 10/510,571

(22) PCT Filed: Apr. 10, 2003

(86) PCT No.: PCT/JP03/04561

§ 371 (c)(1), (2), (4) Date: Oct. 8, 2004

(87) PCT Pub. No.: WO03/085010

PCT Pub. Date: Oct. 16, 2003

(65) Prior Publication Data

US 2005/0171276 A1    Aug. 4, 2005

(30) Foreign Application Priority Data

| Apr. 10, 2002 | (JP) | ............................. 2002-107407 |
| Apr. 10, 2002 | (JP) | ............................. 2002-107408 |
| Apr. 30, 2002 | (JP) | ............................. 2002-128152 |
| Apr. 30, 2002 | (JP) | ............................. 2002-128153 |

(51) Int. Cl.
C08C 19/02 (2006.01)
C08C 19/22 (2006.01)
C08C 19/25 (2006.01)
C08C 19/28 (2006.01)
C08C 19/30 (2006.01)
C08L 95/00 (2006.01)
C08F 36/04 (2006.01)

(52) U.S. Cl. ............... 525/331.9; 525/332.5; 525/332.7; 525/332.9; 525/333.2; 525/342; 525/374; 525/379; 525/384; 525/385; 524/59; 524/572

(58) Field of Classification Search ............... 525/331.9, 525/332.5, 332.7, 332.9, 333.2, 342, 374, 525/379, 384, 385; 524/59, 572
See application file for complete search history.

(56) References Cited

U.S. PATENT DOCUMENTS

| 4,972,023 | A | 11/1990 | Bronstert |
| 5,804,644 | A | 9/1998 | Nakafutami et al. |
| 6,559,241 | B2 * | 5/2003 | Iwasaki et al. ............... 525/338 |
| 2003/0100683 | A1 * | 5/2003 | Toyoizumi et al. ....... 525/331.9 |

FOREIGN PATENT DOCUMENTS

| JP | 63-041547 | 2/1988 |
| JP | 07-196728 | 8/1995 |
| JP | 09-316286 | 12/1997 |
| WO | WO95/12645 | 5/1995 |
| WO | WO 96/11241 | 4/1996 |

* cited by examiner

Primary Examiner—Roberto Rábago
(74) Attorney, Agent, or Firm—Finnegan, Henderson, Farabow, Garrett & Dunner, L.L.P.

(57) ABSTRACT

A first-order modified, hydrogenated polymer comprising (1) a hydrogenated polymer obtained by hydrogenating at least one unhydrogenated polymer selected from the group consisting of a polymer comprising conjugated diene monomer units and a copolymer comprising conjugated diene monomer units and vinyl aromatic hydrocarbon monomer units, and (2) a functional group-containing first-order modifier group bonded to the hydrogenated polymer (1), wherein the content of the vinyl aromatic hydrocarbon monomer units, vinyl aromatic hydrocarbon block ratio, weight average molecular weight, and hydrogenation ratio (as measured with respect to the double bonds in the conjugated diene monomer units) of the first-order modified, hydrogenated polymer are, respectively, within specific ranges. A second-order modified polymer obtained by reacting a second-order modifier with a first-order modified polymer comprising (β) a base polymer and (γ) a functional group-containing first-order modifier group bonded to the base polymer (β). A composition comprising the above-mentioned first-order modified, hydrogenated polymer or second-order modified polymer and at least one functional component other than the modified polymer.

16 Claims, No Drawings

MODIFIED POLYMERS AND COMPOSITIONS CONTAINING THE SAME

BACKGROUND OF THE INVENTION

1. Field of the Invention

The present invention relates to a modified polymer and a composition containing the same. More particularly, the present invention is concerned with a first-order modified, hydrogenated polymer comprising (1) a hydrogenated polymer obtained by hydrogenating at least one unhydrogenated polymer selected from the group consisting of a polymer comprising conjugated diene monomer units and a copolymer comprising conjugated diene monomer units and vinyl aromatic hydrocarbon monomer units, and (2) a functional group-containing first-order modifier group bonded to the hydrogenated polymer (1), wherein the content of the vinyl aromatic hydrocarbon monomer units, vinyl aromatic hydrocarbon block ratio, weight average molecular weight, and hydrogenation ratio (as measured with respect to the double bonds in the conjugated diene monomer units) of the first-order modified, hydrogenated polymer are, respectively, within specific ranges. Further, the present invention is concerned with a second-order modified polymer obtained by reacting a second-order modifier with a first-order modified polymer comprising (β) a base polymer and (γ) a functional group-containing first-order modifier group bonded to the base polymer (β). Furthermore, the present invention is concerned with a composition comprising the above-mentioned first-order modified polymer or second-order modified polymer and at least one component selected from various conventional additives (such as inorganic fillers (e.g., silica), polymers other than the above-mentioned modified polymers of the present invention, tackifiers and asphalts). The modified polymer of the present invention exhibits strong interaction with other various components, and by virtue of such property, the modified polymer of the present invention can be advantageously used for producing compositions, such as a filler-containing modified polymer composition, a modified polymer composition comprising a thermoplastic resin and/or a rubbery polymer, an adhesive composition, an asphalt composition and a styrene resin composition, which have excellent properties. Furthermore, the present invention is concerned with a precursor composition for use as a precursor of a second-order modified polymer composition, wherein the precursor composition comprises a first-order modified polymer comprising a base polymer (β) and a functional group-containing first-order modifier group (γ) bonded to the base polymer (γ), and further comprises a second-order modifier and at least one additional component selected from the group consisting of the above-mentioned additives.

2. Prior Art

As a method for producing a polymer having a functional group, Unexamined Japanese Patent Application Laid-Open Specification No. Sho 59-98106 (corresponding to U.S. Pat. No. 4,465,809) discloses a method for producing a carboxyl group-containing polymer, in which a polymer-alkali metal composition is contacted with an epoxy compound, and the resultant product is directly contacted with a cyclic acid anhydride, thereby obtaining a carboxyl group-containing polymer. However, such carboxyl group-containing polymer (which has a terminal epoxy compound residue having bonded thereto a cyclic acid anhydride residue) has poor affinity to a thermo-plastic resin and/or a rubbery polymer, an inorganic filler, a polar group-containing additive and the like.

Unexamined Japanese Patent Application Laid-Open Specification No. Sho 63-238107 (corresponding to U.S. Pat. No. 4,972,023) discloses a polymer which is modified with a terminal acid group (or a salt thereof) which is bonded to the polymer through an acid amido group, and discloses a method for producing the modified polymer as well as applications of the modified polymer. This modified polymer is obtained by a method in which the modification is performed using 1,5-diaza-bicylo[3.1.0]-hexane and a derivative thereof and a Schiff base derived from an aliphatic or aromatic amine and aldehyde. The modified polymer (which is modified with a terminal acid group (or a salt thereof) which is bonded to the polymer through an acid amido group) has poor affinity to a thermoplastic resin and/or a rubbery polymer, an inorganic filler, a polar group-containing additive and the like.

Further, Unexamined Japanese Patent Application Laid-Open Specification Nos. Hei 7-196728 and Hei 9-143224 discloses a modified hydrogenated polymer which is obtained by introducing a primary amino group or a secondary amino group into the terminals of a hydrogenated polymer. However, such modified polymer (which is modified with a terminal amino group) has poor affinity to a thermoplastic resin and/or a rubbery polymer, an inorganic filler, a polar group-containing additive and the like.

In recent years, in the field of a tire tread rubber composition, a technique of using silica as a substitute for carbon black has been attracting much attention. However, this technique is accompanied by problems. For example, silica has poor affinity to a rubber as compared to that of conventional carbon black and, thus, the dispersibility of silica in a rubber is not always satisfactory. Such poor dispersibility of silica is likely to cause problems, such as unsatisfactory abrasion resistance and strength characteristics for a tire tread. For improving the dispersibility of silica in a rubber, it is necessary to add a silane coupling agent (typically bis(triethoxypropyl)tetrasulfide) to a composition of rubber and silica and mix the composition under specific temperature conditions, wherein the number of the mixing operations is increased.

In this situation, for improving the dispersibility of silica in a rubber, a method for modifying a rubber with various terminal alkoxysilyl groups, and a silica-containing rubber composition comprising the modified rubber have been proposed in Unexamined Japanese Patent Application Laid-Open Specification No. Sho 62-227908, Unexamined Japanese Patent Application Laid-Open Specification No. Hei 8-53513 (corresponding to U.S. Pat. No. 5,665,812) and Unexamined Japanese Patent Application Laid-Open Specification No. Hei 8-53576 (corresponding to U.S. Pat. No. 6,204,322).

Further, a silica-containing composition comprising an epoxidized polymer is proposed in Unexamined Japanese Patent Application Laid-Open Specification No. Hei 9-118785 (corresponding to EP763564). In addition, Unexamined Japanese Patent Application Laid-Open Specification No. Hei 7-330959 discloses a tire tread composition comprising an SBR (styrene-butadiene rubber) having a specific molecular structure, wherein the SBR has been modified by coupling a multifunctional compound having a diglicidylamino group. This tire tread composition was proposed in an attempt to provide a tire tread composition having increased processability, reduced rolling resistance and improved wet skid resistance.

The rubber material used in the above-mentioned rubber compositions has many unsaturated double bonds in the polymer chain thereof and, therefore, exhibits poor heat resistance and weatherability. As a conjugated diene polymer having excellent heat resistance and weatherability, Unexamined Japanese Patent Application Laid-Open Specification No. Sho 63-41547 discloses a hydrogenated polymer which is modified with a specific functional group. This patent document also discloses a method for improving the properties of a carbon-containing composition, in which a functional group (such as an amino group) which interacts with carbon is addition-bonded to a hydrogenated polymer. Further, WO96/05250 (corresponding to U.S. Pat. No. 5,804,644) discloses a silica-containing rubber composition comprising a hydrogenated rubber. However, the technique disclosed in this patent document is aimed at a rubber composition containing a rubber having low hydrogenation ratio which is suitable for producing tires. Therefore, the improvements in the heat resistance and weatherability of the rubber composition are unsatisfactory for use in fields other than tire production.

Unexamined Japanese Patent Application Laid-Open Specification No. Hei 2-60948 discloses a rubber composition having excellent heat resistance and weather-ability. Further, each of Unexamined Japanese Patent Application Laid-Open Specification Nos. Sho 62-283105 and Sho 63-41547 and Unexamined Japanese Patent Application Laid-Open Specification No. Hei 3-74409 (corresponding to U.S. Pat. No. 5,216,074) discloses a hydrogenated modified polymer. The dispersibiltiy and reinforcing effect of silica which are imparted by the techniques disclosed in the above-mentioned patent documents are unsatisfactory and, moreover, the composition and polymer exhibit only poor properties with respect to processability, low heat build-up and abrasion resistance.

In the fields of sheets, films and other shaped articles which are produced from polymeric materials, there have been made a number of proposals in which there is used a polymer composition or laminate comprising a plurality of types of polymeric materials in order to obtain advantages in that a satisfactory strength is imparted to the sheets, films or the like, or the processability of the sheets, films or the like is improved, or the production cost of the sheets, films or the like is reduced. However, when producing a polymer composition by mixing different polymeric materials together, the number of combinations of different polymeric materials which exhibit good compatibility with each other, is limited. In the case of a polymer composition comprising different polymeric materials which exhibit poor compatibility with each other, a problem is likely to arise in that, due to the poor compatibility, the composition becomes non-homogeneous, and a delamination occurs between layers of different polymeric materials, thus rendering it impossible to obtain a satisfactory improving effect aimed at by using a combination of different polymeric materials.

It is well known that, as a component for improving the miscibility of polymeric materials, there is used a polymeric material having a functional group. For example, Unexamined Japanese Patent Application Laid-Open Specification No. Hei 2-60948 discloses a composition comprising a modified hydrogenated diene polymer having a functional group and a flexible elastomer, wherein the modified hydrogenated diene polymer is obtained by an addition reaction between a functional group-containing unsaturated compound and a hydrogenated diene polymer in the presence of a radical initiator. Further, Unexamined Japanese Patent Application Laid-Open Specification No. Hei 3-74409 (corresponding to U.S. Pat. No. 5,216,074) discloses a thermoplastic polymer composition comprising a modified hydrogenated block polymer having a functional group and a thermoplastic resin and/or a rubbery polymer, wherein the modified hydrogenated block polymer is obtained by an addition reaction between a functional group-containing unsaturated compound and a hydrogenated block polymer in the presence of a radical initiator.

An asphalt composition is used in wide variety of fields, such as a material for road paving, a water-proof sheet, a noise insulation sheet and a roofing sheet. In these fields, many attempts have been made to improve the properties of an asphalt by adding various polymers to the asphalt.

However, in recent years, due to the expansion of traffic and the increase in the number of expressways, there is a demand for an asphalt composition which can form a road pavement layer having excellent strength and abrasion resistance. Further, there is a growing demand for an asphalt composition which can form a road pavement layer having not only excellent strength and abrasion resistance, but also high open graded (void fraction) for improving drainage and noise reduction properties of expressways.

Recently, from the viewpoint of preventing environmental pollution and maintaining labor environment, the use of a hot-melt adhesive is expanding. However, the balance between retention and adhesion of the conventional hot-melt adhesive is unsatisfactory. For improving the properties of a hot-melt adhesive, each of Unexamined Japanese Patent Application Laid-Open Specification Nos. Sho 64-81877 and 61-278578 and "Sechaku (Adhesion)" Vol.32, No.1, page 27 (published in 1988) discloses an adhesive composition comprising a triblock copolymer and a diblock copolymer. However, the improvements achieved by the techniques disclosed in these patent documents were unsatisfactory.

A polystyrene having not only excellent stiffness, transparency and luster, but also good processability, is used in various fields. However, a polystyrene has a major defect, namely poor impact resistance. For alleviating this defect, various non-vulcanized rubbers are used as an impact-modifier for a styrene resin composition. Among the known styrene resin compositions containing a non-vulcanized rubber, a styrene resin composition obtained by subjecting a styrene monomer to radical polymerization in the presence of a non-vulcanized rubber, which composition comprises a rubbery polymer having a styrene monomer graft-polymerized thereto, has been manufactured widely in commercial scale.

In connection with the above-mentioned method, a method for improving the impact resistance and appearance of a styrene resin composition by the use of a modified conjugated diene polymer has been disclosed in Unexamined Japanese Patent Application Laid-Open Specification Nos. Sho 57-94014, Sho 63-8411, Sho 63-278920 and Hei 6-228246. From the detailed studies of the methods disclosed in these patent documents, it became apparent that none of the produced styrene resin composition exhibit excellent balance between the impact resistance and appearance which is satisfactory for practical use.

SUMMARY OF THE INVENTION

In this situation, the present inventors have made extensive and intensive studies with a view toward solving the above-mentioned problems accompanying the prior art. As a result, it has unexpectedly been found that the above-mentioned problems can be solved by a first-order modified, hydrogenated polymer comprising: (1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, the copolymer (1-B) having no or at least one polymer block (H) of the vinyl aromatic hydrocarbon monomer units, and (2) a functional group-containing first-order modifier group bonded to the hydrogenated polymer (1), wherein the functional group-containing first-order modifier group comprises at least one functional group selected from the group consisting of a hydroxyl group, an epoxy group, an amino group, a silanol group and an alkoxysilane group, and wherein the content of the vinyl aromatic hydrocarbon monomer units, vinyl aromatic hydrocarbon block ratio, weight average molecular weight and hydrogenation ratio (as measured with respect to the double bonds in the conjugated diene monomer units) of the first-order modified, hydrogenated polymer are, respectively, within specific ranges. Further, the present inventors found that the above-mentioned problems can be also solved by a second-order modified polymer obtained by reacting a second-order modifier with a first-order modified polymer comprising (β) a base polymer and (γ) a functional group-containing first-order modifier group bonded to the base polymer (β). The present invention has been completed based on these novel findings.

Accordingly, it is an object of the present invention to provide a first-order modified, hydrogenated polymer and a second-order modified polymer which can be advantageously used for producing compositions, such as a filler-containing modified polymer composition, a modified polymer composition comprising a thermoplastic resin and/or a rubbery polymer, an adhesive composition, an asphalt composition and a styrene resin composition, which have excellent properties.

It is another object of the present invention to provide a filler-containing modified polymer composition, a modified polymer composition, an adhesive composition, an asphalt composition and a styrene resin composition, each comprising the above-mentioned first-order modified, hydrogenated polymer or the above-mentioned second-order modified polymer.

It is still another object of the present invention to provide a precursor composition for use as a precursor of a second-order modified polymer composition comprising the above-mentioned second-order modified polymer, wherein the precursor composition comprises a first-order modified polymer comprising a base polymer (β) and a functional group-containing first-order modifier group (γ) bonded to the base polymer (β), and further comprises a second-order modifier and at least one component other than the above-mentioned modified polymer or a modifier.

The foregoing and other objects, features and advantages of the present invention will be apparent from the following detailed description and appended claims.

DETAILED DESCRIPTION OF THE INVENTION

In one aspect of the present invention, there is provided a first-order modified, hydrogenated polymer comprising:
(1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, the copolymer (1-B) having no or at least one polymer block (H) of the vinyl aromatic hydrocarbon monomer units, and
(2) a functional group-containing first-order modifier group bonded to the hydrogenated polymer (1), wherein the functional group-containing first-order modifier group comprises at least one functional group selected from the group consisting of a hydroxyl group, an epoxy group, an amino group, a silanol group and an alkoxysilane group, the first-order modified, hydrogenated polymer having the following characteristics (i) to (iv):
(i) a content of the vinyl aromatic hydrocarbon monomer units of from 0 to 60% by weight, based on the weight of the hydrogenated polymer,
(ii) a vinyl aromatic hydrocarbon block ratio of from 0 to less than 50% by weight, wherein the vinyl aromatic hydrocarbon block ratio is defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer (1-B),
(iii) a weight average molecular weight of from 20,000 to 2,000,000, and
(iv) a hydrogenation ratio of more than 70%, as measured with respect to the double bonds in the conjugated diene monomer units.

For easy understanding of the present invention, the essential features and various preferred embodiments of the present invention are enumerated below.

1. A first-order modified, hydrogenated polymer comprising:
   (1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, the copolymer (1-B) having no or at least one polymer block (H) of the vinyl aromatic hydrocarbon monomer units, and
   (2) a functional group-containing first-order modifier group bonded to the hydrogenated polymer 1), wherein the functional group-containing first-order modifier group comprises at least one functional group selected from the group consisting of a hydroxyl group, an epoxy group, an amino group, a silanol group and an alkoxysilane group,
   the first-order modified, hydrogenated polymer having the following characteristics (i) to (iv):
   (i) a content of the vinyl aromatic hydrocarbon monomer units of from 0 to 60% by weight, based on the weight of the hydrogenated polymer,
   (ii) a vinyl aromatic hydrocarbon block ratio of from 0 to less than 50% by weight, wherein the vinyl aromatic hydrocarbon block ratio is defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer (1-B),
   (iii) a weight average molecular weight of from 20,000 to 2,000,000, and
   (iv) a hydrogenation ratio of more than 70%, as measured with respect to the double bonds in the conjugated diene monomer units.

2. The first-order modified, hydrogenated polymer according to item 1 above, wherein the functional group-containing first-order modifier group (2) comprises at least one functional group represented by a formula selected from the group consisting of the following formulae (a) to (m):

(a)

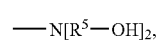

(b)

-continued

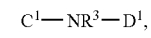 (c)

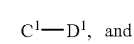 (d)

—NR¹—R⁵—CH—CHR⁶, (e)
         \\ /
          O

—N[R⁵—CH—CHR⁶]₂, (f)
      \\ /
       O

—CR¹—NR⁶—R⁵—NR³, (g)
  |
  OH

—CR¹—R⁵—NR²R⁶, (h)
  |
  OH

—CR¹—R⁵—OR⁶, (i)
  |
  OH

—CR¹—R⁵—Si(OR⁶)₃, (j)
  |
  OH

—O—R⁵—Si(OR⁶)₃, (k)

—C—NR¹—R⁵—NR²R⁶, and (l)
 ‖
 O

—C—R⁵—NR²R⁶ (m)
 ‖
 O wherein, in the formulae (a) to (m):
N represents a nitrogen atom, Si represents a silicon atom, O represents an oxygen atom, C represents a carbon atom, and H represents a hydrogen atom,
each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group,
each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group,
each $R^6$ independently represents a hydrogen atom or a $C_1$-$C_8$ alkyl group,
wherein each of $R^1$ to $R^5$ optionally, independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxysilane group.

3. The first-order modified, hydrogenated polymer according to item 1 or 2 above, which is represented by a formula selected from the group consisting of the following formulae (I) to (V):

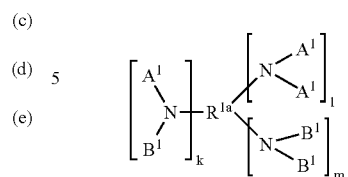 (I)

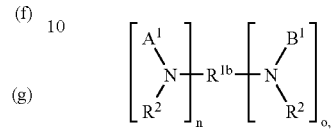 (II)

$C^1$—$NR^3$—$D^1$, (III)

$C^1$—$D^1$, and (IV)

$E^1$—$F^1$, (V)

wherein:
$A^1$ represents a unit which is represented by any one of the following formulae (a-1) and (b-1):

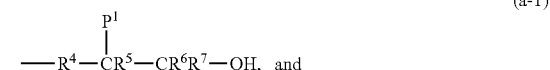 (a-1)

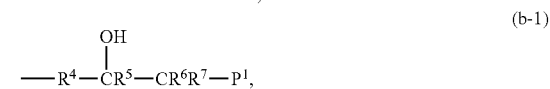 (b-1)

$B^1$ represents a unit which is represented by the following formula (c-1):

 (c-1)

$C^1$ represents a unit which is represented by any one of the following formulae (d-1) and (e-1):

 (d-1)

 (e-1)

$D^1$ represents a unit which is represented by the following formula (f-1):

—$R^8$—$NHR^3$ (f-1), $E^1$ represents a unit which is represented by the following formula (g-1):

—$R^9$—$P^1$, and (g-1)

$F^1$ represents a unit which is represented by any one of the following formulae (h-1) to (j-1):

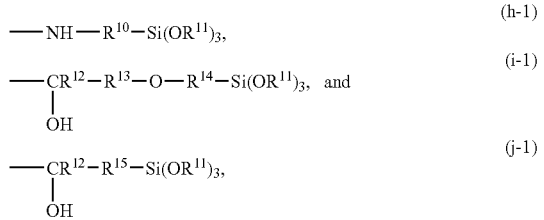

wherein, in the formulae (I) to (III) and (a-1) to (j-1):
N represents a nitrogen atom, Si represents a silicon atom, O represents an oxygen atom, C represents a carbon atom, and H represents a hydrogen atom,
$P^1$ represents the hydrogenated polymer (1),
$R^{1a}$ represents a trivalent aliphatic $C_1$-$C_{48}$ hydrocarbon group,
each of $R^{1b}$, $R^4$, $R^8$ to $R^{10}$ and $R^{13}$ to $R^{15}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$ and $R^{13}$ to $R^{15}$ optionally, independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{15}$ optionally, independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxy-silane group, and
each of k, l, m and o is independently an integer of 0 or more, provided that both k and l are not simultaneously 0, and n is an integer of 1 or more.

4. A filler-containing modified polymer composition comprising:
100 parts by weight of (A-1) the first-order modified, hydrogenated polymer of any one of items 1 to 3 above, and
0.5 to 300 parts by weight of (B) a reinforcing filler.

5. The filler-containing modified polymer composition according to item 4 above, which further comprises 0.01 to 20 parts by weight of (C) a second-order modifier having a functional group which is reactive to the functional group of the modifier group of the first-order modified, hydrogenated polymer (A-1), wherein the second-order modifier (C) is at least one member selected from the group consisting of a functional monomer and a functional oligomer.

6. The filler-containing modified polymer composition according to item 4 or 5 above, wherein the reinforcing filler (B) is at least one member selected from the group consisting of a silica inorganic filler, a metal oxide, a metal hydroxide and carbon.

7. A crosslinked, filler-containing modified polymer composition obtained by subjecting the filler-containing modified polymer composition of any one of items 4 to 6 above to a crosslinking reaction in the presence of a vulcanizing agent.

8. A modified polymer composition comprising:
1 to 99 parts by weight, relative to 100 parts by weight of the total of components (A-1) and (D), of (A-1) the first-order modified, hydrogenated polymer of any one of items 1 to 3 above, and
99 to 1 part by weight, relative to 100 parts by weight of the total of components (A-1) and (D), of (D) at least one polymer selected from the group consisting of a thermoplastic resin other than the first-order modified, hydrogenated polymer (A-1) and a rubbery polymer other than the first-order modified, hydrogenated polymer (A-1).

9. The modified polymer composition according to item 8 above, which further comprises 0.01 to 20 parts by weight, relative to 100 parts by weight of the total of components (A-1) and (D), of (C) a second-order modifier having a functional group which is reactive to the functional group of the modifier group of the first-order modified, hydrogenated polymer (A-1), wherein the second-order modifier (C) is at least one member selected from the group consisting of a functional monomer and a functional oligomer.

10. The modified polymer composition according to item 8 or 9 above, wherein the rubbery polymer in component (D) comprises at least one member selected from the group consisting of a conjugated diene polymer comprising conjugated diene monomer units, a random copolymer comprising conjugated diene monomer units and vinyl aromatic hydrocarbon monomer units, a block copolymer comprising conjugated diene monomer units and vinyl aromatic hydrocarbon monomer units, a non-diene polymer and a natural rubber,
the rubbery polymer being unhydrogenated or at least partially hydrogenated.

11. The modified polymer composition according to any one of items 8 to 10 above, wherein the thermoplastic resin in component (D) is a functional group-containing thermoplastic resin and the rubbery polymer in component (D) is a functional group-containing rubbery polymer, wherein each of the functional group-containing thermoplastic resin and rubbery polymer contains at least one functional group which is reactive to the functional group of the first-order modifier group of the first-order modified, hydrogenated polymer (A-1).

12. The modified polymer composition according to item 11 above, wherein the functional group-containing thermoplastic resin comprises at least one member selected from the group consisting of a polyester resin, a polyamide resin, a polycarbonate resin, a polyurethane resin, a polyphenylene ether resin and a polyoxymethylene resin each of which contains at least one functional group selected from the group consisting of an acid anhydride group, a carboxyl group, a hydroxyl group, an epoxy group, an amino group, a silanol group and an alkoxysilane group.

13. An adhesive composition comprising:
100 parts by weight of (A-1) the first-order modified, hydrogenated polymer of any one of items 1 to 3 above, and
20 to 400 parts by weight of (E) a tackifier.

14. The adhesive composition according to item 13 above, which further comprises 0.01 to 20 parts by weight of (C) a second-order modifier having a functional group which is reactive to the functional group of the modifier group of the first-order modified, hydrogenated polymer (A-1), wherein the second-order modifier (C) is at least one member selected from the group consisting of a functional monomer and a functional oligomer.

15. An asphalt composition comprising:
   0.5 to 50 parts by weight of (A-1) the first-order modified, hydrogenated polymer of any one of items 1 to 3 above, and
   100 parts by weight of (F) an asphalt.

16. The asphalt composition according to item 15 above, which further comprises 0.01 to 20 parts by weight of (C) a second-order modifier having a functional group which is reactive to the functional group of the modifier group of the first-order modified, hydrogenated polymer (A-1), wherein the second-order modifier (C) is at least one member selected from the group consisting of a functional monomer and a functional oligomer.

17. A styrene resin composition obtained by subjecting a raw material mixture to radical polymerization, the raw material mixture comprising:
   2 to 30 parts by weight, relative to 100 parts by weight of the total of components (A-1) and (G), of (A-1) the first-order modified, hydrogenated polymer of any one of items 1 to 3 above, and
   98 to 70 parts by weight, relative to 100 parts by weight of the total of components (A-1) and (G), of (G) a vinyl aromatic hydrocarbon monomer or a mixture of a vinyl aromatic hydrocarbon monomer and a comonomer copolymerizable with the vinyl aromatic hydrocarbon monomer.

18. The styrene resin composition according to item 17 above, wherein the raw material mixture further comprises 0.01 to 20 parts by weight, relative to 100 parts by weight of the total of components (A-1) and (G), of (C) a second-order modifier having a functional group which is reactive to the functional group of the modifier group of the first-order modified, hydrogenated polymer (A-1), wherein the second-order modifier (C) is at least one member selected from the group consisting of a functional monomer and a functional oligomer.

19. A method for producing the styrene resin composition of item 17 or 18 above, comprising:
   (1) providing a raw material mixture comprising (A-1) the first-order modified, hydrogenated polymer of any one of items 1 to 3 above, (G) a vinyl aromatic hydrocarbon monomer or a mixture of a vinyl aromatic hydrocarbon monomer and a comonomer copolymerizable with the vinyl aromatic hydrocarbon monomer, and optionally at least one member selected from the group consisting of (C) a second-order modifier and (B) a reinforcing filler, and
   (2) subjecting the raw material mixture to radical polymerization,
   thereby obtaining a styrene resin composition.

20. A second-order modified polymer comprising:
   (β) a base polymer, and
   (δ) a functional group-containing modifier group bonded to the base polymer (β),
   wherein the second-order modified polymer is obtained by reacting a second-order modifier with a first-order modified polymer comprising (β) a base polymer and (γ) a functional group-containing first-order modifier group bonded to the base polymer (β) to thereby form (δ) a functional group-containing modifier group, wherein the second-order modifier has a functional group which is reactive to the functional group of the first-order modifier group (γ) of the first-order modified polymer, and wherein the second-order modifier is used in an amount of 0.3 to 10 moles, relative to one equivalent of the functional group of the first-order modifier group (γ) of the first-order modified polymer,
   the second-order modifier being at least one member selected from the group consisting of a functional monomer and a functional oligomer,
   wherein the base polymer (β) of the first-order modified polymer is unhydrogenated or at least partially hydrogenated and is at least one member selected from the group consisting of the following polymers (β-1) to (β-3):
   (β-1) a conjugated diene polymer comprising conjugated diene monomer units,
   (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and
   (β-3) a vinyl aromatic hydrocarbon polymer comprising vinyl aromatic hydrocarbon monomer units,
   and
   wherein the functional group-containing first-order modifier group (γ) of the first-order modified polymer comprises at least one functional group represented by a formula selected from the group consisting of the above-mentioned formulae (a) to (m).

21. The second-order modified polymer according to item 20 above, wherein the first-order modified polymer is represented by a formula selected from the group consisting of the above-mentioned formulae (I) to (V).

22. The second-order modified polymer according to item 20 or 21 above, wherein each of the functional monomer and the functional oligomer has at least one functional group selected from the group consisting of a hydroxyl group, an amino group, a carboxyl group, an acid anhydride group, an isocyanate group, an epoxy group, a silanol group and an alkoxysilane group.

23. The second-order modified polymer according to any one of items 20 to 22 above, which is represented by a formula selected from the group consisting of the following formulae (VI) to (X):

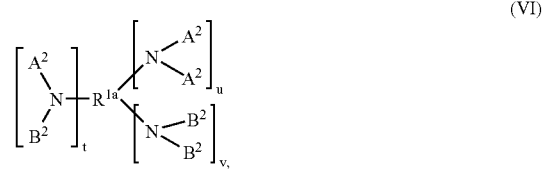

(VI)

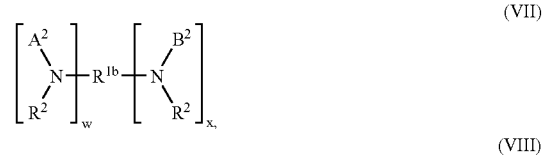

(VII)

$C^2-NR^3-D^2$, (VIII)

-continued $$C^2—D^2, \text{ and} \qquad (IX)$$

$$E^2—F^2, \qquad (X)$$

wherein:

$A^2$ represents a unit which is represented by any one of the following formulae (a-2) and (b-2):

$$—R^4—\underset{\underset{P^1}{|}}{C}R^5—CR^6R^7—O—X^1, \text{ and} \qquad (a-2)$$

$$—R^4—\underset{\underset{O—X^1}{|}}{C}R^5—CR^6R^7—P^1, \qquad (b-2)$$

$B^2$ represents a unit which is represented by any one of the following formulae (c-2) to (e-2):

$$—R^4—\underset{\underset{O}{\diagdown\diagup}}{C}R^5—CR^6R^7, \qquad (c-2)$$

$$—R^4—CHR^5—CR^6R^7—O—X^1, \text{ and} \qquad (d-2)$$

$$—R^4—\underset{\underset{O—X^1}{|}}{C}R^5—CHR^6R^7, \qquad (e-2)$$

$C^2$ represents a unit which is represented by any one of the following formulae (f-2) to (h-2):

$$—\underset{\underset{O}{\|}}{C}—P^1, \qquad (f-2)$$

$$—\underset{\underset{OH}{|}}{\overset{\overset{P^1}{|}}{C}}—P^1, \text{ and} \qquad (g-2)$$

$$—\underset{\underset{O—X^1}{|}}{\overset{\overset{P^1}{|}}{C}}—P^1, \qquad (h-2)$$

$D^2$ represents a unit which is represented by the following formula (i-2):

$$—R^8—NR^3—X^1, \qquad (i-2)$$

$E^2$ represents a unit which is represented by the following formula (j-2):

$$—R^9—P^1, \text{ and} \qquad (j-2)$$

$F^2$ represents a unit which is represented by any one of the following formulae (k-2) to (m-2):

$$—\underset{\underset{X^1}{|}}{N}H—R^{10}—Si(OR^{11})_3, \qquad (k-2)$$

$$—\underset{\underset{O—X^1}{|}}{C}R^{12}—R^{13}—O—R^{14}—Si(OR^{11})_3, \text{ and} \qquad (l-2)$$

$$—\underset{\underset{O—X^1}{|}}{C}R^{12}—R^{15}—Si(OR^{11})_3, \qquad (m-2)$$

wherein:

$X^1$ represents a unit which is represented by any one of the following formulae (n-2) to (s-2):

$$—\underset{\underset{O}{\|}}{C}—R^{16}—\underset{\underset{O}{\|}}{C}—OH \qquad (n-2)$$

$$—\underset{\underset{O}{\|}}{C}—NH—R^{17}—N=C=O, \qquad (o-2)$$

$$—CR^6R^7—\underset{\underset{O}{\diagdown\diagup}}{C}R^5—R^{18}—(CR^5—CR^6R^7)_y, \qquad (p-2)$$

$$—Si(OR^{11})_2—R^{19}—Si(OR^{11})_3, \qquad (q-2)$$

$$—R^4—\underset{\underset{O—R^{20}—(OH)_z}{|}}{C}R^5—CR^6R^7—OH, \text{ and} \qquad (r-2)$$

$$—R^4—\underset{\underset{OH}{|}}{C}R^5—CR^6R^7—OR^{20}—(OH)_a, \qquad (s-2)$$

wherein, in the formulae (VI) to (VIII) and (a-2) to (s-2):
N represents a nitrogen atom, Si represents a silicon atom, O represents an oxygen atom, C represents a carbon atom, and H represents a hydrogen atom, $P^1$ represents the base polymer, $R^{1a}$ represents a trivalent aliphatic $C_1$-$C_{48}$ hydrocarbon group, each of $R^{1b}$, $R^4$, $R^8$ to $R^{10}$ and $R^{13}$ to $R^{20}$ independently represents a $C_1$-$C_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$, $R^{13}$ to $R^{15}$ and $R^{17}$ to $R^{20}$ optionally, independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{20}$ optionally, independently has bonded thereto at least one atom selected from the group consisting of an oxygen atom, a nitrogen atom, a sulfur atom, and a silicon atom, the at least one atom being present in a linkage other than a hydroxyl group, an epoxy group, an amino group, a silanol group and an alkoxysilane group, and each of t, u, v and x is independently an integer of 0 or more, provided that both t and u are not simultaneously 0, and each of w, y, z and α is independently an integer of 1 or more.

24. A method for producing the second-order modified polymer of any one of items 20 to 23 above, comprising:

(1) providing a first-order modified polymer comprising:

(β) a base polymer which is unhydrogenated or at least partially hydrogenated and which is at least one member selected from the group consisting of the following polymers (β-1) to (β-3):

(β-1) a conjugated diene polymer comprising conjugated diene monomer units, (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and (β-3) a vinyl aromatic hydrocarbon polymer comprising vinyl aromatic hydrocarbon monomer units, and (γ) a functional group-containing first-order modifier group bonded to the base polymer (β), wherein the first-order modified polymer is produced by a process in which a base polymer having a living terminal is produced by a living anionic polymerization using an organolithium compound as a polymerization catalyst, and a functional group-containing first-order modifier is addition-bonded to the living terminal of the base polymer to obtain a first-order modified polymer, optionally followed by partial or complete hydrogenation of the obtained first-order modified polymer, and (2) reacting a second-order modifier with the first-order modified polymer to thereby form (δ) a functional group-containing modifier group, wherein the second-order modifier has a functional group which is reactive to the functional group of the first-order modifier group (γ) of the first-order modified polymer, and wherein the second-order modifier is used in an amount of 0.3 to 10 moles, relative to one equivalent of the functional group of the first-order modifier group (γ) of the first-order modified polymer, thereby obtaining a second-order modified polymer, wherein the functional group-containing first-order modifier group (γ) of the first-order modified polymer comprises at least one functional group represented by a formula selected from the group consisting of the above-mentioned formulae (a) to (m).

25. A filler-containing modified polymer composition comprising:

100 parts by weight of (A-2) the second-order modified polymer of any one of items 20 to 23 above, and 0.5 to 300 parts by weight of (B) a reinforcing filler.

26. The filler-containing modified polymer composition according to item 25 above, wherein the reinforcing filler (B) is at least one member selected from the group consisting of a silica inorganic filler, a metal oxide, a metal hydroxide and carbon.

27. A crosslinked, filler-containing modified polymer composition obtained by subjecting the filler-containing modified polymer composition of item 25 or 26 above to a crosslinking reaction in the presence of a vulcanizing agent.

28. A modified polymer composition comprising:

1 to 99 parts by weight, relative to 100 parts by weight of the total of components (A-2) and (D), of (A-2) the second-order modified polymer of any one of items 20 to 23 above, and 99 to 1 part by weight, relative to 100 parts by weight of the total of components (A-2) and (D), of (D) at least one polymer selected from the group consisting of a thermoplastic resin other than the second-order modified polymer (A-2) and a rubbery polymer other than the second-order modified polymer (A-2).

29. The modified polymer composition according to item 28 above, wherein the thermoplastic resin in component (D) comprises at least one member selected from the group consisting of a polyester resin, a polyamide resin, a polycarbonate resin, a polyurethane resin, a polyphenylene ether resin and a polyoxymethylene resin each of which contains at least one functional group selected from the group consisting of an acid anhydride group, a carboxyl group, a hydroxyl group, an epoxy group, an amino group, a silanol group and an alkoxysilane group.

30. A crosslinked, modified polymer composition obtained by subjecting the modified polymer composition of any one of item 28 or 29 above to melt-kneading in the presence of a vulcanizing agent.

31. An adhesive composition comprising:

100 parts by weight of (A-2) the second-order modified polymer of any one of items 20 to 23 above, and 20 to 400 parts by weight of (E) a tackifier.

32. An asphalt composition comprising:

0.5 to 50 parts by weight of (A-2) the second-order modified polymer of any one of items 20 to 23 above, and 100 parts by weight of (F) an asphalt.

33. A styrene resin composition obtained by subjecting a raw material mixture to radical polymerization, the raw material mixture comprising:

2 to 30 parts by weight, relative to 100 parts by weight of the total of components (A-2) and (G), of (A-2) the second-order modified polymer of any one of items 20 to 23 above, and 98 to 70 parts by weight, relative to 100 parts by weight of the total of components (A-2) and (G), of (G) a vinyl aromatic hydrocarbon monomer or a mixture of a vinyl aromatic hydrocarbon monomer and a comonomer copolymerizable with the vinyl aromatic hydrocarbon monomer.

34. The styrene resin composition according to item 33 above, wherein the raw material mixture further comprises 0.5 to 300 parts by weight, relative to 100 parts by weight of component (A-2), of (B) a reinforcing filler.

35. The styrene resin composition according to item 34 above, wherein the reinforcing filler (B) is at least one member selected from the group consisting of a silica inorganic filler, a metal oxide, a metal hydroxide and carbon.

36. A filler-containing modified polymer composition comprising:

100 parts by weight of (A-3) a first-order modified polymer comprising:
  (β) a base polymer which is unhydrogenated or at least partially hydrogenated and which is at least one member selected from the group consisting of the following polymers (β-1) to (β-3):
    (β-1) a conjugated diene polymer comprising conjugated diene monomer units,
    (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and
    (β-3) a vinyl aromatic hydrocarbon polymer comprising vinyl aromatic hydrocarbon monomer units, and
  (γ) a functional group-containing first-order modifier group bonded to the base polymer (β),
0.5 to 300 parts by weight of (B) a reinforcing filler, and
0.01 to 20 parts by weight of (C) a second-order modifier having a functional group which is reactive to the functional group of the first-order modifier group (γ) of the first-order modified polymer (A-3), wherein the second-order modifier (C) is at least one member selected from the group consisting of a functional monomer and a functional oligomer,
  wherein the functional group-containing first-order modifier group (γ) of the first-order modified polymer (A-3) comprises at least one functional group represented by a formula selected from the group consisting of the above-mentioned formulae (a) to (m).

37. The filler-containing modified polymer composition according to item 36 above, wherein the reinforcing filler (B) is at least one member selected from the group consisting of a silica inorganic filler, a metal oxide, a metal hydroxide and carbon.

38. A crosslinked, filler-containing modified polymer composition obtained by subjecting the filler-containing modified polymer composition of item 36 or 37 above to a crosslinking reaction in the presence of a vulcanizing agent.

39. A modified polymer composition comprising:
1 to 99 parts by weight, relative to 100 parts by weight of the total of components (A-3) and (D), of (A-3) a first-order modified polymer comprising:
  (β) a base polymer which is unhydrogenated or at least partially hydrogenated and which is at least one member selected from the group consisting of the following polymers (β-1) to (β-3):
    (β-1) a conjugated diene polymer comprising conjugated diene monomer units,
    (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and
    (β-3) a vinyl aromatic hydrocarbon polymer comprising vinyl aromatic hydrocarbon monomer units, and
  (γ) a functional group-containing first-order modifier group bonded to the base polymer (β),
99 to 1 part by weight, relative to 100 parts by weight of the total of components (A-3) and (D), of (D) at least one polymer selected from the group consisting of a thermoplastic resin other than the first-order modified polymer (A-3) and a rubbery polymer other than the first-order modified polymer (A-3), and
0.01 to 20 parts by weight, relative to 100 parts by weight of the total of components (A-3) and (D), of (C) a second-order modifier having a functional group which is reactive to the functional group of the first-order modifier group (γ) of the first-order modified polymer (A-3), wherein the second-order modifier (C) is at least one member selected from the group consisting of a functional monomer and a functional oligomer,
  wherein the functional group-containing first-order modifier group (γ) of the first-order modified polymer (A-3) comprises at least one functional group represented by a formula selected from the group consisting of the above-mentioned formulae (a) to (m).

40. The modified polymer composition according to item 39 above, wherein the thermoplastic resin in component (D) comprises at least one member selected from the group consisting of a polyester resin, a polyamide resin, a polycarbonate resin, a polyurethane resin, a polyphenylene ether resin and a polyoxymethylene resin each of which contains at least one functional group selected from the group consisting of an acid anhydride group, a carboxyl group, a hydroxyl group, an epoxy group, an amino group, a silanol group and an alkoxysilane group.

41. A crosslinked, modified polymer composition obtained by subjecting the modified polymer composition of item 39 or 40 above to melt-kneading in the presence of a vulcanizing agent.

42. An adhesive composition comprising:
100 parts by weight of (A-3) a first-order modified polymer comprising:
  (β) a base polymer which is unhydrogenated or at least partially hydrogenated and which is at least one member selected from the group consisting of the following polymers (β-1) to (β-3):
    (β-1) a conjugated diene polymer comprising conjugated diene monomer units,
    (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and (β-3) a vinyl aromatic hydrocarbon polymer comprising vinyl aromatic hydrocarbon monomer units, and (γ) a functional group-containing first-order modifier group bonded to the base polymer (P), 20 to 400 parts by weight of (E) a tackifier, and 0.01 to 20 parts by weight of (C) a second-order modifier having a functional group which is reactive to the functional group of the first-order modifier group (γ) of the first-order modified polymer (A-3), wherein the second-order modifier (C) is at least one member selected from the group consisting of a functional monomer and a functional oligomer, wherein the functional group-containing first-order modifier group (γ) of the first-order modified polymer (A-3) comprises at least one functional group represented by a formula selected from the group consisting of the above-mentioned formulae (a) to (m).

43. An asphalt composition comprising:

0.5 to 50 parts by weight of (A-3) a first-order modified polymer comprising:

(β) a base polymer which is unhydrogenated or at least partially hydrogenated and which is at least one member selected from the group consisting of the following polymers (β-1) to (β-3):

(β-1) a conjugated diene polymer comprising conjugated diene monomer units, (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and (β-3) a vinyl aromatic hydrocarbon polymer comprising vinyl aromatic hydrocarbon monomer units, and (γ) a functional group-containing first-order modifier group bonded to the base polymer (β), 100 parts by weight of (F) an asphalt, and 0.01 to 20 parts by weight of (C) a second-order modifier having a functional group which is reactive to the functional group of the first-order modifier group (γ) of the first-order modified polymer (A-3), wherein the second-order modifier (C) is at least one member selected from the group consisting of a functional monomer and a functional oligomer, wherein the functional group-containing first-order modifier group (γ) of the first-order modified polymer (A-3) comprises at least one functional group represented by a formula selected from the group consisting of the above-mentioned formulae (a) to (m).

44. A styrene resin composition obtained by subjecting a raw material mixture to radical polymerization, the raw material mixture comprising:

2 to 30 parts by weight, relative to 100 parts by weight of the total of components (A-3) and (G), of (A-3) a first-order modified polymer comprising:

(β) a base polymer which is unhydrogenated or at least partially hydrogenated and which is at least one member selected from the group consisting of the following polymers (β-1) to (β-3):

(β-1) a conjugated diene polymer comprising conjugated diene monomer units, (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and (β-3) a vinyl aromatic hydrocarbon polymer comprising vinyl aromatic hydrocarbon monomer units, and (γ) a functional group-containing first-order modifier group bonded to the base polymer (β), 98 to 70 parts by weight, relative to 100 parts by weight of the total of components (A-3) and (G), of (G) a vinyl aromatic hydrocarbon monomer or a mixture of a vinyl aromatic hydrocarbon monomer and a comonomer copolymerizable with the vinyl aromatic hydrocarbon monomer, and 0.01 to 20 parts by weight, relative to 100 parts by weight of the total of components (A-3) and (G), of (C) a second-order modifier having a functional group which is reactive to the functional group of the first-order modifier group (γ) of the first-order modified polymer (A-3), wherein the second-order modifier (C) is at least one member selected from the group consisting of a functional monomer and a functional oligomer, wherein the functional group-containing first-order modifier group (γ) of the first-order modified polymer (A-3) comprises at least one functional group represented by a formula selected from the group consisting of the above-mentioned formulae (a) to (m).

45. The styrene resin composition according to item 44 above, wherein the raw material mixture further comprises 0.5 to 300 parts by weight, relative to 100 parts by weight of component (A-3), of (B) a reinforcing filler.

46. The styrene resin composition according to item 45 above, wherein the reinforcing filler (B) is at least one member selected from the group consisting of a silica inorganic filler, a metal oxide, a metal hydroxide and carbon.

Hereinbelow, the present invention is described in detail.

In the present invention, the monomer units of the polymer are named in accordance with a nomenclature wherein the names of the original monomers from which the monomer units are derived are used with the term "monomer unit" attached thereto. For example, the term "vinyl aromatic hydrocarbon monomer unit" means a monomer unit which is formed in a polymer obtained by the polymerization of the vinyl aromatic hydrocarbon monomer. The vinyl aromatic hydrocarbon monomer unit has a molecular structure wherein the two carbon atoms of a substituted ethylene group derived from a substituted vinyl group respectively form linkages to adjacent vinyl aromatic hydrocarbon monomer units. Similarly, the term "conjugated diene monomer unit" means a monomer unit which is formed in a polymer obtained by the polymerization of the conjugated diene monomer. The conjugated diene monomer unit has a molecular structure wherein the two carbon atoms of an olefin corresponding to the conjugated diene monomer respectively form linkages to adjacent conjugated diene monomer units.

The first-order modified, hydrogenated polymer of the present invention comprises:

(1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, the copolymer (1-B) having no or at least one polymer block (H) of the vinyl aromatic hydrocarbon monomer units, and (2) a functional group-containing first-order modifier group bonded to the hydrogenated polymer (1), wherein the functional group-containing first-order modifier group comprises at least one functional group selected from the group consisting of a hydroxyl group, an epoxy group, an amino group, a silanol group and an alkoxysilane group, the first-order modified, hydrogenated polymer having the following characteristics (i) to (iv):

(i) a content of the vinyl aromatic hydrocarbon monomer units of from 0 to 60% by weight, based on the weight of the hydrogenated polymer, (ii) a vinyl aromatic hydrocarbon block ratio of from 0 to less than 50% by weight, wherein the vinyl aromatic hydrocarbon block ratio is defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer (1-B), (iii) a weight average molecular weight of from 20,000 to 2,000,000, and (iv) a hydrogenation ratio of more than 70%, as measured with respect to the double bonds in the conjugated diene monomer units.

The functional group-containing first-order modifier group (2) of the first-order modified, hydrogenated polymer of the present invention comprises at least one functional group selected from the group consisting of a hydroxyl group, an epoxy group, an amino group, a silanol group and an alkoxysilane group. Preferably, the functional group-containing first-order modifier group (2) comprises at least one functional group represented by a formula selected from the group consisting of the following formulae (a) to (m):

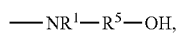 (a)

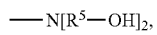 (b)

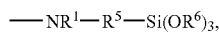 (c)

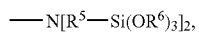 (d)

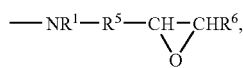 (e)

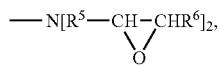 (f)

-continued

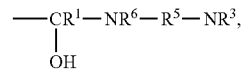 (g)

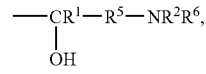 (h)

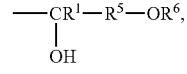 (i)

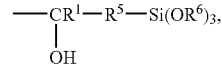 (j)

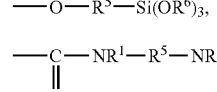 (k)

(l)

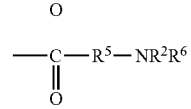 and (m)

wherein, in the formulae (a) to (m):

N represents a nitrogen atom, Si represents a silicon atom, O represents an oxygen atom, C represents a carbon atom, and H represents a hydrogen atom, each of $R^1$ to $R^4$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group, each $R^6$ independently represents a hydrogen atom or a $C_1$-$C_8$ alkyl group, wherein each of $R^1$ to $R^5$ optionally, independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxysilane group.

More preferably, the first-order modified, hydrogenated polymer of the present invention is a compound represented by a formula selected from the group consisting of the following formulae (I) to (V):

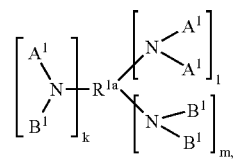 (I)

-continued

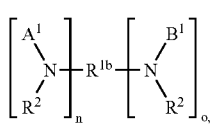
(II)

(III)

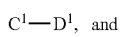
(IV)

(V)

wherein:

$A^1$ represents a unit which is represented by any one of the following formulae (a-1) and (b-1):

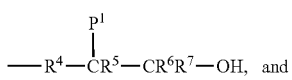
(a-1)

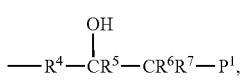
(b-1)

$B^1$ represents a unit which is represented by the following formula (c-1):

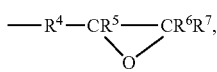
(c-1)

$C^1$ represents a unit which is represented by any one of the following formulae (d-1) and (e-1):

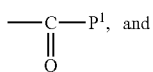
(d-1)

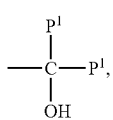
(e-1)

$D^1$ represents a unit which is represented by the following formula (f-1):

—$R^8$—$NHR^3$, (f-1)

$E^1$ represents a unit which is represented by the following formula (g-1):

—$R^9$—$P^1$, and (g-1)

$F^1$ represents a unit which is represented by any one of the following formulae (h-1) to (j-1):

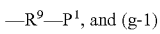
(h-1)

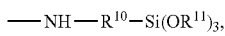
(i-1)

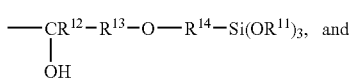
(j-1)

wherein, in the formulae (I) to (III) and (a-1) to (j-1):

N represents a nitrogen atom, Si represents a silicon atom, O represents an oxygen atom, C represents a carbon atom, and H represents a hydrogen atom, $P^1$ represents the hydrogenated polymer (1), $R^{1a}$ represents a trivalent aliphatic $C_1$-$C_{48}$ hydrocarbon group, each of $R^{1b}$, $R^4$, $R^8$ to $R^{10}$ and $R^{13}$ to $R^{15}$ independently represents a $C_1$-$C_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$ and $R^{13}$ to $R^{15}$ optionally, independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{15}$ optionally, independently has bonded thereto at least one atom selected from the group consisting of an oxygen atom, a nitrogen atom, a sulfur atom and a silicon atom, the at least one atom being present in a linkage other than a hydroxyl group, an epoxy group, an amino group, a silanol group and an alkoxysilane group, and each of k, l, m and o is independently an integer of 0 or more, provided that both k and l are not simultaneously 0, and n is an integer of 1 or more.

The hydrogenated polymer (1) which is a precursor of the first-order modified, hydrogenated polymer of the present invention (hereinafter, frequently referred to as "a base polymer which is the hydrogenated polymer (1)") is obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, the copolymer (1-B) having no or at least one polymer block (H) of the vinyl aromatic hydrocarbon monomer units.

In the present invention, the first-order modified, hydrogenated polymer has characteristic (i). Specifically, the content of the vinyl aromatic hydrocarbon monomer units is from 0 to 60% by weight, preferably 5 to 50% by weight, more preferably 10 to 35% by weight, based on the weight of the hydrogenated polymer. When the content of the vinyl aromatic hydrocarbon monomer units is in the range of from 0 to 60% by weight, such a polymer is advantageous for preparing compositions having excellent properties. From the viewpoint of obtaining a composition having excellent mechanical strength and processability, it is preferred that the content of the vinyl aromatic hydrocarbon monomer units is in the range of from 10 to 35% by weight, based on the weight of the hydrogenated polymer.

The first-order modified, hydrogenated polymer of the present invention has characteristic (ii). Specifically, the vinyl aromatic hydrocarbon block ratio is from 0 to less than 50% by weight, preferably 5 to 40% by weight, more preferably 5 to 30% by weight, wherein the vinyl aromatic hydrocarbon block ratio is defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer (1-B). When the first-order modified, hydrogenated polymer has at least one polymer block (H), the vinyl aromatic hydrocarbon block ratio is not less than 5% by weight. When a composition is prepared using a first-order modified, hydrogenated polymer having a vinyl aromatic hydrocarbon block ratio of less than 50% by weight, the prepared composition exhibits excellent flexibility.

In the present invention, the vinyl aromatic hydrocarbon block ratio can be measured, for example, by the following method. The weight of the vinyl aromatic hydrocarbon polymer block (H) (i.e., the weight of the vinyl aromatic hydrocarbon monomer units contained in the polymer block (H)) is obtained by a method in which the unhydrogenated copolymer is subjected to oxidative degradation in the presence of osmium tetraoxide as a catalyst using tert-butyl hydroperoxide (i.e., method described in I. M. KOLTHOFF et al., J. Polym. Sci. 1, 429 (1946)). Using the obtained weight of the vinyl aromatic hydrocarbon polymer block (H), the vinyl aromatic hydrocarbon block ratio of the hydrogenated copolymer is calculated by the following formula, with the proviso that, among the polymer chains (formed by the oxidative degradation) corresponding to the vinyl aromatic hydrocarbon polymer blocks (H), the polymer chains having an average polymerization degree of 30 or less are not taken into consideration in the measurement of the vinyl aromatic hydrocarbon block ratio.

The vinyl aromatic hydrocarbon block ratio (% by weight) =(weight of the vinyl aromatic hydrocarbon monomer units contained in the polymer block (H) in the copolymer prior to the hydrogenation/total weight of vinyl aromatic hydrocarbon monomer units contained in the copolymer prior to the hydrogenation)×100.

In the present invention, the microstructure (including the amounts of a cis bond, a trans bond and a vinyl bond) of the conjugated diene monomer units in the polymer prior to the hydrogenation (unhydrogenated polymer) can be appropriately controlled by using the below-described polar compound and the like. When 1,3-butadiene (which is addition-polymerized through a cis-1,4 bond, a trans-1,4 bond or a 1,2-vinyl bond) is used as the conjugated diene monomer, the 1,2-vinyl bond content is generally in the range of from 5 to 80 mol %, preferably from 10 to 60 mol %, based on the total molar amount of the cis-1,4 bond, trans-1,4 bond and 1,2-vinyl bond. When isoprene or a combination of 1,3-butadiene and isoprene is used as the conjugated diene monomer, it is preferred that the total content of the 1,2-vinyl bond and 3,4-vinyl bond is in the range of from 3 to 75 mol %, more advantageously from 5 to 60%, based on the total molar amount of the cis-1,4 bond, trans-1,4 bond, 1,2-vinyl bond and 3,4-vinyl bond. In the present invention, the total content of the 1,2-vinyl bond and 3,4-vinyl bond (or the content of the 1,2-vinyl bond in the case where 1,3-butadiene is used as the conjugated diene monomer) is defined as the vinyl bond content.

In the unhydrogenated polymer, the vinyl bonds may be uniformly distributed or may be distributed in a tapered configuration. Further, the polymer block may have a plurality of segments having different vinyl bond contents. The difference in the vinyl bond distribution can be controlled by changing the polymerization conditions, such as the type and amount of the vinyl bond formation-controlling agent and polymerization reaction temperature. For example, when the type and amount of the vinyl bond formation-controlling agent (such as a tertiary amine or an ether compound) are not changed during the polymerization of a conjugated diene monomer or the copolymerization of a conjugated diene monomer and a vinyl aromatic hydrocarbon monomer, the amount of the vinyl bonds formed in the resultant polymer is influenced only by the polymerization reaction temperature. Therefore, in this case, when the polymerization reaction is conducted at a constant polymerization reaction temperature, the vinyl bonds are uniformly distributed in the resultant polymer. On the other hand, when the polymerization is conducted while elevating the polymerization reaction temperature, the resultant polymer has a non-uniform distribution with respect to the vinyl bonds, wherein a portion of the polymer which is formed at an early stage of the polymerization (where the polymerization reaction temperature is low) has a high vinyl bond content and a portion of the polymer which is formed at a late stage of the polymerization (where the polymerization reaction temperature is high) has a low vinyl bond content. The below-mentioned hydrogenated polymer having a specific structure is obtained by hydrogenating the polymer having such a structure.

The first-order modified, hydrogenated polymer has characteristic (iii). Specifically, the weight average molecular weight is from 20,000 to 2,000,000, preferably 50,000 to 1,500,000, more preferably 100,000 to 1,000,000. The weight average molecular weight can be measured by gel permeation chromatography (GPC) using a calibration curve obtained using a chromatogram of standard polystyrene samples commercially available (the calibration curve is obtained by the use of the peak molecular weights of the standard polystyrene samples).

In the present invention, the molecular weight distribution of the first-order modified, hydrogenated polymer is preferably in the range of from 1.05 to 5.0. As explained below, the preferred molecular weight distribution varies depending on the difference between the maximum value and minimum value of the vinyl bond content and the hydrogenation ratio of the first-order modified, hydrogenated polymer. For example, when the difference between the maximum value and minimum value of the vinyl bond content is less than 10% by weight, the molecular weight distribution is preferably less than 1.5. When not only the difference between the maximum value and minimum value of the vinyl bond content is less than 10% by weight, but also the hydrogenation ratio is more than 70% and less than 85%, the molecular weight distribution is preferably in the range of from 1.5 to 5.0. The molecular weight distribution can also be obtained by GPC as in the case of the measurement of the weight average molecular weight.

The first-order modified, hydrogenated polymer of the present invention is a hydrogenated polymer obtained by hydrogenating at least one unhydrogenated polymer selected from the group consisting of a polymer comprising conjugated diene monomer units and a copolymer comprising conjugated diene monomer units and vinyl aromatic hydrocarbon monomer units. The first-order modified, hydrogenated polymer has characteristic (iv). Specifically, the hydrogenation ratio is more than 70%, preferably 75% or more, more preferably 80% or more, as measured with respect to the double bonds in the conjugated diene monomer units. For producing a rubbery composition having excellent weatherability, it is especially preferred that the hydrogenation ratio of the first-order modified, hydrogenated polymer is 80% or more, more preferably 85% or more, still more preferably 90% or more.

However, as explained below, depending on the relationship between the vinyl bond content and the molecular weight distribution of the first-order modified, hydrogenated polymer, there are cases where a preferred hydrogenation ratio is in the range of from 70% to less than 85%. Further, from the viewpoint of obtaining a vulcanized composition which exhibits excellent properties imparted by vulcanization, it is recommended that the hydrogenation ratio is not more than 98%, preferably not more than 95%, still more preferably not more than 90%. Further, in the first-order modified, hydrogenated polymer of the present invention, from the viewpoint of obtaining a composition having excellent heat stability, it is recommended that the hydrogenation ratio is not less than 85%, preferably not less than 90%, still more preferably not less than 95%. There is no particular limitation with respect to the hydrogenation ratio as measured with respect to the aromatic double bonds in the vinyl aromatic hydrocarbon monomer units of the first-order modified, hydrogenated polymer. However, it is recommended that the hydrogenation ratio is preferably not more than 50%, more preferably not more than 30%, still more preferably not more than 20%.

Exemplified below are the especially preferred examples of the first-order modified, hydrogenated polymer of the present invention which satisfy the above-mentioned characteristics (i) to (iv):

1) A first-order modified, hydrogenated polymer having a characteristic wherein the difference between the maximum value and minimum value of the vinyl bond content is 10% by weight or more;

2) A first-order modified, hydrogenated polymer having characteristics wherein the difference between the maximum value and minimum value of the vinyl bond content is less than 10% by weight, and the molecular weight distribution is less than 1.55;

3) A first-order modified, hydrogenated polymer having characteristics wherein the difference between the maximum value and minimum value of the vinyl bond content is less than 10% by weight, the molecular weight distribution is in the range of from 1.55 to 5.0, and the hydrogenation ratio is more than 70% and less than 85%, as measured with respect to the double bonds in the conjugated diene monomer units;

4) A first-order modified, hydrogenated polymer having a characteristic wherein the molecular weight and the number of carbon atoms of the terminal methyl group, both determined by GPC/FT-IR analysis, satisfy the relationship defined by the following formula ①:

$$V_a - V_b < 0.03 V_c \qquad (1)$$

wherein V is defined as the number of carbon atoms of a terminal methyl group of a polymer chain, relative to 1,000 carbon atoms contained in the polymer chain; $V_a$ is defined as the V value of a polymer chain having a molecular weight which is twice the peak top molecular weight of the first-order modified, hydrogenated polymer; $V_b$ is defined as the V value of a polymer chain having a molecular weight which is ½ of the peak top molecular weight of the first-order modified, hydrogenated polymer; and $V_c$ is the V value of a polymer chain having the peak top molecular weight of the first-order modified, hydrogenated polymer;

5) A first-order modified, hydrogenated polymer having characteristics wherein the average vinyl bond content is either less than 20% by weight or 50% by weight or more, and the molecular weight and the number of carbon atoms of the terminal methyl group, both determined by GPC/FT-IR analysis, satisfy the relationship defined by the following formula ②:

$$V_a - V_b \geq 0.03 V_c \qquad (2)$$

wherein $V_a$, $V_b$ and $V_c$ are as defined for formula ① above; and

6) A first-order modified, hydrogenated polymer having characteristics wherein the average vinyl bond content is 20% by weight or more and less than 50% by weight, the hydrogenation ratio is more than 70% and less than 85%, as measured with respect to the double bonds in the conjugated diene monomer units, and the molecular weight and the number of carbon atoms of the terminal methyl group, both determined by GPC/FT-IR analysis, satisfy the relationship defined by formula ② above.

GPC/FT-IR is an apparatus in which an FT-IR (Fourier Transform Infrared) Spectrometer is used as detector for a GPC (gel permeation chromatography) and this apparatus enables the determination of the microstuctures of a substance which has been fractionated based on the molecular weight. The number of carbon atoms of a terminal methyl group can be determined from the ratio I(—CH$_3$)/I(—CH$_2$—), which is the ratio of the absorbance I(—CH$_3$) <absorption wave number: 2960 cm$^{-1}$> ascribed to the methyl group to the absorbance I(—CH$_2$—) <absorption wave number: 2925 cm$^{-1}$> ascribed to the methylene group. This method is described in, for example, "NICOLET FT-IR CUSTOMER NEWSLETTER", Vol. 2, No. 2, 1994.

The above-exemplified preferred first-order modified, hydrogenated polymer can be obtained as follows. A conjugated diene monomer solely or a combination of a conjugated diene monomer and a vinyl aromatic hydrocarbon monomer are subjected to continuous polymerization reaction in the presence of an organic alkali metal compound as a polymerization initiator and a vinyl bond formation-controlling agent to thereby obtain a base polymer having a living terminal. Then, a functional group-containing first-order modifier is addition-bonded to the living terminal of the base polymer to obtain a first-order modified, unhydrogenated polymer, followed by hydrogenation, to thereby obtain a first-order modified, hydrogenated polymer. In this method, in the step of continuously polymerizing a conjugated diene monomer solely or a combination of a conjugated diene monomer and a vinyl aromatic hydrocarbon monomer, the amount of the vinyl bond formation-controlling agent (relative to the amount of the organic alkali metal compound) may be varied. In the present invention, the "amount of the vinyl bond formation-controlling agent, relative to the amount of the organic alkali metal compound" is the ratio of the total amount of the vinyl bond formation-controlling agent present in the polymerization reaction system to the amount of the organic alkali metal compound continuously fed to the reaction system. Specifically, the first-order modified, hydrogenated polymer can be produced using a reaction system comprising two or more polymerization reactors which are connected in series. An organic alkali metal compound, a conjugated diene monomer solely or a combination of a conjugated diene monomer and a vinyl aromatic hydrocarbon monomer, and optionally a vinyl bond formation-controlling agent are continuously fed to the first polymerization reactor and a continuous polymerization is performed in the reactor to obtain a reaction mixture containing a polymer of the conjugated diene monomer or a copolymer of the conjugated diene monomer and the vinyl aromatic hydrocarbon monomer. Subsequently, the obtained reaction mixture and a conjugated diene monomer solely or a combination of a conjugated diene monomer and a vinyl aromatic hydrocarbon monomer are continuously fed to a subsequent reactor or reactors, while feeding a vinyl bond-formation-controlling agent to at least one of the subsequent reactor(s), to thereby effect further polymerization and obtain a base polymer having a living terminal. Then, a functional group-containing first-order modifier is addition-bonded to the living terminal of the base polymer to obtain a first-order modified polymer, followed by hydrogenation of the obtained first-order modified polymer.

For example, the first-order modified, hydrogenated polymer can be produced using a reaction system comprising two polymerization reactors which are connected in series. The organic alkali metal compound, a conjugated diene monomer solely or a combination of a conjugated diene monomer and a vinyl aromatic hydrocarbon monomer, and optionally a vinyl bond formation-controlling agent are continuously fed to the first polymerization reactor and continuously polymerized therein to thereby obtain a reaction mixture containing a polymer of a conjugated diene monomer or a copolymer of a conjugated diene monomer and a vinyl aromatic hydrocarbon monomer. The obtained reaction mixture and a conjugated diene monomer solely or a combination of a conjugated diene monomer and a vinyl aromatic hydrocarbon monomer are continuously fed to the second reactor together with a vinyl bond formation-controlling agent, to thereby effect a further polymerization and obtain a base polymer having a living terminal. Then, a functional group-containing first-order modifier is addition-bonded to the living terminal of the base polymer to obtain a first-order modified polymer. Subsequently, hydrogenation of the obtained first-order modified polymer is performed to obtain a first-order modified, hydrogenated polymer. In this method, the amount of the vinyl bond formation-controlling agent fed to the first and second polymerization reactors must be controlled so that the molecular weight and the number of carbon atoms of the terminal methyl group (both determined by the GPC/FT-IR analysis) of the produced first-order modified, hydrogenated polymer satisfy the specific relationship defined in the present invention.

In another aspect of the present invention, there is provided a second-order modified polymer comprising:
(β) a base polymer, and
(δ) a functional group-containing modifier group bonded to the base polymer (β),
wherein the second-order modified polymer is obtained by reacting a second-order modifier with a first-order modified polymer comprising (β) a base polymer and (γ) a functional group-containing first-order modifier group bonded to the base polymer (β) to thereby form (δ) a functional group-containing modifier group, wherein the second-order modifier has a functional group which is reactive to the functional group of the first-order modifier group (γ) of the first-order modified polymer, and wherein the second-order modifier is used in an amount of 0.3 to 10 moles, relative to one equivalent of the functional group of the first-order modifier group (γ) of the first-order modified polymer,
the second-order modifier being at least one member selected from the group consisting of a functional monomer and a functional oligomer,
wherein the base polymer (β) of the first-order modified polymer is unhydrogenated or at least partially hydrogenated and is at least one member selected from the group consisting of the following polymers (β-1) to (β-3):
(β-1) a conjugated diene polymer comprising conjugated diene monomer units,
(β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and
(β-3) a vinyl aromatic hydrocarbon polymer comprising vinyl aromatic hydrocarbon monomer units, and
wherein the functional group-containing first-order modifier group (γ) of the first-order modified polymer comprises at least one functional group represented by a formula selected from the group consisting of the above-mentioned formulae (a) to (m).

The base polymer (β) of the second-order modified polymer of the present invention is at least one member selected from the group consisting of polymers (β-1) to (β-3), that is, a conjugated diene polymer (β-1) comprising conjugated diene monomer units, a vinyl aromatic hydrocarbon polymer (β-3) comprising vinyl aromatic hydrocarbon monomer units, and a copolymer (β-2) comprising conjugated diene monomer units and vinyl aromatic hydrocarbon monomer units. In general, copolymer (β-2) above has a content of the vinyl aromatic hydrocarbon monomer units of from 5 to 95% by weight, preferably 10 to 90% by weight, more preferably 15 to 85% by weight. With respect to the base polymer (β), a polymer having the content of the vinyl aromatic hydrocarbon monomer units of less than 5% by weight is defined as a conjugated diene polymer, and a polymer having the content of the vinyl aromatic hydrocarbon monomer units of more than 95% by weight is defined as a vinyl aromatic hydrocarbon polymer.

When the second-order modified polymer is an unhydrogenated polymer, the content of the vinyl aromatic hydrocarbon monomer units can be measured with respect to either the base polymer (β) prior to the first-order modification or the first-order modified polymer prior to the second-order modification (hereinafter, frequently referred to as a "precursory first-modified polymer"). When the second-order modified polymer is a hydrogenated or partially hydrogenated polymer, the content of the vinyl aromatic hydrocarbon monomer units can be measured with respect to either a base polymer (β) prior to the first-order modification or a precursory first-order modified polymer prior to the hydrogenation.

In the second-order modified polymer of the present invention, when the base polymer (β) is a copolymer (β-2), the copolymer (β-2) comprises conjugated diene monomer units and vinyl aromatic hydrocarbon monomer units and has no or at least one polymer block (H) of the vinyl aromatic hydrocarbon monomer units. The vinyl aromatic hydrocarbon block ratio is less than 50% by weight, preferably 40% by weight or less, more preferably 20% by weight or less, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state. When a second-order modified polymer is produced using copolymer (β-2) having a vinyl aromatic hydrocarbon block ratio of less than 50% by weight, a composition containing such a second-order modified polymer exhibits excellent flexibility.

The base polymer (β) of the first-order modified polymer used for producing the second-order modified polymer of the present invention is unhydrogenated or at least partially hydrogenated. When the base polymer (β) is hydrogenated, there is no particular limitation with respect to the hydrogenation ratio as measured with respect to the unsaturated double bonds in the conjugated diene monomer units, and the hydrogenation ratio can be appropriately controlled to a desired level. It is preferred that the hydrogenation ratio is more than 70%, more preferably 75% or more, still more preferably 85% or more, most preferably 90% or more, as measured with respect to the unsaturated double bonds in the conjugated diene monomer units. When the base polymer (β) is partially hydrogenated, it is preferred that the hydrogenation ratio is 10 to 70%, more advantageously 15 to 65%, most advantageously 20 to 60%, as measured with respect to the unsaturated double bonds in the conjugated diene monomer units. From the viewpoint of obtaining a vulcanized composition having excellent properties imparted by vulcanization, it is recommended that the hydrogenation ratio is not more than 98%, preferably not more than 95%, still more preferably not more than 90%.

In the present invention, when the base polymer (β) is a hydrogenated polymer, from the viewpoint of obtaining a polymer composition having excellent heat stability, it is recommended that the hydrogenation ratio as measured with respect to the vinyl bonds in the conjugated diene monomer units of the unhydrogenated polymer is preferably 85% or more, more preferably 90% or more, still more preferably 95% or more. Herein, the hydrogenation ratio with respect to the vinyl bonds is the ratio of hydrogenated vinyl bonds to the vinyl bonds in the conjugated diene monomer units of the unhydrogenated polymer. There is no particular limitation with respect to the hydrogenation ratio as measured with respect to the aromatic double bonds in the vinyl aromatic hydrocarbon monomer units of the polymer. However, it is recommended that the hydrogenation ratio is preferably 50% or less, more preferably 30% or less, still more preferably 20% or less. The hydrogenation ratio can be measured by a method using a nuclear magnetic resonance (NMR) apparatus.

With respect to the weight average molecular weight of the second-order modified polymer of the present invention, there is no particular limitation. However, from the viewpoint of improving the mechanical strength of the polymer composition, it is preferred that the second-order modified polymer of the present invention has a weight average molecular weight of 20,000 or more. Further, from the viewpoint of improving the processability of the polymer composition, it is preferred that the second-order modified polymer has a weight average molecular weight of 2,000,000 or less. The weight average molecular weight is more preferably from 50,000 to 1,500,000, still more preferably from 100,000 to 1,000,000. The molecular weight distribution of the second-order modified polymer is preferably from 1.05 to 6.0, more preferably 1.1 to 6.0, still more preferably 1.55 to 5.0, and most preferably from 1.6 to 4.0.

With respect to the structure of the base polymer (β) of the first-order modified polymer (precursory first-order modified polymer) which is a precursor of the second-order modified polymer of the present invention, there is no particular limitation, and the base polymer (β) may have any structure. For example, when the base polymer is a conjugated diene polymer comprising conjugated diene monomer units or a copolymer comprising conjugated diene monomer units and vinyl aromatic hydrocarbon monomer units, use can be made of a polymer having a structure represented by a formula selected from the group consisting of the below-mentioned formulae (p1) to (p7). Further, with respect to the first-order modified, hydrogenated polymer of the present invention, a hydrogenated polymer having a structure selected from the group consisting of the structures represented by the below-mentioned formulae (p1) to (p7) can be used as the hydrogenated polymer (1) (namely a base polymer), as long as the structure satisfies all of the above-mentioned characteristics (i) to (iv). (It should be noted that the base polymer (β) of the precursory first-order modified polymer is unhydrogenated or at least partially hydrogenated.)

$$(B)_n\text{—X and/or }(S)_n\text{—X}, \qquad (p1)$$

$$(B\text{—}S)_n\text{—X and/or }(S\text{—}B)_n\text{—X}, \qquad (p2)$$

$$[(B\text{—}S)_n]_m\text{—X and/or }[(S\text{—}B)_n]_m\text{—X}, \qquad (p3)$$

$$(S\text{—}H)_n\text{—X and/or }[(S\text{—}H)_n]_m\text{—X}, \qquad (p4)$$

$$(B\text{—}H)_n\text{—X and/or }[(B\text{—}H)_n]_m\text{—X}, \qquad (p5)$$

$$(B\text{—}S\text{—}H)_n\text{—X and/or }[(B\text{—}S\text{—}H)_n]_m\text{—X and} \qquad (p6)$$

$$(S\text{—}B\text{—}H)_n\text{—X and/or }[(S\text{—}B\text{—}H)_n]_m\text{—X} \qquad (p7)$$

wherein each B represents a polymer block of conjugated diene monomer units, each S independently represents a random copolymer block comprised of conjugated diene monomer units and vinyl aromatic hydrocarbon monomer units, each H independently represents a polymer block of vinyl aromatic hydrocarbon monomer units, n represents an integer of 1 or more, m represents an integer of 2 or more, preferably in the range of from 2 to 10, and each X represents a functional group-containing first-order modifier group.

With respect to the structures of the above formulae (p1) to (p7), the vinyl bonds may be uniformly distributed in the conjugated diene polymer, a random copolymer comprising conjugated diene monomer units, a polymer block of conjugated diene monomer units and a random copolymer block comprising conjugated diene monomer units. Alternatively, the above-mentioned polymers and polymer blocks may have a plurality of segments having different vinyl bond contents. Further, the vinyl aromatic hydrocarbon monomer units may be uniformly distributed or may be distributed in a tapered configuration in the random copolymer and the random copolymer block S. The random copolymer and the random copolymer block S may have a plurality of segments in which the vinyl aromatic hydrocarbon monomer units are uniformly distributed and/or may have a plurality of segments in which the vinyl aromatic hydrocarbon monomer units are distributed in a tapered configuration.

In the present invention, the content of the vinyl aromatic hydrocarbon monomer units can be measured by means of an UV spectrometer, an infrared spectrometer, a nuclear magnetic resonance (NMR) apparatus and the like. The vinyl aromatic hydrocarbon block ratio can be measured by the above-mentioned method of KOLTHOFF. With respect to the polymer prior to the hydrogenation (unhydrogenated polymer), the vinyl bond content of the conjugated diene monomer units can be measured by a method (Hampton method) using an infrared spectrometer or a method using a nuclear magnetic resonance (NMR) apparatus. The hydrogenation ratio of the first-order modified hydrogenated polymer can be measured by means of an infrared spectrometer or a nuclear magnetic resonance (NMR) apparatus.

The first-order modified, hydrogenated polymer of the present invention and the precursory first-order modified polymer which is the precursor of the second-order modified polymer of the present invention, can be produced in substantially the same manner. The methods for producing these polymers are explained in detail below.

Firstly, the hydrogenated polymer (1) which is the base polymer of the first-order modified, hydrogenated polymer or the base polymer (β) of the precursory first-order modified polymer is produced. The conjugated diene monomer used in the present invention is a diolefin having a pair of conjugated double bonds. Specific examples of conjugated diene monomers include 1,3-butadiene, 2-methyl-1,3-butadiene(isoprene), 2,3-dimethyl-1,3-butadiene, 1,3-pentadiene, 2-methyl-1,3-pentadiene and 1,3-hexadiene. Of these, especially preferred are 1,3-butadiene and isoprene. The above conjugated diene monomers can be used individually or in combination. Examples of vinyl aromatic hydrocarbon monomers include styrene, α-methylstyrene, p-methylstyrene, divinylbenzene, 1,1-diphenylethylene, N,N-dimethyl-p-aminoethylstyrene and N,N-diethyl-p-aminoethylstyrene. These vinyl aromatic hydrocarbon monomers can be used individually or in combination.

The polymer prior to the hydrogenation (unhydrogenated polymer) can be produced, for example, by a living anionic polymerization conducted in a hydrocarbon solvent using a polymerization initiator, such as an organic alkali metal compound. Examples of hydrocarbon solvents include aliphatic hydrocarbons, such as n-butane, isobutane, n-pentane, n-hexane, n-heptane and n-octane; alicyclic hydrocarbons, such as methylcyclopentane, cyclohexane, cycloheptane and methylcycloheptane; and aromatic hydrocarbons, such as benzene, toluene, xylene and ethylbenzene.

As the polymerization initiator, it is possible to use aliphatic hydrocarbon-alkali metal compounds, aromatic hydrocarbon-alkali metal compounds and organic amino-alkali metal compounds, which are generally known to have a living anionic polymerization activity with respect to a conjugated diene and a vinyl aromatic hydrocarbon compound. Examples of alkali metals include lithium, sodium and potassium.

Examples of organic alkali metal compounds include lithium compounds having at least one lithium atom in a molecule of $C_1$-$C_{20}$ aliphatic or aromatic hydrocarbons (such as a dilithium compound, a trilithium compound and a tetralithium compound). Specific examples of lithium compounds include n-propyllithium, n-butyllithium, sec-butyllithium, tert-butyllithium, n-pentyllithium, n-hexyllithium, benzyllithium, phenyl-lithium, tolyllithium, a reaction product of diisopropenyl benzene and sec-butyllithium, and a reaction product obtained by reacting divinyl benzene, secbutyllithium and a small amount of 1,3-butadiene. Further, it is also possible to use any of the organic alkali metal compounds described in U.S. Pat. No. 5,708,092, GB Patent No. 2,241,239 and U.S. Pat. No. 5,527,753. These organic alkali metal compounds can be used individually or in combination.

In the present invention, when the copolymerization of a conjugated diene monomer and a vinyl aromatic hydrocarbon monomer is performed in the presence of the organic alkali metal compound as a polymerization initiator, it is possible to use a tertiary amine compound or an ether compound as a vinyl bond formation-controlling agent, which is used for controlling the amount of vinyl bonds (i.e., a 1,2-vinyl bond and a 3,4-vinyl bond) formed by the conjugated diene monomers, and for controlling the occurrence of a random copolymerization of a conjugated diene monomer and a vinyl aromatic hydrocarbon monomer. As the tertiary amine compound, it is possible to use a compound represented by the formula:

$$R^1R^2R^3N$$

wherein each of $R^1$, $R^2$ and $R^3$ independently represents a $C_1$-$C_{20}$ hydrocarbon group or a $C_1$-$C_{20}$ hydrocarbon group substituted with a tertiary amino group.

Specific examples of tertiary amine compounds include trimethylamine, triethylamine, tributylamine, N,N-di-methylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine and N,N'-dioctyl-p-phenylenediamine.

As the above-mentioned ether compound, it is possible to use a linear ether compound and a cyclic ether compound. Examples of linear ether compounds include dimethyl ether; diethyl ether; diphenyl ether; ethylene glycol dialkyl ethers, such as ethylene glycol dimethyl ether, ethylene glycol diethyl ether and ethylene glycol dibutyl ether; and diethylene glycol dialkyl ethers, such as diethylene glycol dimethyl ether, diethylene glycol diethyl ether and diethylene glycol dibutyl ether. Examples of cyclic ether compounds include tetrahydrofuran, dioxane, 2,5-dimethyloxolane, 2,2,5,5-tetramethyloxolane, 2,2-bis(2-oxolanyl)propane and an alkyl ether of a furfuryl alcohol.

In the present invention, the polymerization of a conjugate diene monomer, the copolymerization of a conjugated diene monomer and a vinyl aromatic hydrocarbon monomer and the polymerization of a vinyl aromatic hydrocarbon monomer in the presence of the organic alkali metal compound as a polymerization initiator can be conducted either in a batchwise manner or in a continuous manner. Further, the polymerization or copolymerization may be conducted in a manner wherein a batchwise operation and a continuous operation are used in combination. The reaction temperature for the polymerization or copolymerization is generally in the range of from 0 to 180° C., preferably from 30 to 150° C. The reaction time for the polymerization or copolymerization varies depending on other conditions, but is generally within 48 hours, preferably in the range of from 0.1 to 10 hours. It is preferred that the atmosphere of the polymerization or copolymerization reaction system is an atmosphere of an inert gas, such as nitrogen gas. With respect to the polymerization reaction pressure, there is no particular limitation so long as the pressure is sufficient for maintaining each of the monomer(s) and the solvent in a liquid state at a reaction temperature in the above-mentioned range. Further, care must be taken to prevent the intrusion of impurities (such as water, oxygen and carbon dioxide), which deactivate the catalyst and/or the living polymer, into the polymerization reaction system.

Next, a first-order modifier is addition-bonded to the living terminal of the base polymer produced in the above-mentioned manner, to thereby obtain a first-order modified polymer having a functional group-containing first-order modifier bonded to the living terminal of the base polymer. The thus obtained first-order modified polymer can be hydrogenated to obtain a first-order modified, hydrogenated polymer. The first-order modified, hydrogenated polymer of the present invention has a functional group-containing first-order modifier group (2) comprising at least one functional group selected from the group consisting of a hydroxyl group, an epoxy group, an amino group, a silanol group and an alkoxysilane group; and the precursory first-order modified polymer used for producing the second-order modified polymer of the present invention has the functional group-containing first-order modifier group (γ) comprising at least one functional group represented by a formula selected from the group consisting of the above-mentioned formulae (a) to (m). As in the case of a preferred example of the first-order modified, hydrogenated polymer of the present invention, the first-order modified polymer which is preferred for use as a precursory first-order modified polymer is the first-order modified, hydrogenated polymer represented by a formula selected from the group consisting of the above-mentioned formulae (I) to (V).

As another method for producing the first-order modified polymer, there can be mentioned a method in which an organic alkali metal compound, such as an organolithium compound, is addition-bonded to a base polymer which does not have a living terminal (this addition reaction is called "metalation reaction"), followed by the addition of a first-order modifier to the base polymer. In this method, the base polymer may be hydrogenated before the metalation reaction and the subsequent addition of the first-order modifier. When the base polymer is reacted with the first-order modifier, it is possible that a hydroxyl group, an amino group and the like, which are contained in the resultant modifier group of the modified polymer, are converted to organic metal salts thereof, depending on the type of modifier. In such case, the organic metal salts can be reconverted back to functional groups (i.e., a hydroxyl group, an amino group and the like) by reacting the organic metal salts with an active hydrogen-containing compound, such as water, an alcohol and the like.

In the present invention, a first-order modified polymer obtained by the addition of the first-order modifier to the living terminal of the base polymer, may contain an unmodified polymer fraction. However, with respect to the first-order modified, hydrogenated polymer and the precursory first-order modified polymer used in the composition of the present invention, it is recommended that the amount of the modified polymer fraction in the modified polymer is preferably more than 30% by weight, more preferably 40% by weight or more, still more preferably 50% by weight or more, based on the weight of the modified polymer. The maximum amount of the modified polymer fraction is 100% by weight. When the amount of the modified polymer fraction is large, the interactions are effectively caused to occur between such a modified polymer and a reinforcing filler. The amount of the modified polymer fraction can be determined by a chromatography which is capable of separating the modified polymer and the unmodified polymer. Specifically, there can be mentioned a method in which a GPC is performed using a column packed with a polar substance (such as silica), which adsorbs only the modified polymers, together with an internal standard substance which is not adsorbed on such a column; and a method in which GPC of a polymer is performed prior to and after modification, and the amount of the modified polymer fraction is calculated, based on the change in the chromatogram and molecular weight of the polymer, the change occurring between the measurement prior to and the measurement after modification.

Examples of first-order modifiers used for producing the first-order modified, hydrogenated polymer of the present invention or a precursory first-order modified polymer include the modifiers described in Examined Japanese Patent Application Publication No. Hei 4-39495 (corresponding to U.S. Pat. No. 5,115,035). Especially preferred first-order modifiers are as follows:

tetraglycidyl-m-xylenediamine, tetraglycidyl-1,3-bisaminomethylcyclohexane, tetraglycidyl-p-phenylene-diamine, tetraglycidyldiaminodiphenylmethane, di-glycidylaniline, diglycidyl-o-toluidine, γ-glycidoxyethyltrimethoxysilane, γ-glycidoxypropyltrimethoxysilane, γ-glycidoxybutyltrimethoxysilane, γ-glycidoxypropyltriethoxysilane, γ-glycidoxypropyltripropoxysilane and γ-glycidoxypropyltributoxysilane; γ-glycidoxypropyltriphenoxysilane, γ-glycidoxypropylmethyldimethoxysilane, γ-glycidoxypropylethyldimethoxysilane, γ-glycidoxypropylethyldiethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropyldimethylmethoxysilane, γ-glycidoxypropyldiethylethoxysilane and γ-glycidoxypropyldimethylethoxysilane;

γ-glycidoxypropyldimethylphenoxysilane, γ-glycidoxypropyldiethylmethoxysilane, γ-glycidoxypropylmethyldiisopropenoxysilane, bis(γ-glycidoxypropyl)dimethoxysilane, bis(γ-glycidoxypropyl)diethoxysilane, bis(γ-glycidoxypropyl)dipropoxysilane, bis(γ-glycidoxypropyl)dibutoxysilane, bis(γ-glycidoxypropyl)diphenoxysilane, bis(γ-glycidoxypropyl)methylmethoxysilane and bis(γ-glycidoxypropyl)methylethoxysilane; bis(γ-glycidoxypropyl)methylpropoxysilane, bis(γ-glycidoxypropyl)methylbutoxysilane, bis(γ-glycidoxypropyl)methylphenoxysilane, tris(γ-glycidoxypropyl)methoxysilane, γ-methacryloxypropyltrimethoxysilane, γ-methacryloxypropyltriethoxysilane, γ-methacryloxymethyltrimethoxysilane, γ-methacryloxyethyltriethoxysilane, bis(γ-methacryloxypropyl)dimethoxysilane, tris(γ-methacryloxypropyl)methoxysilane, β-(3,4-epoxycyclohexyl)ethyl-trimethoxysilane and β-(3,4-epoxycyclohexyl)ethyl-triethoxysilane;

β-(3,4-epoxycyclohexyl)ethyl-tripropoxysilane, β-(3,4-epoxycyclohexyl)ethyl-tributoxysilane, β-(3,4-epoxycyclohexyl)ethyl-triphenoxysilane, β-(3,4-epoxycyclohexyl)propyl-trimethoxysilane, β-(3,4-epoxycyclohexyl)ethyl-methyldimethoxysilane, β-(3,4-epoxycyclohexyl)ethyl-ethyldimethoxysilane, β-(3,4-epoxycyclohexyl)ethyl-ethyldiethoxysilane, β-(3,4-epoxycyclohexyl)ethyl-methyldiethoxysilane, β-(3,4-epoxycyclohexyl)ethyl-methyldipropoxysilane and β-(3,4-epoxycyclohexyl)ethyl-methyldibutoxysilane; and β-(3,4-epoxycyclohexyl)ethyl-methyldiphenoxysilane, β-(3,4-epoxycyclohexyl)ethyl-dimethylmethoxysilane, β-(3,4-epoxycyclohexyl)ethyl-diethylethoxysilane, β-(3,4-epoxycyclohexyl)ethyl-dimethylethoxysilane, β-(3,4-epoxycyclohexyl)ethyl-dimethylpropoxysilane, β-(3,4-epoxycyclohexyl)ethyl-dimethylbutoxysilane, β-(3,4-epoxycyclohexyl)ethyl-dimethylphenoxysilane, β-(3,4-epoxycyclohexyl)ethyl-diethylmethoxysilane, and β-(3,4-epoxycyclohexyl)ethyl-methyldiisopropeneoxysilane.

Further, use can be made of the following first-order modifiers: N-substituted amino ketones, such as 4-dimethylaminobenzophenone, 4-diethylaminobenzophenone, 4-di-t-butylaminobenzophenone, 4-diphenylaminobenzophenone, 4,4'-bis(dimethylamino)benzophenone, 4,4'-bis(diethylamino)benzophenone, 4,4'-bis(di-t-butyl-amino)benzophenone, 4,4'-bis(diphenylamino)benzophenone, 4,4'-bis(divinylamino)benzophenone, 4-dimethylaminoacetophenone, 4-diethylaminoacetophenone, 1,3-bis(di-phenylamino)-2-propanone and 1,7-bis(methylethylamino)-4-heptanone;

N-substituted aminoaldehydes, such as 4-diethylaminobenzaldehyde and 4-divinylaminobenzaldehyde; N-substituted lactams, such as N-methyl-β-propiolactam, N-t-butyl-β-propiolactam, N-phenyl-β-propiolactam, N-methoxyphenyl-β-propiolactam, N-naphthyl-β-propiolactam, N-methyl-2-pyrrolidone, N-t-butyl-2-pyrrolidone, N-phenylpyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-piperidone, N-phenylpiperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-phenyl-3,3'-dimethyl-2-piperidone, N-methyl-ε-caprolactam, N-phenyl-ε-caprolactam, N-methoxyphenyl-ε-caprolactam, N-vinyl-ε-caprolactam, N-benzyl-ε-caprolactam, N-naphthyl-ε-caprolactam, N-methyl-ω-lauryl lactam, N-phenyl-ω-lauryl lactam, N-t-butyllauryl lactam, N-vinyl-ω-lauryl lactam and N-benzyl-ω-lauryl lactam; N-substituted ethyleneureas, such as 1,3-dimethyl-2-imidazolidinone, 1,3-diethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-methyl-2-imidazolidinone and 1,3-dimethyl-3,4,5,6-tetrahydropyrimidinone; polyglycidyl ethers of a polyhydric alcohol, such as ethylene glycol diglycidyl ether and glycerin triglycidyl ether; polyglycidyl ethers of an aromatic compound having 2 or more phenol groups, such as 4,4'-diglycidyl bisphenol A; polyepoxy compounds, such as 1,4-diglycidylbenzene, 1,3,5-triglycidylbenzene and polyepoxized liquid polybutadiene; and diglicidylamino compounds, such as tetraglycidyl m-xylenediamine, tetraglycidyl 1,3-bis(aminomethylcyclohexane), tetraglycidyl p-phenylenediamine, diglycidylaniline, diglycidyl aminomethylcyclohexane and diglycidyl o-toluidine.

Preferred example of a first-order modifier is a multifunctional compound having 2 or more epoxy groups and 1 or more nitrogen-containing group in the molecule thereof. More preferred example of a first-order modifier is a compound represented by the following formula:

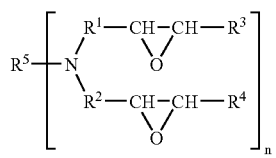

wherein each of $R^1$ and $R^2$ independently represents a $C_1$-$C_{10}$ hydrocarbon group, a $C_1$-$C_{10}$ ether or a $C_1$-$C_{10}$ hydrocarbon group containing a tertiary amine, each of $R^3$ and $R^4$ independently represents a hydrogen atom, a $C_1$-$C_{20}$ hydrocarbon group, a $C_1$-$C_{20}$ ether or a $C_1$-$C_{20}$ hydrocarbon group containing a tertiary amine, $R^5$ represents a $C_1$-$C_{12}$ hydrocarbon group, a $C_1$-$C_{12}$ ether, or a $C_1$-$C_{12}$ hydrocarbon group containing at least one functional group selected from the group consisting of a tertiary amine, an epoxy group, a carbonyl group and a halogen atom, and n represents an integer of 1 to 6.

With respect to the first-order modifier, it is recommended that the amount of the first-order modifier used for producing the modified polymer is from more than 0.5 equivalent to not more than 10 equivalents, preferably from more than 0.7 equivalent to not more than 5 equivalents, more preferably from more than 1 equivalent to not more than 4 equivalents, relative to one equivalent of the living terminal of the base polymer. In the present invention, the amount of the living terminal of the base polymer can be calculated from the number average molecular weight of the base polymer.

The first-order modified, hydrogenated polymer of the present invention can be obtained by hydrogenating the thus obtained first-order modified, unhydrogenated polymer in the below-mentioned manner. Further, when the precursory first-order modified polymer used as a precursor of the second-order modified polymer of the present invention is partially hydrogenated, the hydrogenation can be performed in the below-mentioned manner.

With respect to the hydrogenation catalyst, there is no particular limitation, and any of the conventional hydrogenation catalysts can be used. Examples of hydrogenation catalysts include:

(1) a carried, heterogeneous hydrogenation catalyst comprising a carrier (such as carbon, silica, alumina or diatomaceous earth) having carried thereon a metal, such as Ni, Pt, Pd or Ru;

(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum; and (3) a homogeneous hydrogenation catalyst, such as the so-called oraganometal complex of an organometal compound containing a metal, such as Ti, Ru, Rh or Zr. Specific examples of hydrogenation catalysts include those which are described in Examined Japanese Patent Publication Nos. Sho 42-8704 and Sho 43-6636, Examined Japanese Patent Publication No. Sho 63-4841 (corresponding to U.S. Pat. No. 4,501,857) and Examined Japanese Patent Publication No. Hei 1-37970 (corresponding to U.S. Pat. No. 4,673,714), and Examined Japanese Patent Publication Nos. Hei 1-53851 and Hei 2-9041. As preferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. As specific examples of titanocene compounds, there can be mentioned compounds, each independently having at least one ligand (e.g., biscyclopentadienyltitanium di-chloride and monopentamethylcyclopentadienyltitanium trichloride) having a (substituted) cyclopentadienyl skeleton, an indenyl skeleton or a fluorenyl skeleton. Examples of reductive organometal compounds include organic alkali metal compounds, such as an organolithium compound; an organomagnesium compound; an organoaluminum compound; an organoboron compound; and an organozinc compound.

The hydrogenation reaction is generally conducted at 0 to 200° C., preferably 30 to 150° C. The hydrogen pressure in the hydrogenation reaction is generally in the range of from 0.1 to 15 MPa, preferably from 0.2 to 10 MPa, more preferably from 0.3 to 7 MPa. The hydrogenation reaction time is generally in the range of from 3 minutes to 10 hours, preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

By the above-mentioned method, a solution of an unhydrogenated, first-order modified polymer in a solvent used, or a solution of a first-order modified, hydrogenated polymer in a solvent used is obtained. If desired, before the separation of the first-order modified polymer or the first-order modified, hydrogenated polymer, a catalyst residue may be separated from the solution. Examples of methods for separating the first-order modified polymer or the first-order modified, hydrogenated polymer from the solution include a method in which a polar solvent, such as acetone or alcohol (which is a poor solvent for the polymer), is added to the solution containing the polymer, thereby precipitating the polymer, followed by recovery of the polymer; a method in which the solution containing the polymer is added to hot water, while stirring, followed by removal of the solvent by steam stripping; and a method in which the solution containing the polymer is directly heated to evaporate the solvent.

Next, a second-order modifier having a functional group which is reactive to the functional group of the first-order modifier group (γ) of the first-order modified polymer is reacted with the first-order modified polymer, thereby obtaining a second-order modified polymer comprising a base polymer (β) and a functional group-containing modifier group (δ) bonded to the base polymer (β). The second-order modifier used for producing the second-order modified polymer is at least one member selected from the group consisting of a functional monomer and a functional oligomer.

The functional monomer used in the present invention is a modifier having a functional group which is reactive to the functional group of the first-order modifier group (γ) of the first-order modified polymer. The functional monomer preferably has at least one functional group selected from the group consisting of an amino group, a carboxyl group, an acid anhydride group, an isocyanate group, an epoxy group, a silanol group and an alkoxysilane group, more preferably at least one functional group selected from the group consisting of a carboxyl group, an acid anhydride group, an isocyanate group, an epoxy group, a silanol group and an alkoxysilane group.

Specific examples of functional monomers are as follows. Examples of functional monomers having a carboxyl group include aliphatic carboxylic acids, such as maleic acid, oxalic acid, succinic acid, adipic acid, azelaic acid, sebacic acid, dodecanedicarboxylic acid, carbalic acid, cyclohexanedicarboxylic acid and cyclopentanedicarboxylic acid; and aromatic carboxylic acids, such as terephthalic acid, isophthalic acid, o-phthalic acid, naphthalenedicarboxylic acid, biphenyldicarboxylic acid, trimesic acid, trimellitic acid and pyromellitic acid. Examples of functional monomers having an acid anhydride group include maleic anhydride, itaconic anhydride, pyromellitic anhydride, cis-4-cyclohexane-1,2-dicarboxylic acid anhydride, 1,2,4,5-benzenetetracarboxylic acid dianhydride and 5-(2,5-dioxytetrahydroxyfuryl)-3-methyl-3-cyclohexene-1,2-dicarboxylic acid anhydride. Examples of functional monomers having an isocyanate group include toluylene diisocyanate, diphenylmethane diisocyanate and multi-functional aromatic isocyanates. Examples of functional monomers having an alkoxysilane group include bis-(3-triethoxysilylpropyl)-tetrasulfane and ethoxysiloxane oligomers. Examples of functional monomers having an epoxy group include tetraglycidyl-1,3-bis-aminomethyl-cyclohexane, tetraglycidyl-m-xylenediamine, diglycidylaniline, ethylene glycol diglycidyl, propylene glycol diglycidyl and terephthalic acid diglycidyl ester acrylate.

In the present invention, especially preferred examples of functional monomers include a carboxylic acid having 2 or more carboxyl groups or an anhydride thereof; and crosslinking agents having 2 or more of a group selected from the group consisting of an acid anhydride group, an isocyanate group, an epoxy group, a silanol group or an alkoxysilane group. Specific examples of the especially preferred crosslinking agents include maleic anhydride, pyromellitic anhydride, toluylene diisocyanate and tetraglycidyl-1,3-bisaminomethylcyclohexane.

With respect to the functional oligomers used in the present invention, there is no particular limitation as long as the oligomers have a functional group which is reactive to the functional group (including a terminal functional group) of the first-order modifier group (γ) of the first-order modified polymer. Preferred examples of functional oligomers include oligomers having at least one functional group selected from the group consisting of an amino group, a carboxyl group, an acid anhydride group, an isocyanate group, an epoxy group, a silanol group and an alkoxysilane group.

The number average molecular weight of a functional oligomer is generally from 300 to 30,000, preferably from 500 to 15,000, more preferably from 1,000 to 20,000. The functional oligomer can be produced by a conventional method, for example by anionic polymerization, cationic polymerization, radical polymerization, condensation polymerization and addition polymerization.

Specific examples of functional oligomers include oligomers having at least one functional group mentioned above, such as a polybutadiene oligomer and a hydrogenation product thereof, a polyisoprene oligomer and a hydrogenation product thereof, a polyethylene oligomer, a polypropylene oligomer, a polyethylene oxide oligomer, a polypropylene oxide oligomer, an oligomeric ethylene oxide/propylene oxide copolymer, a saponification product of an oligomeric ethylene/vinyl acetate copolymer, silicone oil and an oligomeric copolymer obtained by copolymerizing a functional vinyl monomer having at least one of the above-mentioned functional group and another vinyl monomer copolymerizable therewith.

Specific examples of functional vinyl monomer having at least one of the above-mentioned functional group include glycidylacrylate, glycidylmethacrylate, β-methylglycidylacrylate, β-methylglycidylmethacrylate, allylglycidylether, monoglycidyl ester of maleic acid, monoglycidyl ester of itaconic acid and 3,4-epoxybutene. Further examples of functional vinyl monomer include 3,4-epoxy-3-methyl-1-butene, 3,4-epoxy-1-pentene, 3,4-epoxy-3-methylpentene, 5,6-epoxy-1-hexene, vinylcyclohexene monoxide, styrene P-glycidyl ether, hydroxystyrene, 2-hydroxyethyl methacrylate, 2-hydroxyethyl acrylate, 2-hydroxypropyl methacrylate, polyethylene glycol monomethacrylate, allylalcohol, maleic anhydride and itaconic anhydride.

Specific examples of vinyl monomers which are copolymerizable with the above-mentioned functional vinyl monomer include ethylene, $C_3$-$C_{12}$ α-olefins, such as propylene, 1-butene, isobutylene, 4-methyl-1-pentene, 1-octene, styrene, o-methylstyrene, p-methylstyrene, p-tert-butylstyrene, 1,3-dimethylstyrene, α-methylstyrene, vinylnaphthalene, vinylanthracene, vinyl acetate, vinyl chloride and acrylonitrile. Further examples of vinyl monomers include methacrylonitrile, methyl methacrylate, ethyl methacrylate, propyl methacrylate, isopropyl methacrylate, butyl methacrylate, isobutyl methacrylate, tert-butyl methacrylate, octyl methacrylate, 2-ethylhexyl methacrylate, methyl acrylate, ethyl acrylate, propyl acrylate, isopropyl acrylate, butyl acrylate, isobutyl acrylate, tert-butyl acrylate, octyl acrylate and 2-ethylhexyl acrylate. These vinyl monomers can be used individually or in combination.

Further, in the present invention, polyamide oligomers, polyester oligomers and polyurethane oligomers having a molecular weight in the above-mentioned range can be used as a functional oligomer.

The amount of the second-order modifier used for producing the second-order modified polymer of the present invention is from 0.3 to 10 moles, preferably from 0.4 to 5 moles, more preferably from 0.5 to 4 moles, relative to one equivalent of the functional group of the first-order modifier group (γ) of the first-order modified polymer.

There is no particular limitation with respect to the structure of the second-order modified polymer of the present invention, but the second-order modified polymer is preferably represented by a formula selected from the group consisting of the following formulae (VI) to (X):

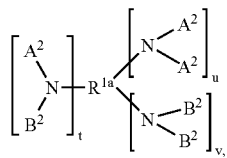  (VI)

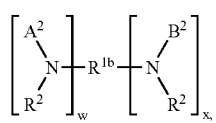  (VII)

$C^2 - NR^3 - D^2$,  (VIII)

$C^2 - D^2$, and  (IX)

$E^2 - F^2$,  (X)

wherein:

$A^2$ represents a unit which is represented by any one of the following formulae (a-2) and (b-2):

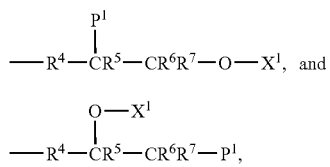

$B^2$ represents a unit which is represented by any one of the following formulae (c-2) to (e-2):

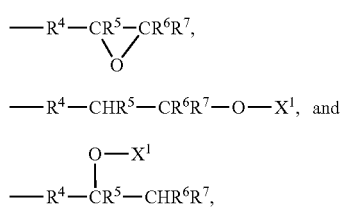

$C^2$ represents a unit which is represented by any one of the following formulae (f-2) to (h-2):

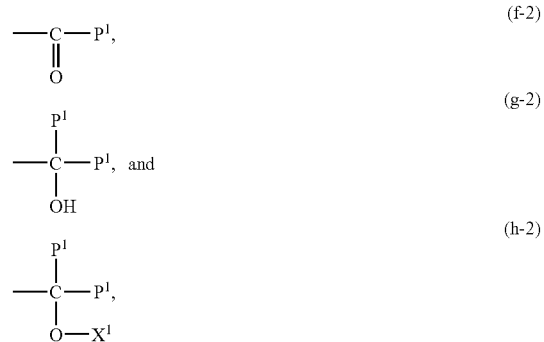

$D^2$ represents a unit which is represented by the following formula (i-2):

$$-R^8-NR^3-X^1 \quad (i\text{-}2)$$

$E^2$ represents a unit which is represented by the following formula (j-2):

$$-R^9-P^1, \text{ and} \quad (j\text{-}2)$$

$F^2$ represents a unit which is represented by any one of the following formulae (k-2) to (m-2):

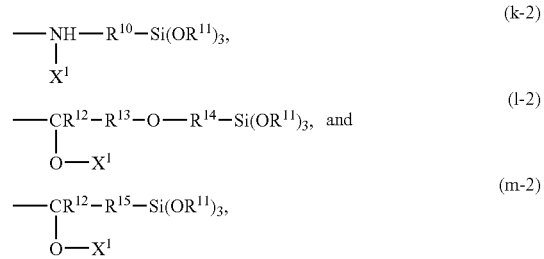

wherein:

$X^1$ represents a unit which is represented by any one of the following formulae (n-2) to (s-2):

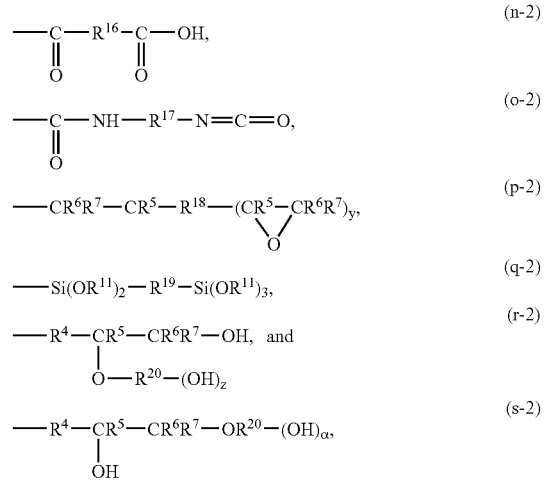

wherein, in the formulae (VI) to (VIII) and (a-2) to (s-2):
N represents a nitrogen atom, Si represents a silicon atom, O represents an oxygen atom, C represents a carbon atom, and H represents a hydrogen atom,
$P^1$ represents the base polymer,
$R^{1a}$ represents a trivalent aliphatic $C_1$-$C_{48}$ hydrocarbon group,
each of $R^{1b}$, $R^4$, $R^8$ to $R^{10}$ and $R^{13}$ to $R^{20}$ independently represents a $C_1$-$C_{48}$ alkylene group,
each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^3$, $R^4$, $R^8$ to $R^{10}$, $R^{13}$ to $R^{15}$ and $R^{17}$ to $R^{20}$ optionally, independently has at least one functional group selected from the group consisting of a hydroxyl group, an epoxy group, an amino group, a silanol group and a $C_1$-$C_{24}$ alkoxysilane group,
each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group,
wherein each of $R^{1a}$, $R^{1b}$, $R^2$ to $R^4$ and $R^8$ to $R^{20}$ optionally, independently has bonded thereto at least one atom selected from the group consisting of an oxygen atom, a nitrogen atom, a sulfur atom, and a silicon atom, the at least one atom being present in a linkage other than a hydroxyl group, an epoxy group, an amino group, a silanol group and an alkoxysilane group, and
each of t, u, v and x is independently an integer of 0 or more, provided that both t and u are not simultaneously 0, and each of w, y, z and α is independently an integer of 1 or more.

Further, the present invention provides a method for producing the second-order modified polymer by the use of the above-mentioned second-order modifier. Specifically, the present invention provides a method comprising the following steps (1) and (2):
(1) providing a first-order modified polymer comprising:
(β) a base polymer which is unhydrogenated or at least partially hydrogenated and which is at least one member selected from the group consisting of the above-mentioned polymers (β-1) to (β-3), and
(γ) a functional group-containing first-order modifier group bonded to the base polymer (β),
wherein the first-order modified polymer is produced by a process in which a base polymer having a living terminal is produced by a living anionic polymerization using an organolithium compound as a polymerization catalyst, and a functional group-containing first-order modifier is addition-bonded to the living terminal of the base polymer to obtain a first-order modified polymer, optionally followed by partial or complete hydrogenation of the obtained first-order modified polymer, and
(2) reacting a second-order modifier with the first-order modified polymer to thereby form (δ) a functional group-containing modifier group, wherein the second-order modifier has a functional group which is reactive to the functional group of the first-order modifier group (γ) of the first-order modified polymer, and wherein the second-order modifier is used in an amount of 0.3 to 10 moles, relative to one equivalent of the functional group of the first-order modifier group (γ) of the first-order modified polymer,
thereby obtaining a second-order modified polymer, wherein the functional group-containing first-order modifier group (γ) of the first-order modified polymer comprises at least one functional group represented by a formula selected from the group consisting of the above-mentioned formulae (a) to (m).

The second-order modified polymer of the present invention can be produced by conventional methods. Examples of conventional methods include a method using solution reaction (described below), a method using melt-kneading (described below) and a method (described below) in which the components are reacted with each other in a state in which they are dissolved or dispersed together in a solvent. Specifically, the second-order modified polymer can be produced by the following methods (1) to (4):

(1) The first-order modified polymer is produced by a process in which a base polymer having a living terminal is produced by a living anionic polymerization, and a functional group-containing first-order modifier is addition-bonded to the living terminal of the base polymer to obtain a first-order modified polymer, optionally followed by partial or complete hydrogenation of the obtained first-order modified polymer. Then, a second-order modifier (functional monomer and/or a functional oligomer) having a functional group which is reactive to the functional group of the first-order modifier group of the first-order modified polymer is reacted with the first-order modified polymer. The temperature at which the first-order modified polymer and the second-order modifier are reacted with each other is generally −10 to 150° C., preferably 30 to 120° C. The reaction time for this method varies depending on other conditions, but it is generally within 3 hours, preferably from several seconds to 1 hour.

(2) The first-order modified polymer is produced by a process in which a base polymer having a living terminal is produced by a living anionic polymerization, and a functional group-containing first-order modifier is addition-bonded to the living terminal of the base polymer to obtain a first-order modified polymer, optionally followed by partial or complete hydrogenation of the obtained first-order modified polymer. The obtained first-order modified polymer is treated with an active hydrogen-containing compound. Examples of active hydrogen-containing compounds include water; alcohols, such as methanol and ethanol; and inorganic acids, such as hydrochloric acid, sulfuric acid, phosphoric acid and carbonic acid. Then, a second-order modifier having a functional group which is reactive to the functional group of the first-order modifier group of the first-order modified polymer is reacted with the resultant first-order modified polymer. The reaction conditions for reacting the first-order modified polymer with the second-order modifier are the same as those for method (1) above.

(3) A first-order modified polymer or a hydrogenation product thereof is dissolved or dispersed in a solvent and, then, the first-order modified polymer and a second-order modifier having a functional group which is reactive to the functional group of the first-order modifier group of the first-order modified polymer are reacted with each other in a state in which they are dissolved or dispersed together in the solvent. There is no particular limitation with respect to the solvent as long as it is capable of dissolving or dispersing each of the components. Examples of solvents include hydrocarbon solvents, such as an aliphatic hydrocarbon, an alicyclic hydrocarbon and an aromatic hydrocarbon; halogen-containing solvents; ester solvents; and ether solvents. The reaction conditions for reacting the first-order modified polymer and the second-order modifier are the same as those for method (1) above.

(4) A first-order modified polymer or a hydrogenation product thereof is melt-kneaded with a second-order modifier having a functional group which is reactive to the functional group of the first-order modifier group of the first-order modified polymer to thereby effect a reaction between the first-order modified polymer and the second-order modifier. For example, the melt-kneading can be performed using a conventional mixing machine, such as a Banbury mixer, a single-screw extruder, a twin-screw extruder, a co-kneader or a multi-screw extruder. The melt-kneading temperature is generally in the range of from 50 to 250° C., preferably from 80 to 230° C., and the melt-kneading time is generally less than 3 hours, preferably from several seconds to 1 hour.

In each of the above-mentioned methods (1) to (3), the second-order modified polymer is obtained in the form of a solution. If desired, from the obtained solution, the catalyst residue may be removed and the polymer may be separated. Examples of methods for separating the polymer from the solution include a method in which a polar solvent (which is a poor solvent for the polymer), such as acetone or alcohol, is added to the solution containing the polymer, thereby precipitating the polymer, followed by recovery of the polymer; a method in which the solution containing the polymer is added to hot water, while stirring, followed by removal of the solvent by steam stripping; and a method in which the solution containing the polymer is directly heated to evaporate the solvent.

In the present invention, the first-order modified, hydrogenated polymer and the second-order modified polymer may contain, added thereto, any of the conventional stabilizers, such as phenol type stabilizers, phosphorus type stabilizers, sulfur type stabilizers and amine type stabilizers. There is no particular limitation with respect to the stabilizer used in the present invention, and conventional stabilizers can be used. Examples of conventional stabilizers include various antioxidants used in this technical field, such as phenol type stabilizers (e.g., 2,6-di-tert-butyl-4-methylphenol and n-octadecyl-3-(3',5'-di-tert-butyl-4'-hydroxyphenyl)propionate); organic phosphite compounds (e.g., tris-(2,4-di-tert-butylphenyl)phosphite); and sulfur-containing phenol type stabilizers (e.g., 4,6-bis[(octylthio)methyl]-o-cresol). These antioxidants can be used individually or in combination.

Each of the first-order modified, hydrogenated polymer and the second-order modified polymer of the present invention, as such or in combination with various additives, can be formed into a practically useful shaped article by using a conventional molding method. Examples of conventional molding methods include extrusion molding method, injection molding method, two-color injection molding method, sandwich molding method, hollow molding method, compression molding method, vacuum molding method, rotational molding method, powder slush molding method, foam molding method, laminate molding method, calender molding method and blow molding method. If desired, the thus obtained shaped article may be subjected to processing, such as foaming, pulverization, stretching, adhesion, printing, painting and plating. By employing such molding methods, the first-order modified, hydrogenated polymer, the second-order modified polymer and the polymer composition of the present invention can be individually formed into various shaped articles, such as a sheet, a film, injection molded articles having various morphologies, a blow molded article, an article made by air-pressure forming, a vacuum molded article, an extrusion molded article, a foam-molded article, a nonwoven fabric, a fibrous shaped article and a synthetic leather. The obtained shaped articles can be advantageously used in various fields, such as the fields of a raw material for food packaging; a material for medical equipment; a material for household electrical appliances and parts thereof; electric devices and parts thereof; automobile parts, industrial parts, household goods, toys, footwears and adhesives; and an asphalt modifier.

Specific examples of automobile parts include a side mall, a grommet, a knob, a weatherstrip, a window frame and a sealant therefor, an armrest, a door grip, a steering wheel grip, a console box, a headrest, an instrument panel, a bumper, a spoiler, and a storage cover for an air-bag device. Specific examples of medical instruments include a blood bag, a bag for storing platelets, a transfusion (drug solution) bag, a bag for artificial dialysis, a medical tubing, and a catheter. Further, the first-order modified, hydrogenated polymer, the second-order modified polymer or the polymer composition of the present invention can be used in a substrate for an adhesive tape, sheet or film; a substrate for a surface protection film, an adhesive for a surface protection film; an adhesive for a carpet; a stretch wrapping film; a heat shrinkable film; a coating material for a coated steel pipe; and a sealant.

In still another aspect of the present invention, there is provided a composition comprising component (A) selected from the group consisting of the first-order modified, hydrogenated polymer (A-1) of the present invention, the second-order modified polymer (A-2) of the present invention, and a first-order modified polymer (A-3) which is a precursor of the above-mentioned second-order modified polymer. Specifically, the present invention provides the following compositions <1> to <7>:

<1> A filler-containing modified polymer composition comprising component (A) and a reinforcing filler (B).

<2> A crosslinked, filler-containing modified polymer composition obtained by subjecting the above-mentioned filler-containing modified polymer composition to a crosslinking reaction in the presence of a vulcanizing agent.

<3> A modified polymer composition comprising component (A) and at least one polymer (D) selected from the group consisting of a thermoplastic resin other than component (A) and a rubbery polymer other than component (A).

<4> A crosslinked, modified polymer composition obtained by subjecting the above-mentioned modified polymer composition to melt-kneading in the presence of a vulcanizing agent.

<5> An adhesive composition comprising component (A) and a tackifier (E).

<6> An asphalt composition comprising component (A) and an asphalt (F).

<7> A styrene resin composition obtained by subjecting a raw material mixture to radical polymerization, the raw material mixture comprising component (A) and component (G) which is vinyl aromatic hydrocarbon monomer or a mixture of a vinyl aromatic hydrocarbon monomer and a comonomer copolymerizable with the vinyl aromatic hydrocarbon monomer.

It should be noted that the first-order modified polymer (A-3) comprises:

(β) a base polymer which is unhydrogenated or at least partially hydrogenated and which is at least one member selected from the group consisting of the following polymers (β-1) to (β-3):

(β-1) a conjugated diene polymer comprising conjugated diene monomer units, (β-2) a copolymer comprising conjugated diene monomer units and vinyl aromatic hydrocarbon monomer units, the copolymer having no or at least one polymer block (H) of the vinyl aromatic hydrocarbon monomer units, wherein the copolymer has a vinyl aromatic hydrocarbon block ratio of from 0 to less than 50% by weight, the vinyl aromatic hydrocarbon block ratio being defined as the percent by weight of the vinyl aromatic hydrocarbon monomer units contained in the at least one polymer block (H) of the vinyl aromatic hydrocarbon monomer units, based on the total weight of vinyl aromatic hydrocarbon monomer units contained in the copolymer as in the unhydrogenated state, and (β-3) a vinyl aromatic hydrocarbon polymer comprising vinyl aromatic hydrocarbon monomer units, and (γ) a functional group-containing first-order modifier group bonded to the base polymer (β), wherein the functional group-containing first-order modifier group (γ) of the first-order modified polymer (A-3) comprises at least one functional group represented by a formula selected from the group consisting of the above-mentioned formulae (a) to (m).

Hereinbelow, the compositions of the present invention are explained in detail.

<1> Filler-Containing Modified Polymer Composition

The present invention provides a filler-containing modified polymer composition comprising:

100 parts by weight of component (A) selected from the group consisting of the first-order modified, hydrogenated polymer (A-1) of the present invention, the second-order modified polymer (A-2) of the present invention, and a first-order modified polymer (A-3) which is a precursor of the above-mentioned second-order modified polymer, and 0.5 to 300 parts by weight of (B) a reinforcing filler. The filler-containing modified polymer composition of the present invention exhibits not only excellent properties with respect to impact resilience and low heat build-up, but also improved processability.

With respect to the reinforcing filler (B) used for producing the filler-containing modified polymer composition of the present invention, use can be made of conventional reinforcing fillers, such as a light calcium carbonate, a heavy calcium carbonate, various surface treated calcium carbonates, magnesium carbonate, barium sulfate, magnesium sulfate, calcium sulfate, a silica type inorganic filler, a metal oxide, a metal hydroxide and carbon. Of these, a silica type inorganic filler, a metal oxide, a metal hydroxide and carbon are preferred. These reinforcing fillers can be used individually or in combination.

The silica type inorganic filler used as the reinforcing filler is a solid particle composed mainly of $SiO_2$ or $Si_3Al$. Examples of silica type inorganic fillers include silica, clay, talc, mica, diatomaceous earth, wollastonite, montmorillonite, zeolite and a fibrous inorganic substance, such as a glass fiber. Further, a silica type inorganic filler having its surface rendered hydrophobic and a mixture of the silica type inorganic filler and a non-silica type inorganic filler may also be used as the reinforcing filler. Among the above-exemplified silica type inorganic fillers, preferred are silica and a glass fiber. Specific examples of silica include a white carbon produced by the dry process, a white carbon produced by the wet process, a synthetic silicate type white carbon and the so-called colloidal silica. The preferred average particle diameter of the silica type inorganic filler is generally in the range of from 0.01 to 150 μm. For achieving the effects of addition of the silica type inorganic filler, it is preferred to disperse the filler finely in the composition such that the average particle diameter of the silica type inorganic filler dispersed in the composition is in the range of from 0.05 to 1 μm, preferably from 0.05 to 0.5 μm.

The metal oxide used as the reinforcing filler is a solid particle composed mainly of $M_xO_y$ (wherein M represents a metal atom, and each of x and y independently represents an integer of from 1 to 6). Examples of metal oxides include alumina, titanium oxide, magnesium oxide and zinc oxide. Further, the metal oxide may be used in the form of a mixture thereof with an inorganic filler other than the metal oxide. The metal hydroxides used as the reinforcing filler are hydrated type inorganic fillers, such as aluminum hydroxide, magnesium hydroxide, zirconium hydroxide, hydrated aluminum silicate, hydrated magnesium silicate, basic magnesium carbonate, hydrotalcite, calcium hydroxide, barium hydroxide, hydrated tin oxide and hydrated inorganic metal compounds, such as borax. Of these, preferred are magnesium hydroxide and aluminum hydroxide.

Further, as the reinforcing filler, carbons (carbon blacks) of various grades, such as FT, SRF, FEF, HAF, ISAF and SAF, can be used. It is preferred that the carbon black used has a specific surface area (measured by the nitrogen adsorption method) of 50 mg/g or more, and a DBT (dibutyl phthalate) oil absorption of 80 ml/100 g or more.

In the filler-containing modified polymer composition of the present invention, the amount of the reinforcing filler (B) is in the range of from 0.5 to 300 parts by weight, preferably from 5 to 200 parts by weight, more preferably from 20 to 100 parts by weight, relative to 100 parts by weight of component (A) which is the modified polymer. When the amount of the reinforcing filler (B) contained in a polymer composition is less than 0.5 part by weight, the effect of adding the reinforcing filler becomes unsatisfactory. On the other hand, when the amount of the reinforcing filler (B) contained in a polymer composition is more than 300 parts by weight, the dispersibility of the reinforcing filler becomes lowered and the processability and the mechanical strength of such a polymer composition becomes poor.

Preferably, the filler-containing modified polymer composition of the present invention further comprises 0.01 to 20 parts by weight of (C) a modifier having a functional group which is reactive to the functional group of the modifier group of component (A), wherein the modifier (C) is at least one member selected from the group consisting of a functional monomer and a functional oligomer. When component (A) is the first-order modified, hydrogenated polymer (A-1) or the first-order modified polymer (A-3), a second-order modifier can be added to the composition so that the polymer contained in the final composition becomes a second-order modified polymer. When component (A) is the second-order modified polymer (A-2), a third-order modifier can be added to the composition so as to further modify the second-order modified polymer contained in the final composition. The above-mentioned functional monomers and functional oligomers can be used as the second-order modifier or the third-order modifier.

The filler-containing modified polymer composition may further contain a silane coupling agent. The silane coupling agent is used to strengthen the interaction between the modified polymer (A) and the reinforcing filler (B), and is a compound having a group which exhibits an affinity or bonding ability to either or both of the modified polymer (A) and the reinforcing filler (B). Specific examples of silane coupling agents include bis[3-(triethoxysilyl)propyl]tetrasulfide, bis[3-(triethoxysilyl)propyl]disulfide, bis-[2-(triethoxysilyl)

ethyl]tetrasulfide, 3-mercaptopropyl-trimethoxysilane, 3-mercaptopropyl-methyldimethoxysilane, 3-triethoxysilylpropyl-N,N-dimethylthiocarbamoyltetrasulfide, 3-triethoxysilylpropylbenzothiazoletetrasulfide, vinyltrimethoxysilane, vinyltriethoxysilane, 2-(3,4-epoxycyclohexyl)-ethyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane and 3-isocyanatepropyltriethoxysilane. As a preferred example of the silane coupling agent, there can be mentioned a compound having a polysulfide linkage containing a silanol group or an alkoxysilane in combination with two or more sulfur atoms, wherein any of the sulfur atoms may be present in the form of a mercapto group. Specific examples of such preferred silane coupling agents include bis[3-(triethoxysilyl)propyl]tetrasulfide, bis[3-(triethoxysilyl)propyl]disulfide, bis[2-(triethoxysilyl)ethyl]tetrasulfide, 3-mercaptopropyl-trimethoxysilane, 3-mercaptopropyl-methldimethoxysilane, 3-triethoxysilylpropyl-N,N-dimethylthiocarbamoyltetrasulfide and 3-triethoxysilylpropylbenzothiazoletetrasulfide. The amount of the silane coupling agent is generally in the range of from 0.1 to 30% by weight, preferably from 0.5 to 20% by weight, more preferably from 1 to 15% by weight, based on the weight of the reinforcing filler (B).

In the present invention, for improving the processability of the filler-containing modified polymer composition, a rubber-softening agent may be added. As the rubber-softening agent, it is suitable to use a mineral oil, or a liquid or low molecular weight synthetic softening agent. It is especially preferred to use a mineral oil type softening agent, such as a process oil or extender oil, which is generally used for softening a rubber, for increasing the volume of a rubber or for improving the processability of a rubber. The mineral oil type softening agent is a mixture of an aromatic compound, a naphthene and a chain paraffin. With respect to the mineral oil type softening agents, a softening agent in which the number of carbon atoms constituting the paraffin chains is 50% or more (based on the total number of carbon atoms present in the softening agent) is generally referred to as a "paraffin type softening agent"; a softening agent in which the number of carbon atoms constituting the naphthene rings is 30 to 45% (based on the total number of carbon atoms present in the softening agent) is generally referred to as a "naphthene type softening agent"; and a softening agent in which the number of carbon atoms constituting the aromatic rings is more than 30% (based on the total number of carbon atoms present in the softening agent) is generally referred to as an "aromatic type softening agent". In the present invention, a naphthene type softening agent and/or paraffin type softening agent is preferred. The reinforcing filler-containing composition may also contain a synthetic softening agent, such as a polybutene and a low molecular weight polybutadiene. However, the above-mentioned mineral oil type softening agent is more preferred, in view of the effect of using the softening agent in the composition. The amount of the rubber-softening agent used in the reinforcing filler-containing composition is generally in the range of from 10 to 100 parts by weight, preferably from 10 to 90 parts by weight, more preferably from 30 to 90 parts by weight, relative to 100 parts by weight of component (A). When the amount of the rubber-softening agent exceeds 100 parts by weight, the rubber-softening agent is likely to bleed out from the composition, thereby leading to a danger that the surface tack of the composition occurs.

In the present invention, a modified polymer can be used in combination with a rubbery polymer other than the modified polymer (A). As the specific examples of the rubbery polymer, use can be made of the rubber polymers mentioned as component (D) in connection with item <3> below. When a rubbery polymer is used in combination with the modified polymer, the rubbery polymer is generally used in an amount of from 5 to 400 parts by weight, preferably 5 to 200 parts by weight, more preferably 10 to 100 parts by weight, relative to 100 parts by weight of the modified polymer (A).

In the present invention, if desired, an additive may be added to the filler-containing modified polymer composition comprising component (A) and a reinforcing filler (B) so long as the properties of the filler-containing modified polymer composition are not harmfully affected. For example, in the present invention, the additives as described in "Gomu Purasuchikku Haigou Yakuhin (Additives for Rubber and Plastic)" (Rubber Digest Co., Ltd., Japan) can be used. Examples of additives include a softening agent, a thermal stabilizer, an antistatic agent, a weathering stabilizer, an antioxidant, a filler, a coloring agent and a lubricant. Examples of softening agents that may be used for controlling the hardness and fluidity of the final product include a liquid paraffin, a castor oil and a linseed oil. The softening agent may be added just before or during the kneading of the components for the filler-containing modified polymer composition, or may be incorporated into the modified polymer used as component (A) during the production thereof.

With respect to the method for mixing the modified polymer (A) and the reinforcing filler (B), and optionally other components, there is no particular limitation, and any of the conventional methods can be employed. For example, the filler-containing modified polymer composition of the present invention can be produced by melt-kneading method using a conventional mixing machine, such as an open roll, a Banbury mixer, a kneader, a single-screw extruder, a twin-screw extruder, a multi-screw extruder, or a method in which the components for the composition are added to a solvent, to thereby obtain a solution or dispersion of a mixture of the components in the solvent, followed by heating to remove the solvent. From the viewpoint of productivity of the composition and uniform mixing of the components of the composition, it is preferred to use the melt-kneading method using a roll, a Banbury mixer, a kneader or an extruder. When preparing the filler-containing modified polymer composition, the components contained in the composition can be mixed either all at once or in parts.

<2> Crosslinked, Filler-Containing Modified Polymer Composition

The present invention provides a crosslinked, filler-containing modified polymer composition obtained by subjecting the above-mentioned filler-containing modified polymer composition <1> to a crosslinking reaction in the presence of a vulcanizing agent.

Examples of vulcanizing agents include a radical generator, such as an organic peroxide and an azo compound, an oxime compound, a nitroso compound, a polyamine compound, sulfur and a sulfur-containing compound (such as sulfur monochloride, sulfur dichloride, a disulfide compound and a polymeric polysulfide compound). The vulcanizing agent is generally used in an amount of from 0.01 to 20 parts by weight, preferably 0.1 to 15 parts by weight, relative to 100 parts by weight of component (A) (i.e., a modified polymer).

Examples of organic peroxides used as the vulcanizing agent include dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tertbutylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butyl cumyl peroxide. Among the above-mentioned organic peroxides, from the viewpoint of low odor and scorch stability, preferred are 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate and di-tert-butyl peroxide.

In the above-mentioned vulcanization reaction, a vulcanization accelerator may be used in a desired amount. Examples of vulcanization accelerators include a sulphenic amide type accelerator, a guanidine type accelerator, a thiuram type accelerator, an aldehyde-amine type accelerator, an aldehyde-ammonia type accelerator, a thiazole type accelerator, a thiourea type accelerator and a dithiocarbamate type accelerator. An auxiliary vulcanizing agent, such as zinc oxide and stearic acid, may also be used in a desired amount.

Further, when the above-mentioned organic peroxide is used for crosslinking (vulcanizing) the reinforcing filler-containing composition, a vulcanization accelerator can be used in combination with the organic peroxide. Examples of vulcanization accelerators which may be used in combination with the organic peroxide include sulfur; auxiliaries for a peroxide crosslinking agent, such as p-quinone dioxime, p,p'-dibenzoylquinone dioxime, N-methyl-N-4-dinitrosoaniline, nitrosobenzene, diphenylguanidine and trimethylolpropane-N,N'-m-phenylene dimaleimide; divinyl benzene; triallyl cyanurate; multifunctional methacrylate monomers, such as ethyleneglycol dimethacrylate, diethyleneglycol dimethacrylate, polyethyleneglycol dimethacrylate, trimethylol propane trimethacrylate and allyl methacrylate; multifunctional vinyl monomers, such as vinyl butylate and vinyl stearate. The vulcanization accelerator as mentioned above is generally used in an amount of from 0.01 to 20 parts by weight, preferably from 0.1 to 15 parts by weight, relative to 100 parts by weight of component (A) (i.e., a modified polymer).

The above-mentioned vulcanization reaction can be performed by a conventional method. For example, with respect to the reaction temperature, the vulcanization reaction may be conducted at 120 to 200° C., preferably 140 to 180° C.

The crosslinked, filler-containing modified polymer composition obtained by subjecting the filler-containing modified polymer composition to a crosslinking reaction may be used for producing a material for interior and exterior parts of automobiles, a rubber cushion, a belt, a footwear, a foam, an industrial article, a tire and the like, taking advantage of its characteristics.

<3> Modified Polymer Composition

The present invention provides a modified polymer composition comprising:

1 to 99 parts by weight, relative to 100 parts by weight of the total of components (A) and (D), of component (A) selected from the group consisting of the first-order modified, hydrogenated polymer (A-1) of the present invention, the second-order modified polymer (A-2) of the present invention, and a first-order modified polymer (A-3) which is a precursor of the above-mentioned second-order modified polymer, and 99 to 1 part by weight, relative to 100 parts by weight of the total of components (A) and (D), of (D) at least one polymer selected from the group consisting of a thermoplastic resin other than component (A) and a rubbery polymer other than component (A). The modified polymer composition comprising the modified polymer of the present invention exhibits high compatibility with at least one component (D) selected from the group consisting of a thermoplastic resin and a rubbery polymer, and the resultant composition exhibits excellent mechanical strength.

Component (D) used for producing the modified polymer composition of the present invention is at least one polymer selected from the group consisting of a thermoplastic resin other than component (A) and a rubbery polymer other than component (A). It is preferred that the thermoplastic resin as component (D) is a functional group-containing thermoplastic resin having a functional group which is reactive to the functional group of the modifier group of component (A). Specific examples of functional group-containing thermoplastic resins include a polyester resin; a polyamide resin; a polycarbonate resin; a polyurethane resin; a polymer containing in the main chain thereof an imide linkage, such as polyimide, polyaminobismaleimide (polybismaleimide), a bismaleimide triazine resin or a polyimide resin (e.g., polyamide-imide or polyether imide); a polyoxymethylene resin, such as a homopolymer of formaldehyde or trioxane, or a copolymer of formaldehyde or trioxane and at least one member selected from the group consisting of an aldehyde other than formaldehyde or trioxane, a cyclic ether, an epoxide, an isocyanate and a vinyl compound; a polysulfone resin, such as polyether sulfone or polyallylsulfone; a polyphenylene ether resin, such as poly(2,6-dimethyl-1,4-phenylene) ether; a polyphenylene sulfide resin, such as polyphenylene sulfide or poly-4,4'-diphenylene sulfide; a polyallylate resin which is a condensation polymer produced from bisphenol A and phthalic acid; and a polyketone resin. Further examples of functional group-containing thermoplastic resins include a copolymer of a vinyl aromatic hydrocarbon monomer with at least one vinyl monomer (other than the vinyl aromatic hydrocarbon monomer), such as vinyl acetate, acrylic acid and an ester thereof (e.g., methyl acrylate), acrylonitrile and methacrylonitrile; an acrylonitrile/butadiene/styrene copolymer resin (ABS); a methacrylate/butadiene/styrene copolymer resin (MBS); a copolymer of ethylene with a comonomer copolymerizable with ethylene, which has an ethylene monomer unit content of 50% by weight or more (e.g., an ethylene/vinyl acetate copolymer or a hydrolysis product thereof); a polyethylene resin (e.g., an ethylene/acrylic acid ionomer); a copolymer of propylene with a comonomer copolymerizable with propylene, which has a propylene monomer unit content of 50% by weight or more, such as a polypropylene resin (e.g., a propylene/ethyl acrylate copolymer); and a polyvinyl acetate resin which is a copolymer of vinyl acetate with a comonomer copolymerizable with vinyl acetate, which has a vinyl acetate monomer unit content of 50% by weight or more, or a hydrolysis product thereof. Still further examples of functional group-containing thermoplastic resins include a polymer of acrylic acid or an ester or amide thereof; a polymer of methacrylic acid or an ester or amide thereof; a polyacrylate resin which is a copolymer of such a (meth)acrylic monomer with a comonomer copolymerizable therewith and which has an acrylic monomer unit content of 50% by weight or more; a polymer of acrylonitrile and/or methacrylonitrile; a nitrile resin which is a copolymer of (meth)acrylonitrile with a comonomer copolymerizable with (meth)acrylonitrile and which has a (meth)acrylonitrile monomer unit content of 50% by weight or more; a polyoxybenzoyl type polymer, such as a homopolymer or copolymer obtained by polycondensation of p-hydroxybenzoic acid, terephthalic acid, isophthalic acid, 4,4'-dihydroxydiphenyl or derivatives thereof.

Especially preferred functional group-containing thermoplastic resins usable as component (D) are a polyester resin, a polyamide resin, a polycarbonate resin and a polyurethane resin. The above-mentioned thermoplastic resins can be used individually or in combination. When such a functional group-containing thermoplastic resin is used as component (D), the functional group-containing thermoplastic resin reacts with the functional group of the modified polymer (A) and the resultant modified polymer composition exhibits improved compatibility.

The polyester resin used as component (D) in the present invention contains in the molecule thereof an ester linkage. A representative example of such polyester resin is a polyester which has a structure obtained by a polycondensation of a dicarboxylic acid with a glycol, specifically a structure obtained by subjecting at least one member selected from a group consisting of a dicarboxylic acid, a lower ester thereof, an acid halide thereof and an anhydride thereof, to a polycondensation with a glycol. Examples of aromatic dicarboxylic acids or aliphatic dicarboxylic acids used as a raw material for the polyester resin include oxalic acid, malonic acid, succinic acid, glutaric acid, pimelic acid, suberic acid, adipic acid, sebacic acid, azelaic acid, 1,9-nonanedicarboxylic acid, 1,10-decanedicarboxylic acid, 1,16-hexadecanedicarboxylic acid, terephthalic acid, isophthalic acid, p,p'-dicarboxydiphenyl, p-carboxyphenoxyacetic acid and 2,6-naphthalene dicarboxylic acid. These dicarboxylic acids can be used individually or in combination. Of these, preferred are terephthalic acid and isophthalic acid.

With respect to the glycol (also called "diol") used as the other raw material for the polyester resin, there are two types of glycols, namely aliphatic glycols and aromatic glycols, such as ethylene glycol, 1,3-propanediol, 1,2-propanediol, 1,4-butanediol, 1,6-hexanediol, 1,4-cyclohexanediol, 1,10-decanediol, neopentyl glycol and p-xylene glycol. These glycols (diols) can be used individually or in combination. Of these, preferred are ethylene glycol and 1,4-butanediol.

As examples of polyester resins other than those mentioned above, there can be mentioned polylactones obtained by a ring-opening polymerization of a lactone, such as pivalolactone, β-propiolactone, ε-caprolactone and the like. The above-mentioned polyester resins include a polyester resin having a hydroxyl group or a carboxyl group at the terminal thereof and a polyester resin obtained by reacting such a polyester resin with a monofunctional alcohol or a monofunctional carboxylic acid to thereby inactivate the functional group. In the present invention, the polyester resin used as component (D) is preferably a resin having a functional group at all or part of the terminals thereof, wherein the functional group is reactive to the functional group of component (A). When such a functional group-containing polyester resin is used as component (D), the functional group-containing polyester resin reacts with the functional group of the modified polymer (A) and the resultant modified polymer composition exhibits improved compatibility. The above-mentioned polyester resins can be used individually or in combination.

With respect to examples of polyamide resins used as component (D) in the present invention, there can be mentioned a polycondensate of a dicarboxylic acid and a diamine, a polycondensate of an α-aminocarboxylic acid, and a ring-opening polymerization product of a lactam. Specific examples of such polyamide resins include nylon-4,6, nylon-6, nylon-6,6, nylon-6,10, nylon-11, nylon-12 and copolymers thereof (e.g., a nylon-6/nylon-6,6 copolymer and a nylon-6/nylon-12 copolymer). It is preferred that these polyamide resins have a melting temperature in the range of from 150 to 270° C. When an improved processability of the polymer composition is desired, it is more preferred that the melting temperature is 260° C. or lower. The above-mentioned polyamide resins can be used individually or in combination.

The polycarbonate resin used as component (D) in the present invention is a polymer which can be obtained by the reaction between a divalent or polyvalent phenolic compound and a carbonate precursor. There are a variety of divalent phenolic compounds; for example, 2,2-bis(4-hydroxyphenyl)propane (so-called "bisphenol A"), bis(4-hydroxyphenyl)methane, 2,2-bis(4-hydroxy-3,5-dimethylphenyl)propane, 2,2-bis(4-hydroxy-3-methyl-phenyl)propane, bis(4-hydroxyphenyl)sulfone, 1,1-bis(4-hydroxyphenyl)ethane, 1,1-bis(4-hydroxyphenyl) cyclohexane and 1,1-bis(4-hydroxyphenyl)-3,3,5-trimethylcyclohexane. Preferred examples of divalent phenolic compounds include bis(4-hydroxyphenyl)alkanes, especially bisphenol A. These divalent phenolic compounds can be used individually or in combination. With respect to the carbonate precursor, for example, there can be mentioned a carbonyl halide, a carbonyl ester and a haloformate. More specifically, the carbonate precursor is at least one member selected from the group consisting of phosgene, diphenyl carbonate and a dihaloformate of a divalent phenolic compound.

The viscosity average molecular weight of the polycarbonate resin used in the present invention is preferably 10,000 or more, from the viewpoint of improving the strength and heat resistance of the polymer composition. From the viewpoint of improving the processability of the polymer composition, it is preferred that the viscosity average molecular weight of the polycarbonate resin is 60,000 or less, more advantageously from 12,000 to 45,000, still more advantageously from 13,000 to 35,000. In the present invention, the viscosity average molecular weight (M) is calculated from the specific viscosity value, as measured with respect to a solution obtained by dissolving 0.7 g of the polycarbonate resin in 100 ml of a methylene chloride at 20° C.

The polyurethane resin used as component (D) in the present invention is obtained by a polyaddition reaction between a diisocyanate and a diol and contains, for example, a polymer block (as a soft segment) comprising a polyol (i.e., polyester or polyether) and a polymer block (as a hard segment) comprising a diisocyanate and a glycol. Examples of polyester diols used as a raw material for the polyurethane resin include poly(1,4-butylene adipate), poly(1,6-hexane adipate) and polycaprolactone. On the other hand, examples of polyether diols used as a raw material for the polyurethane resin include polyethylene glycol, polypropylene glycol and polyoxytetramethylene glycol. Examples of glycols used as a raw material for the polyurethane resin include ethylene glycol, 1,4-butanediol and 1,6-hexanediol. Examples of diisocyanates used as a raw material for the polyurethane resin include aromatic diisocyanates, alicyclic diisocyanates and aliphatic diisocyanates, such as toluylene diiusocyanate, 4,4'-diphenylmethane diisocyanate, hexamethylene diisocyanate and isophorone diisocyanate.

The weight average molecular weight of the polyurethane resin used in the present invention is preferably in the range of from 5,000 to 500,000, more preferably from 10,000 to 300, 000, from the viewpoint of obtaining a polymer composition which exhibits excellent mechanical properties.

Examples of thermoplastic resins other than the functional group-containing thermoplastic resins which can be used as component (D) in the present invention include a block copolymer of a conjugated diene monomer and a vinyl aromatic hydrocarbon monomer; a polymer of the above-mentioned vinyl aromatic hydrocarbon monomer; a copolymer of the above-mentioned vinyl aromatic hydrocarbon monomer with at least one vinyl monomer (other than the vinyl aromatic hydrocarbon monomer), such as ethylene, propylene, butylene, vinyl chloride and vinylidene chloride; a rubber-modified styrene resin (HIPS); ethylene polymers, such as polyethylene, a copolymer of ethylene with a comonomer copolymerizable with ethylene, which has an ethylene content of 50% by weight or more (e.g., an ethylene/propylene copolymer, an ethylene/butylene copolymer, an ethylene/hexene copolymer or an ethylene/octene copolymer,) and a chlorinated polyethylene; propylene polymers, such as polypropylene, a copolymer of propylene with a comonomer copolymerizable with propylene, which has a propylene content of 50% by weight or more (e.g., a propylene/ethylene copolymer) and a chlorinated polypropylene; butene polymers, such as a polybutene resin and a copolymer of 1-butene with a comonomer copolymerizable with 1-butene, which has a 1-butene content of 50% by weight or more; vinyl chloride polymers, such as a polyvinyl chloride resin, a polyvinylidene chloride resin and a copolymer of vinyl chloride and/or vinylidene chloride with at least one comonomer copolymerizable with vinyl chloride and/or vinylidene chloride, which has a vinyl chloride and/or vinylidene chloride content of 50% by weight or more; polymeric straight chain hydrocarbon compounds in which all or part of the hydrogen atoms in the hydrocarbon compound is replaced by a fluorine atom, such as fluororesins (e.g., polytetrafluoroethylene, tetrafluoroethylene/perfluoroalkylvinylether copolymer, tetrafluoroethylene/hexafluoropropylene copolymer, polychlorotrifluoroethylene, tetrafluoroethylene/ethylene copolymer, chlorotrifluoroethylene/ethylene copolymer, polyvinylidene fluoride and polyvinyl fluoride) and polybutadiene resins, such as 1,2-polybutadiene and trans-polybutadiene. The number average molecular weight of the above-mentioned thermoplastic resins is preferably 1,000 or more, more preferably in the range of from 5,000 to 5,000,000, still more preferably in the range of from 10,000 to 1,000,000. These thermoplastic resins can be used individually or in combination.

Examples of rubbery polymers usable as component (D) include a conjugated diene rubber and a hydrogenation product thereof (other than the modified polymer (A) of the present invention); a random copolymer rubber produced from a conjugated diene monomer and a vinyl aromatic hydrocarbon monomer and a hydrogenation product thereof (other than the modified polymer (A) of the present invention); a block copolymer rubber produced from a conjugated diene monomer and a vinyl aromatic hydrocarbon monomer and a hydrogenation product thereof (other than the modified polymer (A) of the present invention); a polymer rubber containing one or no double bond; and a natural rubber. Specific examples of such rubbery polymers include a butadiene rubber and a hydrogenation product thereof; an isoprene rubber and a hydrogenation product thereof; styrene type elastomers, such as a styrene/butadiene rubber and a hydrogenation product thereof (other than the modified hydrogenated copolymer (a) of the present invention), a styrene/butadiene block copolymer and a hydrogenation product thereof and a styrene/isoprene block copolymer and a hydrogenation product thereof; and acrylonitrile/butadiene rubber and a hydrogenation product thereof. Specific examples of a polymer rubber containing one or no double bond include olefin type elastomers, such as an ethylene/propylene rubber, an ethylene/propylene/diene rubber, an ethylene/butene/diene rubber, an ethylene/butene rubber, an ethylene/hexene rubber and an ethylene/octene rubber; a butyl rubber; a brominated butyl rubber; an acrylic rubber; a fluororubber; a silicone rubber; a chlorinated polyethylene rubber; an epichlorohydrin rubber; an α, β-unsaturated nitrile/acrylic ester/conjugated diene copolymer rubber; a urethane rubber and a polysulfide rubber. Each of these rubbery polymers may be modified by introducing thereto a functional group (thereby obtaining a functional group-containing rubbery polymer). The above-mentioned rubbery polymers can be used individually or in combination.

Examples of functional group-containing rubbery polymer include a rubbery polymer having bonded thereto a group containing at least one functional group selected from the group consisting of a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carbonic ester group, an amide group, a sulfonic acid group, a sulfonic ester group, a phosphate group, a phosphoric ester group, an amino group, an imino group, a nitrile group, a pyridyl group, a quinoline group, an epoxy group, a thioepoxy group, a sulfide group, an isocyanate group, an isothiocyanate group, a silanol group, an alkoxysilane, a halogenated silica group, a halogenated tin group, an alkoxytin group and a phenyltin group.

With respect to the amounts of component (A) and component (D) which is at least one member selected from the group consisting of the thermoplastic resin and the rubbery polymer, the component (A)/component (D) weight ratio is in the range of from 1/99 to 99/1, preferably from 2/98 to 90/10, more preferably from 5/95 to 60/40, still more preferably from 10/90 to 40/60. The component (A)/component (D) weight ratio may be appropriately determined so that the modified polymer composition exhibits the advantageous properties of each component at a maximum level.

Further, it is preferred that the modified polymer composition of the present invention further comprises 0.01 to 20 parts by weight, relative to 100 parts by weight of the total of components (A) and (D), of (C) a modifier having a functional group which is reactive to the functional group of the modifier group of the modified polymer (A), wherein the modifier (C) is at least one member selected from the group consisting of a functional monomer and a functional oligomer. When component (A) is the first-order modified, hydrogenated polymer (A-1) or the first-order modified polymer (A-3), a second-order modifier can be added to the composition so that the polymer contained in the final composition becomes a second-order modified polymer. When component (A) is the second-order modified polymer (A-2), a third-order modifier can be added to the composition so as to further modify the second-order modified polymer contained in the final composition. The above-mentioned functional monomers and functional oligomers can be used as the second-order modifier or the third-order modifier. From the viewpoint of mechanical strength and impact resistance of the modified polymer composition, the amount of the modifier (C) is 0.01 part by weight or more, relative to 100 parts by weight of the total of components (A) and (D). From the viewpoint of obtaining the desired effect, the amount of the modifier (C) is 20 parts by weight or less, relative to 100 parts by weight of the total of components (A) and (D). The amount of the modifier (C) is preferably 0.02 to 10 parts by weight, more preferably 0.05 to 7 parts by weight, relative to 100 parts by weight of the total of components (A) and (D).

In the present invention, if desired, an additive may be added to the modified polymer composition. With respect to the additive, there is no particular limitation, and any additives which are conventionally used in thermoplastic resins or rubbery polymers can be used. Specific examples of additives include reinforcing fillers (B), silane coupling agents and rubber softening agents mentioned above; inorganic fillers; pigments; lubricants; mold release agents; softening agents and plasticizers; antioxidants, such as a hindered phenol type antioxidant and a phosphorus type thermal stabilizer; hindered amine type light stabilizers; benzotriazole type ultraviolet absorbers; flame retardants; antistatic agents; reinforcing agents, such as an organic fiber, a glass fiber, a carbon fiber and a metal whisker; coloring agents; mixtures thereof; and the additives as described in "Gomu Purasuchikku Haigou Yakuhin (Additives for Rubber and Plastic)" (Rubber Digest Co., Ltd., Japan).

With respect to the method for producing the modified polymer composition of the present invention, there is no particular limitation, and any of the conventional methods can be employed. For example, the modified polymer composition of the present invention can be produced by melt-kneading method using a conventional mixing machine, such as a Banbury mixer, a single-screw extruder, a twin-screw extruder, a co-kneader, a multi-screw extruder, or a method in which the components for the composition are added to a solvent, to thereby obtain a solution or dispersion of a mixture of the components in the solvent, followed by heating to remove the solvent. From the viewpoint of productivity of the composition and uniform mixing of the components of the composition, it is preferred to use the melt-kneading method using an extruder.

<4> Crosslinked, Modified Polymer Composition

The present invention provides a crosslinked, modified polymer composition obtained by subjecting the modified polymer composition of item <3> above to melt-kneading in the presence of a vulcanizing agent.

The crosslinked, modified polymer composition of the present invention is a composition prepared by the so-called "dynamic crosslinking" method. The thermoplastic resin and/or the rubbery polymer used as component (D) of the modified polymer composition can be vulcanized together with the modified polymer in the presence of a vulcanizing agent or, alternatively, component (D) can be added to a modified polymer after performing the dynamic crosslinking of the modified polymer.

The dynamic crosslinking method used in the present invention is a method in which components (including a crosslinking agent) for a desired crosslinked product are melt-kneaded at a temperature at which a crosslinking reaction occurs, so as to effect the mixing of components and the crosslinking reaction simultaneously. The details of this method are described in A. Y. Coran et al., Rub. Chem. and Technol. vol. 53, pp. 141-(1980). In the dynamic crosslinking method, the crosslinking reaction is performed by using an enclosed kneader, such as a Banbury mixer or a pressurizing kneader, or a single-screw or twin-screw extruder. The kneading is generally conducted at 130 to 300 ° C., preferably 150 to 250° C., for 1 to 30 minutes.

In the dynamic crosslinking method, any of the vulcanizing agents exemplified in item <2> above can be used as the vulcanizing agent, and an organic peroxide or a phenol resin type crosslinking agent is generally used. Further, a vulcanization accelerator, an auxiliary vulcanizing agent and a multifunctional vinyl monomer exemplified in item <2> above can be used in combination with the vulcanizing agent during the dynamic crosslinking.

In the present invention, the amount of the vulcanizing agent is generally in the range of from 0.01 to 15 parts by weight, preferably from 0.04 to 10 parts by weight, relative to 100 parts by weight of the total of components (A) and (D).

The crosslinked composition of the present invention, if desired, may further contain an additive mentioned in item <3> above so long as the properties of the crosslinked composition are not harmfully affected. For example, a softening agent may be used for controlling the hardness and fluidity of the final product. Specific examples of softening agents include a paraffinic process oil, a naphthenic process oil and/or an aromatic process oil; a mineral oil type softening agent, such as a liquid paraffin; a castor oil and a linseed oil. The amount of the softening agent is generally in the range of from 10 to 200 parts by weight, preferably 10 to 150 parts by weight, more preferably 20 to 100 parts by weight, relative to 100 parts by weight of component (A).

In the present invention, the reinforcing fillers which are exemplified as component (B) in item <1> above may be added to the crosslinked, modified polymer composition of the present invention. The amount of the reinforcing filler is generally in the range of from 0 to 200 parts by weight, preferably from 10 to 150 parts by weight, more preferably from 20 to 100 parts by weight, relative to 100 parts by weight of component (A). The reinforcing filler (B) may be used in combination with the silane coupling agent which is exemplified in item <1> above. The amount of the silane coupling agent is generally in the range of from 0.1 to 30% by weight, preferably from 0.5 to 20% by weight, more preferably from 1 to 15% by weight, based on the weight of the reinforcing filler (B).

In the present invention, it is recommended that the dynamic crosslinking in the modified polymer composition in the presence of a vulcanizing agent is performed so that the content of gel (exclusive of inherently insoluble components, such as the inorganic filler) is 5 to 80% by weight, preferably 10 to 70% by weight, more preferably 20 to 60% by weight, based on the weight of the crosslinked product. The gel content is determined by the following method. A sample (1 g) of a crosslinked product is refluxed in a Soxhlet's extractor for 10 hours using boiled xylene. The resultant residue is filtered through an 80-mesh wire mesh. The dry weight (g) of the insoluble matters remaining on the filter is measured, and the ratio (% by weight) of the obtained dry weight to the weight of the sample is calculated. The obtained ratio is defined as the gel content of the crosslinked product.

<5> Adhesive Composition

The present invention provides an adhesive composition comprising:

100 parts by weight of component (A) selected from the group consisting of the first-order modified, hydrogenated polymer (A-1) of the present invention, the second-order modified polymer (A-2) of the present invention and a first-order modified polymer (A-3) which is a precursor of the above-mentioned second-order modified polymer, and 20 to 400 parts by weight of (E) a tackifier. The adhesive composition prepared using the modified polymer of the present invention exhibits an excellent balance of adhesive properties (such as adhesion strength and adhesion retention).

With respect to component (E) (i.e., the tackifier) used to produce the adhesive composition of the present invention, there is no particular limitation, and it is possible to use any conventional tackifying resins, such as a rosin type terpene resin, a hydrogenated rosin type terpene resin, a hydrogenated terpene resin, a coumarone resin, a phenolic resin, a terpene/phenol resin, an aromatic hydrocarbon resin and an aliphatic hydrocarbon resin. These tackifiers can be used individually or in combination. Specific examples of tackifiers include those which are described in the above-mentioned "Gomu Purasuchikku Haigou Yakuhin (Additives for Rubber and Plastic)" (published by Rubber Digest Co., Ltd., Japan). The amount of the tackifier is generally from 20 to 400 parts by weight, preferably from 50 to 350 parts by weight, relative to 100 parts by weight of component (A) (i.e., a modified polymer). When the amount of the tackfier is less than 20 parts by weight, it is unlikely that the adhesive composition exhibits satisfactory adhesion. On the other hand, when the amount of the tackfier is more than 400 parts by weight, the adhesion retention of the adhesive composition is likely to become lowered. Therefore, in either case, the adhesion properties of the adhesive composition tend to be impaired.

It is preferred that the adhesive composition of the present invention further comprises 0.01 to 20 parts by weight of (C) a modifier having a functional group which is reactive to the functional group of the modifier group of the modified polymer (A), wherein the modifier (C) is at least one member selected from the group consisting of a functional monomer and a functional oligomer. When component (A) is the first-order modified, hydrogenated polymer (A-1) or the first-order modified polymer (A-3), a second-order modifier can be added to the composition so that the polymer contained in the final composition becomes a second-order modified polymer. When component (A) is the second-order modified polymer (A-2), a third-order modifier can be added to the composition so as to further modify the second-order modified polymer contained in the final composition. The above-mentioned functional monomers and functional oligomers can be used as the second-order modifier or the third-order modifier.

The adhesive composition may contain a conventional softening agent, such as a naphthenic process oil, a paraffinic process oil, or a mixture thereof. The addition of a softening agent to the adhesive composition is advantageous in that the viscosity of the adhesive composition is reduced, so that the processability and adhesion property of the adhesive composition are improved. The amount of the softening agent is in the range of from 10 to 200 parts by weight, relative to 100 parts by weight of the modified polymer (A). When the amount of the softening agent is more than 200 parts by weight, the adhesion retention of the adhesive composition tends to be markedly impaired.

Further, if desired, the adhesive composition may contain a stabilizer, such as an antioxidant or a light stabilizer.

Also, the adhesive composition may contain at least one member selected from the group consisting of pigments (such as red iron oxide and titanium dioxide); waxes (such as a paraffin wax, a microcrystalline wax and a low molecular weight polyethylene wax); thermoplastic resins (such as polyolefin thermoplastic resins (e.g., amorphous polyolefin and an ethylene/ethylacrylate copolymer) and low molecular weight vinyl aromatic hydrocarbon thermoplastic resins); natural rubbers; synthetic rubbers, such as a polyisoprene rubber, a polybutadiene rubber, a styrene/butadiene rubber, an ethylene/propylene rubber, a chloroprene rubber, an acrylic rubber, an isoprene/isobutylene rubber, a polypentenamer rubber, a styrene/butadiene block copolymer and a styrene/isoprene block copolymer, and may also contain the hydrogenation products of the above-mentioned block copolymers.

With respect to the method for producing the adhesive composition, there is no particular limitation. For example, the adhesive composition can be produced by a method in which the above-mentioned components for the adhesive composition are uniformly mixed using a conventional mixer or kneader while heating.

The adhesive composition of the present invention has excellent balance between various adhesion properties, such as adhesion strength and adhesion retention. By virtue of these excellent properties, the adhesive composition can be advantageously used as a material for an adhesive tape and label, a pressure-sensitive lamina, a pressure-sensitive sheet, a surface protection sheet and film; a back adhesive for fixing a lightweight plastic shaped article, a back adhesive for fixing a carpet or tile, and an adhesive. Especially, the adhesive composition can be advantageously used as a material for an adhesive tape, an adhesive sheet and film, an adhesive label, a surface protection sheet and film, and an adhesive.

<6> Asphalt Composition

The present invention provides an asphalt composition comprising:

0.5 to 50 parts by weight of component (A) selected from the group consisting of the first-order modified, hydrogenated polymer (A-1) of the present invention, the second-order modified polymer (A-2) of the present invention, and a first-order modified polymer (A-3) which is a precursor of the above-mentioned second-order modified polymer, and 100 parts by weight of (F) an asphalt. The asphalt composition comprising the modified polymer of the present invention exhibits excellent properties with respect to ductility, flexural properties and adhesion.

Examples of asphalts (F) for use in the asphalt composition of the present invention include a petroleum asphalt (i.e., asphalt by-produced by oil refining), a mixture thereof with petroleum, natural asphalt, and a mixture thereof with petroleum. Each of the above-mentioned asphalts contains bitumen as the main component thereof. Specific examples of asphalts include a straight asphalt, a semi-blown asphalt, a blown asphalt, tar, pitch, a cutback asphalt (i.e., a mixture of asphalt with oil), and an asphalt emulsion. These asphalts can be used in combination. As a preferred asphalt (F), there can be mentioned a straight asphalt having a penetration ratio of from 30 to 300, preferably from 40 to 200, more preferably from 45 to 150. The amount of component (A) contained in the asphalt composition is generally from 0.5 to 50 parts by weight, preferably from 1 to 30 parts by weight, more preferably from 3 to 20 parts by weight, relative to 100 parts by weight of the asphalt contained in the asphalt composition.

It is preferred that the asphalt composition of the present invention further comprises (C) a modifier having a functional group which is reactive to the functional group of the modifier group of the modified polymer (A), wherein the modifier (C) is at least one member selected from the group consisting of a functional monomer and a functional oligomer. The modifier (C) is used in an amount of from 0.01 to 5 parts by weight, preferably from 0.05 to 5 parts by weight, more preferably from 0.1 to 5 parts by weight, still more preferably from 0.2 to 3 parts by weight, still more preferably from 0.5 to 2 parts by weight, relative to 100 parts by weight of the asphalt. When component (A) is the first-order modified, hydrogenated polymer (A-1) or the first-order modified polymer (A-3), a second-order modifier can be added to the composition so that the polymer contained in the final composition becomes a second-order modified polymer. When component (A) is the second-order modified polymer (A-2), a third-order modifier can be added to the composition so as to further modify the second-order modified polymer contained in the final composition. The above-mentioned functional monomers and functional oligomers can be used as the second-order modifier or the third-order modifier.

The asphalt composition of the present invention comprising components (A) and (F) (i.e., the asphalt), may further comprise 0.1 to 5 parts by weight of component (D) (which is at least one polymer selected from the group consisting of a thermoplastic resin other than component (A) and a rubbery polymer other than component (A)), relative to 100 parts by weight of component (F) (i.e., an asphalt).

If desired, the asphalt composition of the present invention comprising component (A), an asphalt (F) and modifier (C) may contain a sulfur-containing component. As a sulfur-containing component, there can be used, for example, a powdery sulfur, a precipitated sulfur, a colloidal sulfur, a surface-treated sulfur, an insoluble sulfur and an inert sulfur. Further examples of a sulfur-containing component include a sulfur-containing compound, such as sulfur chloride, sulfur dioxide, morpholine disulfide, an alkylphenol disulfide and a high-molecular weight polysulfide. Also, the sulfur-containing component can be used in combination with an appropriate amount of a crosslinking accelerator. As a crosslinking accelerator, there can be used a sulfenamide type accelerator, a guanidine type accelerator, a thiuram type accelerator, an aldehyde-amine type accelerator, an aldehyde-ammonia type accelerator, a thiazole type accelerator, a thiourea type accelerator, a dithiocarbamate type accelerator and a xanthate type accelerator. Specific examples of such crosslinking accelerators include a diphenylguanidine, n-butyl aldehyde-anil condensate, a hexamethylenetetramine, 2-mercaptobenzothiazole, N-cyclohexyl-2-benzothiazyl sulfenamide, thiocarbanilide, tetramethylthiuram monosulfide, sodium dimethyl dithiocarbamate and zinc isopropyl xanthogenate. The amount of the sulfur-containing component is generally in the range of from 0.01 to 10 parts by weight, preferably from 0.05 to 5 parts by weight, more preferably from 0.1 to 2 parts by weight, relative to 100 parts by weight of component (F) (i.e., an asphalt). When the crosslinking accelerator is used, the amount of crosslinking accelerator is generally in the range of from 0.01 to 10 parts by weight, preferably from 0.05 to 5 parts by weight, more preferably from 0.1 to 2 parts by weight, relative to 100 parts by weight of component (F) (i.e., an asphalt).

The asphalt composition of the present invention may contain a silane coupling agent. As a silane coupling agent, the silane coupling agents mentioned in item <1> above can be used. The silane coupling agent is used generally in an amount of from 0.01 to 20 parts by weight, preferably from 0.05 to 10 parts by weight, more preferably from 0.1 to 5 parts by weight, relative to 100 parts by weight of component (F) (i.e., an asphalt).

From the viewpoint of obtaining an asphalt composition which exhibits excellent aggregate-gripping properties, the asphalt composition of the present invention may contain a surfactant, such as an anionic surfactant, a cationic surfactant and a nonionic surfactant. Specific examples of surfactants include a higher fatty acid and a metal salt thereof, a monoamine compound, a diamine compound, a polyamine compound and a co-oligomer of polyethylene oxide and polypropylene oxide. Further examples of surfactants include an acidic, organic phosphate compound; a mixture of an acidic, organic phosphate compound and an inorganic phosphate compound; a polyvalent carboxylic acid or an anhydride thereof; an aliphatic phosphate; a phosphoric acid ester with a higher alcohol (e.g., stearyl phosphate); a mixture of a higher alcohol and a phosphorylated alcohol; gallic acid or derivatives thereof; fatty acids derived from a tall oil, or derivatives thereof; a condensate of polyalkylenepolyamine and a fatty acid; a liquid epoxy; a graft-modified polyethylene obtained by grafting maleic anhydride onto polyethylene; a graft-modified polypropylene obtained by grafting maleic anhydride onto polypropylene; a graft-modified SBS (styrene/butadiene block copolymer) obtained by grafting maleic anhydride onto SBS; a graft-modified SEBS (styrene/ethylene/butylene block copolymer) obtained by grafting maleic anhydride onto SEBS; and a graft-modified SEPS (styrene/ethylene/propylene block copolymer) obtained by grafting maleic anhydride onto SEPS.

If desired, the asphalt composition of the present invention may contain any of the conventional additives. There is no limitation with respect to the type of the additive so long as it is an additive which is generally used in combination with a thermoplastic resin or a rubbery copolymer. Examples of conventional additives include component (B) (i.e., the reinforcing filler), an inorganic filler other than component (B), an organic filler, a rubber-softening agent, a tackifier, a stabilizer (e.g., antioxidant), a vulcanizing agent (e.g., an organic peroxide or a phenol resin crosslinking agent), an auxiliary for use in peroxide crosslinking, a polyfunctional vinyl monomer, and other various additives as mentioned above. If desired, component (D) (i.e., the above-mentioned thermoplastic resin or rubbery polymer) may be used as an additive.

The asphalt composition of the present invention exhibits excellent properties with respect to, e.g., softening temperature, ductility, flexural properties, aggregate-gripping properties and storage stability at high temperatures. Hence, the asphalt composition can be advantageously used in a wide variety of fields, such as the fields of a material for use in road paving, a material for a waterproof sheet, a material for a noise insulation sheet and a roofing material.

The asphalt composition of the present invention is especially useful in the field of drainage pavements. By virtue of its excellent properties with respect to storage stability at high temperatures, ductility, flexural properties at low temperatures and aggregate-gripping properties, the asphalt composition of the present invention can be advantageously used as a binder for a drainage pavement for various roads, for example, a road having a large traffic, an expressway, and a road segment at which the load of traffic tends to concentrate (e.g., an intersection or a curving road). When the asphalt composition of the present invention is used as a binder for a drainage pavement, the obtained drainage pavement exhibits excellent properties with respect to, e.g., rutting resistance, water permeability, traffic noise reduction properties and low-temperature properties (e.g., crack resistance at low temperatures).

Generally, an asphalt pavement is formed by the following method. To a mixture of a coarse aggregate (e.g., crushed stone), a fine aggregate (e.g., sand or crushed sand), stone dust and the like (wherein the mixture has an appropriate range of particle size distribution), is added a binder which is heated, to thereby obtain an asphalt mixture. The obtained asphalt mixture is spread over a road, and the resultant asphalt mixture layer on the road is rolled flat by using a roller or the like, to thereby obtain an asphalt pavement. On the other hand, the drainage pavement layer of the drainage pavement produced using the asphalt composition of the present invention has an extremely large number of intercommunicating voids for drainage, as compared to the number of voids in the pavement layer of the conventional pavement produced using a conventional asphalt mixture. By virtue of such property, the drainage pavement produced using the asphalt composition of the present invention exhibits excellent functions, e.g., the drainability for preventing the occurrence of rain pools, the ability to ensure safe driving by preventing a continuous water thin layer from being formed by rain on the road, and the ability to reduce traffic noise (e.g., an exhaust noise or a noise caused by the contact between rotating tires and the road surface). The asphalt composition of the present invention can be advantageously used in producing a drainage pavement layer of the drainage pavement, wherein the drainage pavement layer has a void fraction of from 5 to 35%, more advantageously from 10 to 30%, still more advantageously from 12 to 28%.

There is no particular limitation with respect to the method for producing the asphalt composition of the present invention, and the asphalt composition can be produced by melt-kneading an asphalt and the modified polymer of the present invention, together with various optional components, by using a conventional mixing machine, such as a melting vessel, a kneader, a Banbury mixer and an extruder.

<7> Styrene Resin Composition

The present invention provides a styrene resin composition obtained by subjecting a raw material mixture to radical polymerization, the raw material mixture comprising:

2 to 30 parts by weight, relative to 100 parts by weight of the total of components (A) and (G), of component (A) selected from the group consisting of the first-order modified, hydrogenated polymer (A-1) of the present invention, the second-order modified polymer (A-2) of the present invention, and a first-order modified polymer (A-3) which is a precursor of the above-mentioned second-order modified polymer, and 98 to 70 parts by weight, relative to 100 parts by weight of the total of components (A) and (G), of (G) a vinyl aromatic hydrocarbon monomer or a mixture of a vinyl aromatic hydrocarbon monomer and a comonomer copolymerizable with the vinyl aromatic hydrocarbon monomer.

The raw material mixture used for producing the styrene resin composition of the present invention may further comprise (C) a modifier having a functional group which is reactive to the functional group of the modifier group of the modified polymer (A), wherein the modifier (C) is at least one member selected from the group consisting of a functional monomer and a functional oligomer. When component (A) is the first-order modified, hydrogenated polymer (A-1) or the first-order modified polymer (A-3), a second-order modifier can be added to the composition so that the polymer contained in the final composition becomes a second-order modified polymer. When component (A) is the second-order modified polymer (A-2), a third-order modifier can be added to the composition so as to further modify the second-order modified polymer contained in the final composition. The above-mentioned functional, monomers and functional oligomers can be used as the second-order modifier or the third-order modifier.

In the present invention, from the viewpoint of mechanical properties of the styrene resin composition, the modifier (C) is used in an amount of 0.01 part by weight or more, relative to 100 parts by weight of component (A). For achieving the effects of addition of the modifier, the modifier (C) is used in an amount of 20 parts by weight or less, relative to 100 parts by weight of component (A). It is preferred that the amount of the modifier (C) is in the range of from 0.02 to 10 parts by weight, more advantageously from 0.05 to 7 parts by weight, relative to 100 parts by weight of component (A).

The styrene resin composition of the present invention can be produced as follows. A raw material mixture is prepared by either dissolving or dispersing the components of the styrene resin composition, such as a modified polymer (A), a modifier (C) and a reinforcing filler (B) in component (G) which is a vinyl aromatic hydrocarbon monomer or a mixture of a vinyl aromatic hydrocarbon monomer and a comonomer copolymerizable with the vinyl aromatic hydrocarbon monomer, to thereby obtain a raw material mixture. The obtained raw material mixture is subjected to graft polymerization while stirring so as to apply shearing stress to the raw material mixture, thereby obtaining a styrene resin composition. The graft polymerization is performed by bulk polymerization, bulk suspension polymerization or solution polymerization. The thus obtained styrene resin composition is a styrene resin composition having a structure wherein a graft polymer particles are dispersed in a polymer matrix, wherein the polymer matrix is made of a vinyl aromatic hydrocarbon polymer or a copolymer of a vinyl aromatic hydrocarbon monomer and a comonomer copolymerizable with the vinyl aromatic hydrocarbon monomer, and the graft polymer particles are made of a graft polymer obtained by grafting a vinyl aromatic hydrocarbon monomer or a monomer component which is a mixture of a vinyl aromatic hydrocarbon monomer and a comonomer copolymerizable with the vinyl aromatic hydrocarbon monomer onto the modified polymer or a hydrogenation product thereof. In the present invention, the styrene resin composition may contain a modified polymer (A) which is not grafted with a vinyl aromatic hydrocarbon monomer or a monomer component which is a mixture of a vinyl aromatic hydrocarbon monomer and a comonomer copolymerizable with the vinyl aromatic hydrocarbon monomer.

Examples of vinyl aromatic hydrocarbon monomers used in the present invention include styrene; vinylnaphthalene; α-alkyl substituted styrenes, such as α-methylstyrene, α-ethylstyrene and α-methyl-p-methylstyrene; nuclear- and alkyl-substituted styrenes, such as m-methylstyrene, p-methylstyrene, 2,4-dimethylstyrene, ethylvinylbenzene and p-tert-butylstyrene; halogenated styrenes, such as monochlorostyrene, dichlorostyrene, tribromostyrene and tetrabromostyrene; p-hydroxystyrene and o-methoxystyrene. These vinyl aromatic hydrocarbon monomers can be used individually or in combination. Of these, styrene, α-methylstyrene and p-methylstyrene are preferred.

As a comonomer copolymerizable with the vinyl aromatic hydrocarbon monomer, there can be mentioned an unsaturated nitrile monomer, a (meth)acrylic acid ester and the like. The amount of the comonomer copolymerizable with the vinyl aromatic hydrocarbon monomer contained in the mixture of the vinyl aromatic hydrocarbon monomer and the comonomer is 10 to 90% by weight, preferably 20 to 80% by weight, based on the weight of the mixture.

Specific examples of unsaturated nitrites include acrylonitrile and methacrylonitrile. These unsaturated nitriles can be used individually or in combination. Of these, acrylonitrile is especially preferred.

Specific examples of (meth)acrylic acid esters include methylacrylate, ethylacrylate, propylacrylate, butylacrylate, amylacrylate, hexylacrylate, octylacrylate, dodecylacrylate, cyclohexylacrylate, methylmethacrylate, ethylmethacrylate, propylmethacrylate, butylmethacrylate, amylmethacrylate, hexylmethacrylate, octylmethacrylate, dodecylmethacrylate and cyclohexylmethacrylate. These (meth)acrylic acid esters can be used individually or in combination. Of these, methylmethacrylate is especially preferred.

Specific examples of other comonomers copolymerizable with the vinyl aromatic hydrocarbon monomer include acrylic acid, methacrylic acid, vinyl acetate, maleic anhydride, N-methylmaleimide and N-phenylmaleimide.

During the production of the styrene resin composition of the present invention, the graft polymerization may be performed after adding an inert solvent to component (G) which is selected from the group consisting of a vinyl aromatic hydrocarbon monomer and a mixture of a vinyl aromatic hydrocarbon monomer and a comonomer copolymerizable with the vinyl aromatic hydrocarbon monomer. Examples of inert solvents include polar solvents, such as ethylbenzene, toluene, methyl ethyl ketone and cyclohexanone, and these solvents can be used individually or in combination. The amount of the inert solvent is preferably 100 parts by weight or less, more preferably 50 parts by weight or less, relative to 100 parts by weight of monomer component (G).

In the present invention, the radical polymerization of a raw material mixture comprising a vinyl aromatic hydrocarbon monomer or a mixture of a vinyl aromatic hydrocarbon monomer and a comonomer copolymerizable with the vinyl aromatic hydrocarbon monomer, a modified polymer or a hydrogenation product thereof, and a reinforcing filler may be performed in the presence of an organic peroxide or an azo compound. Graft polymerization reaction is more likely to occur in the presence of an azo compound and, therefore, a styrene resin composition having excellent properties can be obtained by the use of an azo compound.

Specific examples of organic peroxides include peroxyketals, such as 1,1-bis(tert-butylperoxy)cyclohexane and 1,1-bis (tert-butylperoxy)-3,3,5-trimethyl-cyclohexane; dialkyl peroxides, such as di-t-butyl-peroxide, 2,5-dimethyl-2,5-di(tert-butylperoxy)hexane and dicumyl peroxide; diacyl peroxides, such as benzoyl peroxide, m-toluoyl peroxide and lauroyl peroxide; peroxydicarbonates, such as dimyristylperoxydicarbonate and diisopropylperoxydicarbonate; peroxyesters, such as t-butylperoxyisopropylcarbonate, t-butylperoxyacetate, di-t-butyldiperoxyisophthalate and t-butylperoxybenzoate; ketone peroxides, such as cyclohexanone peroxide and methyl ethyl ketone peroxide; and hydroperoxides, such as p-mentha hydroperoxide, t-butyl hydroperoxide and cumene hydroperoxide. Specific examples of azo compounds include azobisisobutylonitrile and azobiscyclohexane carbonitrile. These compounds can be used individually or in combination. The amount of the organic peroxide or the azo compound is preferably in the range of from 10 to 1000 ppm, relative to the amount of component (G) (i.e., a monomer component).

Further, use can be made of a conventional chain transfer agent. Specific examples of the chain transfer agents include mercaptanes, such as n-dodecylmercaptane and tert-dodecylmercaptane; α-methylstyrene dimer; terpenes, such as 1-phenylbutene-2-fluorene and dipentene; and halogenated compounds, such as chloroform. The amount of the chain transfer agent is in the range of from 5 to 5000 ppm, relative to the amount of component (G) (i.e., a monomer component).

In the present invention, the above-mentioned reinforcing filler (B) may be contained in the styrene resin composition. The amount of the reinforcing filler (B) is in the range of from 0.5 to 300 parts by weight, preferably from 1 to 200 parts by weight, more preferably from 5 to 100 parts by weight, relative to 100 parts by weight of component (A) (i.e., a modified polymer). When the amount of the reinforcing filler (B) contained in a styrene resin composition is less than 0.5 part by weight, the effect of adding the reinforcing filler becomes unsatisfactory. On the other hand, when the amount of the reinforcing filler (B) contained in a styrene resin composition is more than 300 parts by weight, the processability and the mechanical strength of such a styrene resin composition becomes poor.

For promoting the interaction between the modified polymer (A) and the reinforcing filler (B), use can be made of a silane coupling agent having a group which exhibits an affinity or bonding ability to either or both of the modified polymer (A) and the reinforcing filler (B). As a silane coupling agent, those exemplified above can be used. The amount of the silane coupling agent is in the range of from 0.1 to 30% by weight, preferably 0.5 to 20% by weight, more preferably 1 to 15% by weight, based on the weight of the reinforcing filler (B). The effects of using the silane coupling agent can not be obtained when the amount of the silane coupling agent is less than 0.1% by weight, and no further improvements are achieved by using more than 30% by weight of the silane coupling agent.

Further, the present invention provides a method for producing a styrene resin composition, comprising:

(1) providing a raw material mixture comprising (A) the modified polymer, (G) a vinyl aromatic hydrocarbon monomer or a mixture of a vinyl aromatic hydrocarbon monomer and a comonomer copolymerizable with the vinyl aromatic hydrocarbon monomer, and optionally at least one member selected from the group consisting of (C) a modifier and (B) a reinforcing filler, and (2) subjecting the raw material mixture to radical polymerization, thereby obtaining a styrene resin composition.

When a raw material mixture is prepared by either dissolving or dispersing the components of the styrene resin composition, such as a modified polymer (A), a modifier (C) and a reinforcing filler (B) in component (G), there can be mentioned a method in which each of a modified polymer (A) and a reinforcing filler (B) are individually dissolved or dispersed in component (G); a method in which each of a modified polymer (A), a reinforcing filler (B) and a modifier (C) are individually dissolved or dispersed in component (G); a method in which a modified polymer (A) and a reinforcing filler (B) are mixed in a solvent or melt-kneaded using a conventional mixing machine, such as a Banbury mixer, a roll, a kneader, a single-screw extruder, a twin-screw extruder or a multi-screw extruder, to thereby obtain a modified resin composition, and the obtained modified resin composition is dissolved or dispersed in component (G); and a method in which a modified polymer (A), a reinforcing filler (B) and a modifier (C) are mixed in a solvent or melt-kneaded using a conventional mixing machine, such as a Banbury mixer, a roll, a kneader, a single-screw extruder, a twin-screw extruder or a multi-screw extruder, to thereby obtain a modified resin composition, and the obtained modified resin composition is dissolved or dispersed in component (G).

The styrene resin composition of the present invention may further contain conventional stabilizers, such as an antioxidant and an ultraviolet light stabilizer. Examples of antioxidants include octadecyl-3-(3,5-di-t-butyl-4-hydroxyphenyl) propionate, 2,6-di-t-butyl-4-methylphenol, 2-(1-methylcyclohexyl)-4,6-dimethylphenol, 2,2'-methylene-bis (4-ethyl-6-t-butyl-phenol), 4,4'-thio-bis(6-t-butyl-3-methylphenol), 2,4-bis[(octylthio)methyl]-o-cresol, triethylene glycol-bis[3-(3-t-butyl-5-methyl-4-hydroxyphenyl)propionate], tris(dinonylphenyl)phosphite, tris-(2,4-di-t-butylphenyl)phosphite. The amount of the antioxidant is in the range of from 0.01 to 5 parts by weight, preferably 0.1 to 2 parts by weight, relative to 100 parts by weight of the styrene resin composition.

Specific examples of ultraviolet light stabilizers include triazole type ultraviolet light stabilizers, such as 2-(5-methyl-2-hydroxyphenyl)benzotriazole and 2-(3,5-di-t-butyl-2-hydroxyphenyl)benzotriazole; hindered amine type ultraviolet light stabilizers, such as bis(2,2,6,6-tetramethyl-4-piperidyl)

sebacate; p-t-butylphenylsalicylate and 2,2'-dihydroxy-4-methoxy-benzophenone. Especially preferred are triazole type and hindered amine type ultraviolet light stabilizers, and these ultraviolet light stabilizers can be used individually or in combination. The ultraviolet light stabilizer is preferably used in an amount in the range of from 0.01 to 5 parts by weight, more preferably from 0.05 to 2 parts by weight, relative to 100 parts by weight of the styrene resin composition.

In addition, if desired, a conventional internal lubricant used in this field (such as a liquid paraffin, a mineral oil and an organopolysiloxane) may be added to the styrene resin composition. For example, 0.005 to 10 parts by weight of polydimethylsiloxane (which is an organopolysiloxane) may be added to 100 parts by weight of a styrene resin composition.

The gelation ratio (i.e., content of components which are insoluble in toluene) of the styrene resin composition produced by the method of the present invention is preferably in the range of from 5 to 75% by weight, more preferably from 10 to 50% by weight. When the gelation ratio is lower than 5% by weight, the impact resistance of such a styrene resin composition becomes poor, and when the gelation ratio is too high, the fluidity becomes lowered and such a styrene resin composition are disadvantageous for producing molded articles. In addition, the swelling index of the styrene resin composition measured using toluene (i.e., weight of the composition swelled with toluene/dry weight after removing toluene) is preferably in the range of from 5 to 15, more preferably from 7 to 12. When the swelling index is lower than 5, the impact resistance becomes poor, and when the swelling index is more than 12, the impact resistance and luster becomes poor. The swelling index can be controlled by adjusting the final reaction rate of the graft polymerization reaction of the comonomer components (which reaction is performed by bulk polymerization, bulk suspension polymerization or solution polymerization) and the volatilization temperature of the unreacted comonomer(s).

The weight average molecular weight of the resin forming the matrix is preferably in the range of from 70,000 to 500,000, more preferably from 100,000 to 300,000. The weight average molecular weight is measured by gel permeation chromatography (GPC) using standard polystyrene samples. When the weight average molecular weight is less than 70,000, such a styrene resin composition has low impact resistance, and when the weight average molecular weight is more than 500,000, such a styrene resin composition has too low fluidity to produce molded articles to disadvantage.

In the present invention, especially preferred styrene resin composition is a styrene resin composition having a structure wherein a graft polymer particles are dispersed in a polymer matrix and all or part of the reinforcing filler (B) are present in the dispersion phase of the graft polymer particles or in the vicinity thereof, wherein the polymer matrix is made of a vinyl aromatic hydrocarbon polymer or a copolymer of a vinyl aromatic hydrocarbon monomer and a comonomer copolymerizable with the vinyl aromatic hydrocarbon monomer, and the graft polymer particles are made of a graft polymer obtained by grafting a vinyl aromatic hydrocarbon monomer or a monomer component which is a mixture of a vinyl aromatic hydrocarbon monomer and a comonomer copolymerizable with the vinyl aromatic hydrocarbon monomer onto the modified polymer. The styrene resin composition of the present invention having the above-mentioned structure has an excellent balance of impact resistance, stiffness and luster.

If desired, a flame retardant and an auxiliary flame retardant may be added to the styrene resin composition of the present invention to impart flame retardancy to the final molded articles. Various types of flame retardants are known in the art and any conventional flame retardant can be used. Examples of flame retardants include a halogen type flame retardant, a phosphorus type flame retardant, a hydroxide type flame retardant and a silicon type flame retardant. Specific examples of flame retardants include decabromodiphenyl oxide, tetrabromobisphenol A, a tetrabromobisphenol A oligomer, tris(2,3-dibromopropyl-1) isocyanurate, ammonium phosphate, red phosphorus, tricresyl phosphate, magnesium hydroxide and aluminum hydroxide. As an auxiliary flame retardant, there can be mentioned antimony trioxide, antimony pentoxide, sodium antimonate, antimony trichloride, antimony pentachloride, zinc borate, barium metaborate and zirconium oxide.

Further, if desired, various additives, such as a lubricant, a mold release agent, a filler, an antistatic agent and a coloring agent can be added to the styrene resin composition. Further, other thermoplastic resins, such as a general purpose polystyrene, an acrylonitrile/styrene copolymer resin (AS), an acrylonitrile/butadiene/styrene copolymer resin (ABS), an acrylonitrile/ethylenepropylene/styrene copolymer resin (AES); a methacrylonitrile/butadiene/styrene copolymer resin (MBS); a polyphenylene ether, a polycarbonate, a styrene/butadiene copolymer, a methylmethacrylate/styrene copolymer resin, a maleic anhydride/styrene copolymer resin, a polyamide resin and a polyester resin, can be added to the styrene resin composition.

The thermoplastic resins are used to impart advantageous properties, such as heat resistance, stiffness, impact resistance, appearance and coating properties, and one or more thermoplastic resins are selected based on the desired properties of the styrene resin composition.

The styrene resin composition can be advantageously used as various shaped articles produced by a method, such as an injection molding and an extrusion molding. The shaped articles can be used in various fields, such as cabinets and housings of home electric appliances and office automation apparatuses; interior or exterior parts of automobiles; parts of buildings and furnitures; and parts of antenna for broadcasting and communication.

BEST MODE FOR CARRYING OUT THE INVENTION

Hereinbelow, the present invention will be described in more detail with reference to the following Reference Examples, Examples and Comparative Examples, which should not be construed as limiting the scope of the present invention.

The characteristics and properties of the base polymers, first-order modified polymers and the second-order modified polymers were determined by the following methods.

(1) Styrene Content

The absorption intensity of a polymer at 262 nm was measured using an ultraviolet spectrophotometer (trade name: UV-2450; manufactured and sold by Shimadzu Corporation, Japan), and the styrene content was calculated therefrom.

(2) Styrene Block Ratio

A predetermined amount (from 30 to 50 mg) of an unhydrogenated block copolymer was precisely weighed and added to about 10 ml of chloroform. To the resultant were added osmium tetraoxide (as a catalyst) and tertiary butyl hydroperoxide (as an oxidant) to obtain a mixture. The obtained mixture was boiled at 100° C. for 20 minutes to effect an oxidative degradation of the block copolymer, thereby obtaining a reaction mixture. To the obtained reaction mixture was added methanol in an amount of 200 ml to precipitate a polystyrene, thereby obtaining a precipitate. The obtained precipitate was filtered using 11G4 (manufactured and sold by SHIBATA SCIENTIFIC TECHNOLOGY LTD., Japan) to obtain a filtration residue comprised of a polystyrene. (However, the polymer chains having an average polymerization degree of 30 or less were not taken into consideration in the measurement of the styrene block ratio.) The polystyrene obtained as the filtration residue was weighed, and a styrene block ratio was calculated from the following formula:

Styrene block ratio (wt %) (weight of the filtration residue/weight of styrene monomer units in the above-mentioned predetermined amount of the block copolymer)×100.

(3) Vinyl Bond Content and Hydrogenation Ratio

The vinyl bond content and hydrogenation ratio were measured by means of a nuclear magnetic resonance (NMR) apparatus (trade name: DPX-400; manufactured and sold by BRUKER, Germany).

(4) Mooney Viscosity

The Mooney viscosity was measured by means of a Mooney viscometer in accordance with JIS K 6300, under conditions wherein the test temperature was 100° C., preheating time was 1 minute, rotation was 2 rpm, and the test time was 4 minutes.

(5) Weight Average Molecular Weight and Molecular Weight Distribution

The weight average molecular weight was measured by gel permeation chromatography (GPC) (GPC apparatus: LC10; column: Shimpac GPC805+GPC804+GPC804+GPC803; both of the apparatus and column are manufactured and sold by Shimadzu Corporation, Japan) under conditions wherein tetrahydrofuran was used as a solvent and the column temperature was 35° C. The weight average molecular weight was determined from a GPC chromatogram showing the peak molecular weight, using a calibration curve obtained with respect to the peak molecular weights of commercially available monodisperse standard polystyrene samples.

(6) Ratio of Modified Polymer Fractions in a Modified Polymer

A sample solution was prepared by mixing together 20 ml of tetrahydrofuran, 10 mg of a modified polymer and 10 mg of a low molecular weight internal standard polystyrene having a weight average molecular weight of 8,000. The sample solution was subjected to gel permeation chromatography (GPC) in the same manner as in item (5) above, to thereby obtain a chromatogram. From the chromatogram, the ratio (a) of the peak area of the modified polymer (containing unmodified polymer fractions) to the peak area of the internal standard polystyrene was determined.

On the other hand, the same sample solution as mentioned above was subjected to gel permeation chromatography (GPC) in substantially the same manner as in item (5) above, except that there was used a column packed with a silica gel (tradename: Zorbax, manufactured and sold by DuPont, U.S.A). The silica gel adsorbs the modified polymer fractions, but does not adsorb the unmodified polymer fractions. From the resultant chromatogram, the ratio (b) of the peak area of the polymer (i.e., unmodified polymer fractions) to the peak area of the internal standard polystyrene was determined. Thus, the ratio (a) reflects the total peak area ascribed to both the unmodified polymer fractions and the modified polymer fractions, and the ratio (b) reflects the peak area ascribed to only the unmodified polymer fractions. Therefore, from the difference between the ratios (a) and (b), the ratio of the modified polymer fractions in the modified polymer was obtained.

The hydrogenation catalysts and base polymers used for producing the first-order modified, hydrogenated polymer and second-order modified polymer of the present invention were prepared by the following method.

1. Preparation of a Hydrogenation Catalyst (1) Hydrogenation Catalyst I:

A reaction vessel was purged with nitrogen. To the reaction vessel was added one liter of dried, purified cyclohexane, followed by addition of 100 mmol of bis($\eta^5$-cyclopentadienyl)titanium dichloride. While thoroughly stirring the resultant mixture in the reaction vessel, an n-hexane solution of 200 mmol of trimethylaluminum was added to the reaction vessel, and a reaction was effected at room temperature for about 3 days to thereby obtain hydrogenation catalyst I.

(2) Hydrogenation Catalyst II:

A reaction vessel was purged with nitrogen. To the reaction vessel were added two liters of dried, purified cyclohexane. Then, 40 mmol of bis($\eta^5$-cyclopentadienyl) titanium di-(p-tolyl) and 150 g of 1,2-polybutadiene having a molecular weight of about 1,000 (wherein the 1,2-polybutadiene had a 1,2-vinyl bond content of about 85%) were added to and dissolved in the cyclohexane, thereby obtaining a solution. A cyclohexane solution of 60 mmol of n-butyllithium was added to the solution in the reaction vessel, and a reaction was effected at room temperature for 5 minutes and, then, 40 mmol of n-butanol was immediately added to the reaction vessel while stirring, thereby obtaining hydrogenation catalyst II. The obtained hydrogenation catalyst II was preserved at room temperature.

2. Preparation of a Living Polymer Used as a Base Polymer for Producing the Modified Polymers of the Present Invention Preparation of Polymer 1:

A living polymer was produced by performing a continuous polymerization by the following method in which a reaction vessel which has an internal volume of 10 liters and is equipped with a stirrer and a jacket was used. An n-hexane solution which contained, as monomers for copolymerization, butadiene and styrene (butadiene/styrene weight ratio: 82/18; total concentration of the butadiene and styrene monomers: 16% by weight), and a cyclohexane solution of 1% by weight of n-butyllithium (as a polymerization initiator) were fed to the reaction vessel at rates of 157 g/min and 4.1 g/min, respectively. Further, an n-hexane solution of 1% by weight of N,N,N',N'-tetramethylethylenediamine (as a polar substance) was fed to the reaction vessel at a rate of 2 g/min, to thereby perform a continuous polymerization at 86° C., thereby obtaining a solution of polymer 1 (P-1) which was a living copolymer. The characteristics of polymer 1 (P-1) are shown in Table 1.

Preparation of Polymer 2:

Polymer 2 (P-2) (which was a living copolymer) was obtained in substantially the same manner as in the preparation of polymer 1 (P-1), except that the amount of n-butyllithium fed to the reaction vessel was changed as indicated in Table 1. The characteristics of polymer 2 are shown in Table 1.

Preparation of Polymer 3:

A living polymer was produced by performing a continuous polymerization by the following method in which a reaction vessel which has an internal volume of 10 liters and is equipped with a stirrer and a jacket was used. An n-hexane solution which contained, as monomers for copolymerization, butadiene and styrene (butadiene/styrene weight ratio: 65/35; total concentration of the butadiene and styrene monomers: 16% by weight), and a cyclohexane solution of 1% by weight of n-butyllithium (as a polymerization initiator) were fed to the reaction vessel at rates of 157 g/min and 4.2 g/min, respectively. Further, an n-hexane solution of 1% by weight of 2,2-bis(2-oxolanyl)propane (as a polar substance) was fed to the reaction vessel at a rate of 2.2 g/min, to thereby perform a continuous polymerization at 83° C., thereby obtaining a solution of polymer 3 (P-3) which was a living copolymer. The characteristics of polymer 3 (P-3) are shown in Table 1.

Preparation of Polymer 4:

Polymer 4 (P-4) (which was a living copolymer) was obtained in substantially the same manner as in the preparation of polymer 3 (P-3), except that the amount of n-butyllithium fed to the reaction vessel was changed as indicated in Table 1. The characteristics of polymer 4 are shown in Table 1.

Preparation of Polymer 5:

A living polymer was produced by performing a continuous polymerization by the following method in which two reaction vessels (i.e., a first reaction vessel and a second reaction vessel) were used, each of which has an internal volume of 10 liters (the L/D=4, wherein L represents the inner height of the reaction vessel and D represents the inner diameter of the reaction vessel) and is equipped with a stirrer and a jacket. A cyclohexane solution of butadiene (butadiene concentration: 24% by weight), a cyclohexane solution of styrene (styrene concentration: 24% by weight), and a cyclohexane solution of n-butyllithium (which solution contained 0.11 g of n-butyllithium, relative to 100 g of the total of the monomers for copolymerization (i.e., the total of the above-mentioned butadiene and styrene) were fed to the bottom portion of the first reaction vessel at rates of 7.07 liters/hr, 3.47 liters/hr and 20 liters/hr, respectively. Further, a cyclohexane solution of N,N,N',N'-tetramethylethylenediamine was fed to the bottom portion of the first reaction vessel at a rate wherein the amount of N,N,N',N'-tetramethylethylenediamine fed to the first reaction vessel was 0.44 mole, per mole of the n-butyllithium, to thereby perform a continuous polymerization at 90° C. The reaction temperature was adjusted by controlling the jacket temperature. The temperature around the bottom portion of the first reaction vessel was about 88° C. and the temperature around the top of the first reaction vessel was about 90° C. The average residence time of a polymerization reaction mixture in the first reaction vessel was about 45 minutes. The conversion of butadiene was approximately 100% and the conversion of styrene was approximately 99%.

From the first reaction vessel, a copolymer solution was withdrawn and fed to the bottom portion of the second reaction vessel. Simultaneously with the feeding of the copolymer solution, a cyclohexane solution of styrene (styrene concentration: 24% by weight) was fed to the bottom portion of the second reaction vessel at a rate of 2.31 liters/hr. In the second reaction vessel, a continuous polymerization was performed at 90° C. to thereby obtain a solution of polymer 5 (P-5) which was a living copolymer. The characteristics of polymer 5 (P-5) are shown in Table 1.

Preparation of Polymer 6:

Polymer 6 (P-6) (which was a living copolymer) was obtained in substantially the same manner as in the preparation of polymer 5 (P-5), except that the feeding rate of the cyclohexane solution of butadiene to the first reaction vessel was changed to 4.51 liters/hr, the feeding rate of the cyclohexane solution of styrene to the first reaction vessel was changed to 5.97 liters/hr, and the feeding rate of the cyclohexane solution of styrene to the second reaction vessel was changed to 2.38 liters/hr. The characteristics of polymer 6 (P-6) are shown in Table 1.

Preparation of Polymers 7 and 8:

Polymers 7 and 8 (P-7 and P-8) (each of polymers 7 and 8 was a living polymer) were obtained in substantially the same manner as in the preparation of polymer 1, except that the amounts of n-butyllithium fed to the reaction vessel was changed as indicated in Table 1 and styrene was not used as a monomer for polymerization. The characteristics of polymers 7 and 8 (P-7 and P-8) are shown in Table 1.

Preparation of Polymer 9:

A living polymer was produced by performing a polymerization by the following method in which a reaction vessel which has an internal volume of 10 liters and is equipped with a stirrer and a jacket was used. The reaction vessel was charged with 510 g of butadiene, 390 g of styrene, 5,500 g of cyclohexane and 0.70 g of 2,2-bis(2-oxolanyl)propane (as a polar substance) and the temperature of the reaction vessel was maintained at 30° C. To the resultant reaction vessel was charged a cyclohexane solution containing 0.95 g of n-butyllithium (as a polymerization initiator), to thereby initiate the polymerization reaction. After the start of the polymerization reaction, the inner temperature of the reaction vessel increased gradually due to the heat of polymerization reaction. 100 g of butadiene was further added to the reaction vessel in 5 minutes at a feeding rate of 20 g/min, wherein the feeding was initiated at a point in time of 7 minutes from the addition of the polymerization initiator and terminated at 12 minutes from the addition of the polymerization initiator. The inner temperature of the reaction vessel finally reached 75° C. As a result, solution of a polymer 9 (P-9), which was a living copolymer, was obtained. The characteristics of polymer 9 (P-9) are shown in Table 1.

Preparation of Polymer 10:

Polymer 10 (P-10) was obtained in substantially the same manner as in the preparation of polymer 9 (P-9), except that the amount of n-butyllithium fed to the reaction vessel was changed as indicated in Table 1. The characteristics of polymer 9 are shown in Table 1.

Preparation of Polymer 11:

A living polymer was produced by performing a polymerization by the following method in which a reaction vessel which has an internal volume of 10 liters and is equipped with a stirrer and a jacket was used. The reaction vessel was charged with 530 g of butadiene, 470 g of styrene, 5,500 g of cyclohexane and 0.1 g of 2,2-bis(2-oxolanyl)propane (as a polar substance). To the resultant reaction vessel was charged a cyclohexane solution containing, as a polymerization initiator, 1.2 g of n-butyllithium, to thereby initiate the polymerization reaction. After the start of the polymerization reaction, the inner temperature of the reaction vessel increased gradually due to the heat of polymerization reaction. The inner temperature of the reaction vessel finally reached 75° C. As a result, a solution of polymer 11 (P-11), which was a living copolymer, was obtained. The characteristics of polymer 11 (P-11) are shown in Table 1.

Preparation of Polymers 12 and 13:

Polymers 12 and 13 (P-12 and P-13) (each of polymers 12 and 13 was a living copolymer) were obtained in substantially the same manner as in the preparation of polymer 11, except that the amount of the polar substance used was changed to 0.3 g and 0.09 g for producing polymers 12 and 13, respectively. Further, the amounts of the monomers for copolymerization and n-butyllithium charged into the reaction vessel were changed as indicated in Table 1. The characteristics of polymers 12 and 13 (P-12 and P-13) are shown in Table 1.

Preparation of Polymer 14:

A living polymer was produced by performing a polymerization by the following method in which a reaction vessel which has an internal volume of 10 liters and is equipped with a stirrer and a jacket was used. The reaction vessel was charged with 900 g of butadiene and 5,500 g of cyclohexane, and the inner temperature of the reaction vessel was maintained at 40° C. To the resultant reaction vessel was charged a cyclohexane solution containing 0.855 g of n-butyllithium (as a polymerization initiator), to thereby initiate the polymerization reaction. After the start of the polymerization reaction, the inner temperature of the reaction vessel increased gradually due to the heat of polymerization reaction. The inner temperature of the reaction vessel finally reached 75° C. As a result, a solution of polymer 14 (P-14), which was a living polymer, was obtained. The characteristics of polymer 14 (P-14) are shown in Table 1.

EXAMPLES 1 TO 18 AND 70, REFERENCE EXAMPLES 1 TO 14 AND COMPARATIVE EXAMPLES 1 TO 4

A first-order modified, unhydrogenated polymer was obtained using the living polymers indicated in Table 1 and the first-order modifiers indicated in Table 2. Specifically, to the living polymer solutions were individually added predetermined amounts of first-order modifiers as indicated in Table 2, and a reaction was performed at 70° C. for 20 minutes, thereby obtaining reaction mixtures respectively containing first-order modified, unhydrogenated polymers.

A first-order modified, hydrogenated polymer was obtained by hydrogenating the above-obtained first-order modified, unhydrogenated polymer using the above-mentioned hydrogenation catalyst I or hydrogenation catalyst II. Specifically, to a reaction mixture containing a first-order modified, unhydrogenated polymer was added hydrogenation catalyst I or hydrogenation catalyst II in an amount of 100 ppm in terms of the amount of titanium, relative to 100 parts by weight of the first-order modified, unhydrogenated polymer. A hydrogenation reaction was performed for 1 hour under conditions wherein the hydrogen pressure was 0.7 MPa and the reaction temperature was 65° C., thereby obtaining a reaction mixture containing a first-order modified, hydrogenated polymer.

The first-order modified, unhydrogenated polymer and the first-order modified, hydrogenated polymer obtained above were purified as follows. To the reaction mixtures respectively containing the first-order modified, unhydrogenated polymers and first-order modified, hydrogenated polymers were individually added methanol in a molar amount which is 10 times the molar amount of n-butyllithium used in the polymerization reaction. Then, carbonated water was added to the resultant, so as to adjust the pH value of the resultant to pH 8 or less. To each of the resultant reaction mixtures was added, as a stabilizer, octadecyl-3-(3,5-di-t-butyl-4-hydroxyphenyl) propionate in an amount of 0.3 part by weight, relative to 100 parts by weight of the polymer, followed by steam stripping to thereby distill off the solvent in the reaction mixture. The resultant polymer was dehydrated and dried, to thereby obtain a first-order modified, unhydrogenated polymer or a first-order modified, hydrogenated polymer.

The characteristics of the thus obtained first-order modified, unhydrogenated polymer and the first-order modified, hydrogenated polymer are shown in Table 2.

EXAMPLES 19 TO 21, 23 TO 34, 36 TO 43 AND 71

Preparation of a Second-Order Modified Polymer

The first-order modified, hydrogenated polymer and a first-order modified, unhydrogenated polymer obtained in Examples 1 to 18 and 70 and Reference Examples 1 to 13 were individually reacted with a second-order modifier in accordance with the formulations indicated in Table 3, thereby obtaining second-order modified polymers. To the first-order modified, hydrogenated polymers (prepared in the Examples) and the first-order modified, unhydrogenated polymers (prepared in the Reference Examples) were individually added predetermined amounts of second-order modifiers (a functional monomer or a functional oligomer) as indicated in Table 3. The resultant mixtures were individually kneaded by means of an enclosed kneader (internal volume: 1.7 liters) which has two rotors and is equipped with a temperature control device employing a circulating water. The kneading was performed under conditions wherein the packing ratio was 65%, the revolution rate of two rotors were 66 rpm and 77 rpm, respectively, to effect a reaction, thereby obtaining second-order modified polymers. Alternatively, the resultant mixtures were individually melt-kneaded and extruded by means of a 30 mm φ twin-screw extruder under conditions wherein the cylinder temperature was 220° C. and the screw revolution rate was 100 rpm, to effect a reaction, thereby obtaining second-order modified polymers.

EXAMPLE 22

To the reaction mixture containing the first-order modified, unhydrogenated polymer 1P-9 (obtained in Example 9), which was obtained by adding a first-order modifier to a solution of a living polymer, was added methanol in a molar amount which is 10 times the molar amount of n-butyllithium used in the polymerization reaction. Then, carbonated water was added to the resultant, so as to adjust the pH value of the resultant to pH 8 or less. To the resultant mixture was added a predetermined amount of a second-order modifier (a functional monomer) as indicated in Table 3, and a reaction was performed at about 60° C. for 30 minutes. To the resultant reaction mixture was added, as a stabilizer, octadecyl-3-(3,5-di-t-butyl-4-hydroxyphenyl)propionate in an amount of 0.3 part by weight, relative to 100 parts by weight of the polymer, followed by steam stripping to thereby distill off the solvent in the reaction mixture. The resultant polymer was dehydrated and dried, to thereby obtain second-order modified polymer 2P-4.

EXAMPLE 35

To the reaction mixture containing the first-order modified polymer 1P-23 (obtained in Reference Example 5), which was obtained by adding a first-order modifier to a solution of a living polymer, was added a predetermined amount of a second-order modifier (a functional monomer) as indicated in Table 3, and a reaction was performed at about 60° C. for 30 minutes. Then, carbonated water was added to the resultant, so as to adjust the pH value of the resultant to pH 8 or less. To the resultant reaction mixture was added, as a stabilizer, octadecyl-3-(3,5-di-t-butyl-4-hydroxyphenyl)propionate in an amount of 0.3 part by weight, relative to 100 parts by weight of the polymer, followed by steam stripping to thereby distill off the solvent in the reaction mixture. The resultant polymer was dehydrated and dried, to thereby obtain second-order modified polymer 2P-17.

The compositions of the present invention are explained in the following Examples and Comparative Examples.

Crosslinked, Filler-Containing Modified Polymer Composition

The properties of the crosslinked, filler-containing modified polymer compositions (obtained in the Examples) and the crosslinked, filler-containing unmodified polymer compositions (obtained in the Comparative Examples) were measured and evaluated by the following methods.

(1) Bound Rubber Content

A sample of a kneaded polymer composition (0.2 g) was cut into squares (about 1 mm×1 mm) and placed in a Harris container (a wire mesh container, 100-mesh). The weight of the resultant polymer composition sample was precisely weighed. The container containing the polymer composition sample was immersed in toluene for 24 hours to thereby dissolve the rubber components which are not bound to the reinforcing filler. The container was taken out from toluene and the insoluble material remaining inside the container was taken out and dried completely. The weight of the dried insoluble material was weighed, to thereby determine the amount of the insoluble material contained in the polymer composition sample. The content of the rubber components which are bound to the reinforcing fillers in the polymer composition was calculated from the amount of the insoluble material contained in the polymer composition sample and defined as the bound rubber content of the polymer composition.

(2) Viscosity of the Composition

The viscosity was measured using a Mooney viscometer in accordance with JIS K 6300, under conditions wherein the test temperature was 100° C., preheating time was 1 minute, rotation was 2 rpm, and the test time was 4 minutes.

(3) Tensile Strength

Tensile strength was measured in accordance with JIS K6251.

(4) Impact Resilience

The impact resilience was measured by means of a Lupke rebound resilience tester in accordance with JIS K 6255 (in which the impact resilience was measured at 50° C.).

(5) Compression Set

A compression set was measured at 100° C. for 70 hours in accordance with JIS K 6262.

(6) Viscoelastic Property

The storage modulus (G') was measured by means of a viscoelasticity testing apparatus (manufactured and sold by Rheometric Scientific FE, Japan) under torsion mode, wherein the strain at 50° C. was varied from 0.01 to 10%. The difference (ΔG') in the storage modulus G' value as between the strain of 0.1% and the strain of 10% was determined. The smaller the ΔG' value, the better the dispersion properties of silica.

(7) Adhesiveness

The adhesiveness was evaluated by determining the peeling strength (peel angle: 180°) in accordance with JIS K 6256. A test specimen was prepared by adhering a polymer composition onto a metal plate using, as a primer, Metaloc G and Metaloc PH-50 (both manufactured and sold by Toyo Kagaku Kenkyujyo, Japan).

EXAMPLES 44 TO 51 AND COMPARATIVE EXAMPLES 5 AND 6

Crosslinked, filler-containing modified polymer compositions were produced in accordance with the formulations indicated in Tables 4 and 5 by the following kneading method. Polymer (A), a silica (reinforcing filler (B)), an organosilane coupling agent, an oil (a naphthene oil is used when polymer (A) is an unhydrogenated polymer and a parafin oil is used when polymer (A) is a hydrogenated polymer), zinc white, stearic oxide and optionally a sencond-order modifier (C) were kneaded by means of an enclosed kneader (internal volume: 1.7 liters) which has two rotors and is equipped with a temperature control device employing a circulating water. The kneading was performed under conditions wherein the packing ratio was 65%, the revolution rate of two rotors were 66 rpm and 77 rpm, respectively, thereby obtaining a mixture. The temperature of the obtained mixture delivered from the kneader was 160° C. After cooling the mixture, the cooled mixture was further kneaded with sulfur and a vulcanization accelerator in an open roll at 70° C. The resultant mixture was molded and subjected to vulcanization press to vulcanize the mixture, thereby obtaining a crosslinked, filler-containing polymer composition.

The properties of the obtained crosslinked, filler-containing polymer compositions are shown in Table 5. As apparent from Table 5, silica can be dispersed uniformly in the crosslinked, filler-containing polymer composition comprising the modified polymer of the present invention and these compositions (produced in Examples 44 to 51) exhibit not only improved compression set and impact resilience, but also excellent adhesion, as compared to the compositions of Comparative Examples 5 and 6 each comprising an unmodified polymer.

Modified Polymer Composition

The properties of the modified polymer compositions (of the Examples) and the unmodified polymer compositions (of Comparative Examples) were evaluated by measuring the Izod impact strength in accordance with JIS K-7110.

EXAMPLES 51 TO 57 AND COMPARATIVE EXAMPLES 7 AND 8

Modified polymer compositions and unmodified polymer compositions were produced in accordance with the formulations indicated in Table 6. Specifically, predetermined amounts of thermoplastic resin (D) and modified polymer (A), and optionally second-order modifier (C) were dry-blended and the resultant blend product was melt-kneaded to obtain a polymer composition. A polyethylene terephthalate (trade name: Mitsui PET SA135; manufactured and sold by Mitsui Chemicals, Japan) or a polyamide (i.e., nylon 6) (trade name: Amilan CM1017; manufactured and sold by Toray Industries Inc., Japan) was used as the thermoplastic resin (D). The blend product was melt-kneaded and extruded by means of a 30 mm φ twin-screw extruder under conditions wherein the screw revolution rate was 250 rpm. In the melt-kneading, the cylinder temperature of the twin screw-extruder was changed as follows depending on the thermoplastic resin used: when the thermoplastic resin was a PET, the cylinder temperature was 250° C., and when the thermoplastic resin was a polyamide, the cylinder temperature was 260°

C. In this way, polymer compositions were obtained. The properties of the obtained compositions are shown in Table 6. As apparent from Table 6, the polymer composition comprising the modified polymer of the present invention exhibited excellent impact resistance as compared to each of the compositions of Comparative Examples 7 and 8 comprising an unmodified polymer.

Adhesive Composition

The method for measuring the various properties of the adhesive composition are as follows.

(1) Melt Viscosity

The melt viscosity of the adhesive composition was measured at 180° C. with a rotation speed of 100 rpm by means of a Brookfield viscometer equipped with a rotor (spindle No. 29).

(2) Softening Point (Ring-and-Ball Method)

The softening point of the adhesive composition was measured in accordance with JIS K 2207. Specifically, the ring of a ring-and-ball apparatus as defined in JIS K 2207 (which comprises a ring, and a ring-supporting member having a bottom plate placed several centimeters below the ring) was filled with a sample of the adhesive composition so as to have the sample adhesive composition securely held in the hole of the ring. The ring-and-ball apparatus was immersed in water, and the ring was maintained level in water. Then, a ball having a weight of 3.5 g was placed at the center of the ring filled with the sample. The temperature of the water was elevated at a rate of 5° C./min, so as to soften the sample gradually. The central portion of the softening sample was gradually sagged under the weight of the ball, and the temperature (softening point) at which the sagged central portion of the sample reached the bottom plate was measured.

(3) Melt Viscosity Change Ratio

The melt viscosity change ratio was measured by means of a Brookfield viscometer equipped with a rotor (spindle No. 29). The melt viscosity of the adhesive composition just after kneading at 180° C. with a rotation speed of 100 rpm was defined as $\eta_0$ and the melt viscosity of the adhesive composition which had been allowed to stand still at 180° C. for 48 hours was defined as $\eta_1$. The melt viscosity change ratio was calculated by the formula below and used as a yardstick for heat stability.

Melt viscosity change ratio (%)={$(\eta_1-\eta_0)/\eta_0$}×100.

(4) Adhesiveness

The adhesive composition in a molten state was coated on a polyester film by means of an applicator, thereby forming an adhesive tape sample having a 50 μm-thick adhesive composition layer. Using the adhesive tape sample, the adhesiveness of the adhesive composition was measured as follows.

The adhesive tape sample having a width of 25 mm was attached to a stainless-steel board and, then, peeled therefrom at a peeling rate of 300 mm/min to measure a peel strength (peel angle: 180°).

EXAMPLE 58

Polymer (2P-19) (100 parts by weight), a tackifier (E) (trade name: Clearon P-105; manufactured and sold by YASUHARA CHEMICAL CO., LTD., Japan) (300 parts by weight) and a softening agent (trade name: Diana process oil PW-90; manufactured and sold by Idemitsu Kosan Co., Ltd., Japan) (100 parts by weight) were melt-kneaded at 180° C. for 2 hours by means of a vessel which has a volume of 1 liter and is equipped with a stirrer, thereby obtaining a hot-melt type adhesive composition. To the adhesive composition was added, as a stabilizer, butyl-6-(3-t-butyl-2-hydroxy-5-methyl-benzyl)-4-methylphenylacrylate in an amount of 1 part by weight, relative to 100 parts by weight of polymer (2P-19).

With respect to the adhesive composition, the melt viscosity (cP at 180° C.) was 10,700 (cP), the softening point was 118° C., the melt viscosity change ratio (%) was 9.0% and the adhesion strength was 1,800 gf/10 mm.

Asphalt Composition

The properties of the asphalt composition were measured by the following methods.

(1) Softening Point (Ring-and-Ball Method)

The softening point of the asphalt composition was measured in accordance with JIS K 2207. Specifically, the ring of a ring-and-ball apparatus as defined in JIS K 2207 (which comprises a ring, and a ring-supporting member having a bottom plate placed several centimeters below the ring) was filled with a sample of the asphalt composition so as to have the sample asphalt composition securely held in the hole of the ring. The ring-and-ball apparatus was immersed in glycerol, and the ring was maintained level in glycerol. Then, a ball having a weight of 3.5 g was placed at the center of the ring filled with the sample. The temperature of the glycerol was elevated at a rate of 5° C./min, so as to soften the sample gradually. The central portion of the softening sample was gradually sagged under the weight of the ball, and the temperature (softening point) at which the sagged central portion of the sample reaches the bottom plate was measured.

(2) Elongation

The elongation of an asphalt composition was measured in accordance with JIS K 2207. Specifically, a sample of the asphalt composition was poured into a mold to shape the sample in a prescribed form. Then, the shaped sample was placed in a thermostatic vessel and the temperature of the sample was maintained at 15° C. The resultant sample was pulled at a rate of 5 cm/min, and the elongation of the sample when the sample was broken was measured.

(3) High Temperature Storage Stability

An aluminum can having an internal diameter of 50 mm and a height of 130 mm was fully filled with an asphalt composition just after the production thereof. The aluminum can containing the asphalt composition was placed in an oven and heated at 180° C. for 24 hours. The aluminum can was taken out from the oven and allowed to stand so that the asphalt composition in the aluminum can cooled to room temperature. As samples, upper and lower portions of the resultant solidified asphalt composition, which were a 4 cm-thick lower layer at a lower end portion and a 4 cm-thick upper layer at an upper end portion, were taken by cutting. The softening points of both samples were measured. The difference in softening point between the samples was used as a yardstick for high temperature storage stability of the asphalt composition. The smaller the difference, the better the high temperature storage stability of the asphalt composition.

EXAMPLE 59

An asphalt composition having a formulation indicated in Table 7 was produced. Specifically, 400 g of straight asphalt 60-80 (manufactured and sold by NIPPON OIL COMPANY, LIMITED, Japan) was charged into a metal can having a volume of 750 ml. The metal can containing the straight asphalt was put into an oil bath having a temperature of 180° C. so that the straight asphalt was satisfactorily heated, thereby melting the asphalt. Then, to the resultant molten asphalt was added a prescribed amount of the modified polymer (A) bit by bit while stirring. After completion of addition of the modified polymer (A), the resultant mixture was stirred at a revolution rate of 5,000 rpm for 90 minutes, thereby obtaining an asphalt composition. The properties of the asphalt composition are shown in Table 7.

Crosslinked, Modified Polymer Composition

The properties of the crosslinked, modified polymer compositions (of the Examples) and the crosslinked, unmodified polymer compositions (of Comparative Examples) were measured and evaluated by the following methods.

(1) Tensile Strength and Tensile Elongation

Tensile strength and tensile elongation were measured in accordance with JIS K6251 (in which a dumbbell No. 3 is used and the tensile stress rate (cross head speed) is 500 mm/min).

(2) Oil Resistance

The oil resistance of a test specimen (50 mm×50 mm, thickness: 2 mm) was measured using test oil No. 3 (a lubricant oil) prescribed in JIS K6301. The test specimen was immersed in the oil at 70° C. for 2 hours and the change (%) in the weight of the test specimen as between before and after immersion was determined.

EXAMPLES 60 AND 61 AND COMPARATIVE EXAMPLE 9

In accordance with the formulations indicated in Table 8, the following components of a polymer composition were mixed using a Henschel mixer, thereby obtaining a mixture.

Polypropylene resin: Sun Allomer PC600S (manufactured and sold by Montell SDK Sunrise Ltd., Japan);
Paraffin oil: Diana process oil PW380 (manufactured and sold by Idemitsu Kosan Co., Ltd., Japan);
Calcium carbonate: calcium carbonate treated with higher aliphatic ester;
Organic peroxide: PERHEXA 25B (manufactured and sold by NOF CORPORATION, Japan);
Silica: Finely dispersible silica HDK-N200 (manufactured and sold by WACKER ASAHIKASEI SILICONE CO., Ltd., Japan);
Vulcanization accelerator: Divinyl benzene; and
Antioxidant: Irganox 1010 (manufactured and sold by Ciba Speciality Chemicals, Switzerland).

Next, the resultant mixture was melt-kneaded and extruded by means of a 30 mm φ twin-screw extruder under conditions wherein the cylinder temperature was 200° C., thereby obtaining a composition prior to vulcanization (step 1). The obtained composition was then subjected to a dynamic crosslinking in the following manner. To the obtained composition was added a vulcanizing agent. The resultant mixture was melt-kneaded and extruded by means of a 30 mm φ twin-screw extruder at 220° C. to effect a vulcanization, thereby obtaining a crosslinked product (step 2). The properties of the crosslinked product are shown in Table 8.

As apparent from Table 8, the crosslinked, modified polymer compositions of the present invention comprising a modified polymer exhibits excellent properties, as compared to the unmodified polymer composition of Comparative Example 9 which comprises an unmodified polymer.

Styrene Resin Composition

The properties of the styrene resin compositions were measured and evaluated by the following methods.

(1) Notched Izod Impact Strength

The notched Izod impact strength was measured in accordance with K-7110.

(2) Gloss

The gloss of the styrene resin composition was evaluated in accordance with ASTM D-638, wherein the glossiness (angle of incidence: 60°) of the resin composition was measured at the gate portion and the end portion of a testing device, and the average of the measured values were used for evaluating gloss.

(3) Rubber Particle Diameter

The rubber particle diameter of the styrene resin composition is determined as follows. A sample of the styrene resin composition is dissolved in dimethylformamide (DMF) under sonication, thereby obtaining a dispersion containing rubbery components. The diameter of the rubbery components were measured by means of a Laser scattering particle size distribution analyzer (LA-920, manufactured and sold by HORIBA, Ltd., Japan) and the 50% median diameter was used as rubber particle diameter.

EXAMPLES 62 TO 65 AND COMPARATIVE EXAMPLES 10 AND 11

Styrene resin compositions were individually prepared in accordance with the formulations indicated in Table 9 by the following bulk polymerization method. To a reaction vessel equipped with a stirrer and a jacket was added 92 parts by weight of styrene and 8 parts by weight of a modified polymer, followed by addition of 0.3 part by weight of n-octadecyl-3-(3',5'di-tert-butyl-4'-hydroxyphenyl)propionate (as a stabilizer) and 0.05 part by weight of t-dodecyl mercaptan (as a chain transfer agent), and the resultant mixture was stirred to thereby obtain a solution. To the obtained solution was added 60 ppm, relative to styrene monomer contained in the solution, of 1,1-bis(tertbutylperoxy)-3,3,5-trimethylcyclohexane, followed by heating at 105° C. for 3 hours, 120° C. for 2 hours, 150° C. for 2 hours and 170° C. for 2 hours in this order to thereby effect a polymerization reaction. The resultant reaction mixture was further heated at 230° C. for 30 minutes to remove the unreacted monomers under reduced pressure, thereby obtaining a styrene resin composition. The obtained styrene resin composition was pulverized and subjected to extrusion molding, thereby obtaining the styrene resin composition in the form of pellets. The properties of the thus obtained styrene resin composition are shown in Table 9. The styrene resin composition of the present invention had excellent impact resistance.

EXAMPLE 66 AND COMPARATIVE EXAMPLE 12

Styrene resin compositions were produced in substantially the same manner as in Example 62 except that the amounts of styrene and acrylonitrile were changed to 67 parts by weight and 23 parts by weight, respectively. (The thus obtained styrene resin compositions are generally called "ABS resins".) The properties of the obtained styrene resin compositions are shown in Table 9. The ABS resin obtained in Example 66 had excellent impact resistance.

EXAMPLE 67

A styrene resin composition was produced in substantially the same manner as in Example 62 except that the amounts of styrene and methylmethacrylate were changed to 42 parts by weight and 48 parts by weight, respectively. (The thus obtained styrene resin composition is generally called an "MBS resin".) The properties of the obtained styrene resin composition is shown in Table 9. The MBS resin obtained in Example 67 had excellent impact resistance.

EXAMPLES 68 AND 69 AND COMPARATIVE EXAMPLE 13

In Examples 68 and 69 and Comparative Example 13, with respect to the modified polymers shown in Table 10, the peeling strength was measured as follows. The modified polymer was formed into a film having a thickness of about 100 μm. The polymer film was preheated on a substrate for 5 minutes at a predetermined temperature indicated in Table 10, and then pressed onto the substrate (load: 1 kg/cm$^2$) for 5 minutes so as to adhere the film onto the substrate (wherein an aluminum plate, a PET film and a canvas were individually used as a substrate). Then, the adhered polymer film was peeled off from the substrate at a peeling rate of 200 mm/min. The results of the measurement of the peeling strength are shown in Table 10.

TABLE 1

| Polymer no. | Living polymer produced Polymer structure* | Polymerization method | Amount of n-BuLi used (g/100 g of monomer) | Styrene content (wt %) | Styrene block ratio (wt %) | Vinyl bond content (%) |
|---|---|---|---|---|---|---|
| P-1 | C—Li | continuous | 0.165 | 18 | 0 | 31 |
| P-2 | C—Li | continuous | 0.084 | 18 | 0 | 31 |
| P-3 | C—Li | continuous | 0.166 | 35 | 0 | 33 |
| P-4 | C—Li | continuous | 0.085 | 35 | 0 | 33 |
| P-5 | C—S—Li | continuous | 0.11 | 45 | 40 | 15 |
| P-6 | C—S—Li | continuous | 0.11 | 67 | 30 | 16 |
| P-7 | B—Li | continuous | 0.097 | 0 | 0 | 30 |
| P-8 | B—Li | continuous | 0.05 | 0 | 0 | 13 |
| P-9 | C—Li | batch | 0.095 | 39 | 0 | 31 |
| P-10 | C—Li | batch | 0.052 | 39 | 0 | 31 |
| P-11 | C—S—Li | batch | 0.12 | 25 | 45 | 14 |
| P-12 | C—S—Li | batch | 0.11 | 47 | 28 | 32 |
| P-13 | C—S—Li | batch | 0.085 | 35 | 43 | 21 |
| P-14 | B—Li | batch | 0.095 | 0 | 0 | 18 |

*"S" represents a polymer block comprised mainly of styrene monomer units,
"B" represents a polymer block comprised mainly of butadiene monomer units,
"C" represents a copolymer block comprised mainly of styrene monomer units and butadiene monomer units, and
"Li" represents a lithium ion.

TABLE 2

| | Polymer No. | Polymer | First-order modifier* (mol/Li) | Hydrogenation catalyst | Hydrogenation ratio (%) | Ratio of modified polymer fractions (%) | Weight average molecular weight (×10$^4$) | Mw/Mn |
|---|---|---|---|---|---|---|---|---|
| Ex. 1 | 1P-1 | P-1 | M2(0.25) | I | 85 | 65 | 30.8 | 1.8 |
| Ex. 2 | 1P-2 | P-1 | M2(0.25) | I | 95 | 65 | 30.8 | 1.8 |
| Ex. 3 | 1P-3 | P-1 | M2(0.25) | I | 71 | 65 | 30.8 | 1.8 |
| Ex. 4 | 1P-4 | P-2 | M1(0.9) | I | 88 | 67 | 33.0 | 1.9 |
| Ex. 5 | 1P-5 | P-3 | M3(0.8) | II | 85 | 66 | 32.2 | 1.9 |
| Ex. 6 | 1P-6 | P-9 | M2(0.38) | II | 80 | 75 | 33.4 | 1.4 |
| Ex. 7 | 1P-7 | P-9 | M1(0.9) | II | 85 | 80 | 17.1 | 1.1 |
| Ex. 8 | 1P-8 | P-9 | M3(0.8) | II | 85 | 79 | 35.5 | 1.4 |
| Ex. 9 | 1P-9 | P-5 | M1(0.9) | II | 93 | 56 | 20.0 | 1.9 |
| Ex. 10 | 1p-10 | P-5 | M3(0.8) | II | 88 | 53 | 31.2 | 2.0 |
| Ref. Ex. 1 | 1P-11 | P-6 | M1(0.9) | II | 93 | 55 | 20.2 | 1.9 |
| Ex. 11 | 1P-12 | P-11 | M2(0.38) | II | 81 | 81 | 31.6 | 1.3 |
| Ex. 12 | 1P-13 | P-11 | M1(0.9) | I | 82 | 80 | 14.6 | 1.1 |
| Ex. 13 | 1P-14 | P-12 | M2(0.38) | I | 80 | 78 | 32.0 | 1.3 |
| Ex. 14 | 1P-15 | P-12 | M1(0.9) | I | 88 | 79 | 16.7 | 1.1 |
| Ex. 15 | 1P-16 | P-13 | M1(0.9) | I | 80 | 77 | 24.5 | 1.2 |
| Ex. 16 | 1P-17 | P-7 | M1(0.9) | I | 83 | 59 | 21.1 | 2.0 |
| Ex. 17 | 1P-18 | P-8 | M1(0.9) | I | 36 | 60 | 29.6 | 2.3 |
| Ex. 18 | 1P-19 | P-14 | M2(0.3) | I | 30 | 59 | 35.2 | 1.2 |
| Ref. Ex. 2 | 1P-20 | P-1 | M2(0.4) | — | — | 65 | 30.8 | 1.8 |
| Ref. Ex. 3 | 1P-21 | P-2 | M1(0.9) | — | — | 67 | 33.0 | 1.9 |
| Ref. Ex. 4 | 1P-22 | P-3 | M3(0.8) | — | — | 66 | 32.2 | 1.9 |

TABLE 2-continued

| | Polymer No. | Polymer | First-order modifier* (mol/Li) | Hydrogenation catalyst | Hydrogenation ratio (%) | Ratio of modified polymer fractions (%) | Weight average molecular weight (×10⁴) | Mw/Mn |
|---|---|---|---|---|---|---|---|---|
| Ref. Ex. 5 | 1P-23 | P-4 | M1(0.9) | — | — | 68 | 62.0 | 2.2 |
| Ref. Ex. 6 | 1P-24 | P-9 | M2(0.38) | — | — | 80 | 49.5 | 1.4 |
| Ref. Ex. 7 | 1P-25 | P-5 | M3(0.8) | — | — | 53 | 31.2 | 2.0 |
| Ref. Ex. 8 | 1P-26 | P-6 | M1(0.9) | — | — | 55 | 20.2 | 1.9 |
| Ref. Ex. 9 | 1P-27 | P-11 | M1(0.9) | — | — | 80 | 14.6 | 1.1 |
| Ref. Ex. 10 | 1P-28 | P-12 | M2(0.4) | — | — | 78 | 32.0 | 1.3 |
| Ref. Ex. 11 | 1P-29 | P-13 | M1(0.9) | — | — | 77 | 24.5 | 1.2 |
| Ref. Ex. 12 | 1P-30 | P-8 | M1(0.9) | — | — | 60 | 29.6 | 2.3 |
| Ref. Ex. 13 | 1P-31 | P-14 | M2(0.25) | — | — | 59 | 35.2 | 1.2 |
| Ref. Ex. 14 | 1P-32 | P-2 | M4(0.9) | — | — | 70 | 49.7 | 2.1 |
| Ex. 70 | 1P-33 | P-3 | M4(0.9) | I | 81 | 68 | 30.1 | 1.9 |
| Comp. Ex. 1 | NP-1 | P-2 | — | — | 85 | — | 33.0 | 1.9 |
| Comp. Ex. 2 | NP-2 | P-10 | — | — | — | — | 28.8 | 1.1 |
| Comp. Ex. 3 | NP-3 | P-10 | — | — | 88 | — | 14.6 | 1.1 |
| Comp. Ex. 4 | NP-4 | P-6 | — | — | — | — | 20.1 | 1.9 |

*M1: 1,3-dimethyl-2-imidazolidinone
M2: tetraglycidyl-1,3-bisaminomethylcyclohexane
M3: γ-glycidoxypropyltrimethoxysilane
M4: N-(1,3-dimethylbutylidene)-3-(triethoxysilyl)-1-propaneamine

TABLE 3

| | Polymer No. | First-order modified polymer | Second-order modifier (mol/Li)* Functional monomer | Second-order modifier (mol/Li)* Functional oligomer | Modification method |
|---|---|---|---|---|---|
| Ex. 19 | 2P-1 | 1P-1 | D1(1.5) | — | Melt-kneading method |
| Ex. 20 | 2P-2 | 1P-4 | D2(1.0) | — | Melt-kneading method |
| Ex. 21 | 2P-3 | 1P-4 | — | D3(1.5) | Melt-kneading method |
| Ex. 22 | 2P-4 | 1P-9 | D1(1.5) | — | Solution method |
| Ex. 23 | 2P-5 | 1P-11 | D1(1.5) | — | Melt-kneading method |
| Ex. 24 | 2P-6 | 1P-11 | — | D3(1.5) | Melt-kneading method |
| Ex. 25 | 2P-7 | 1P-13 | D2(1.0) | — | Melt-kneading method |
| Ex. 26 | 2P-8 | 1P-13 | — | D3(1.5) | Melt-kneading method |
| Ex. 27 | 2P-9 | 1P-14 | D1(1.5) | — | Melt-kneading method |
| Ex. 28 | 2P-10 | 1P-14 | — | D3(1.5) | Melt-kneading method |
| Ex. 29 | 2P-11 | 1P-17 | D1(1.5) | — | Melt-kneading method |
| Ex. 30 | 2P-12 | 1P-20 | D1(1.5) | — | Melt-kneading method |
| Ex. 31 | 2P-13 | 1P-21 | D1(1.5) | — | Melt-kneading method |
| Ex. 32 | 2P-14 | 1P-21 | D2(1.0) | — | Melt-kneading method |
| Ex. 33 | 2P-15 | 1P-22 | D1(1.5) | — | Melt-kneading method |
| Ex. 34 | 2P-16 | 1P-24 | D1(1.5) | — | Melt-kneading method |
| Ex. 35 | 2P-17 | 1P-23 | D1(1.5) | — | Solution method |
| Ex. 36 | 2P-18 | 1P-25 | — | D3(1.5) | Melt-kneading method |
| Ex. 37 | 2P-19 | 1P-26 | D1(1.5) | — | Melt-kneading method |
| Ex. 38 | 2P-20 | 1P-27 | D1(1.5) | — | Melt-kneading method |
| Ex. 39 | 2P-21 | 1P-27 | — | D3(1.5) | Melt-kneading method |
| Ex. 40 | 2P-22 | 1P-28 | D1(1.5) | — | Melt-kneading method |
| Ex. 41 | 2P-23 | 1P-29 | D1(1.5) | — | Melt-kneading method |
| Ex. 42 | 2P-24 | 1P-30 | D1(1.5) | — | Melt-kneading method |
| Ex. 43 | 2P-25 | 1P-31 | D1(1.5) | — | Melt-kneading method |
| Ex. 71 | 2P-26 | 1P-33 | D1(1.5) | — | Melt-kneading method |

*D1: maleic anhydride
D2: tetraglycidyl-1,3-bisaminomethylcyclohexane
D3: styrene/maleic anhydride copolymer (Mn 2000)

TABLE 4

| | Parts by weight |
|---|---|
| Polymer | 100 |
| Silica*¹ | 50 |
| Second-order modifier | Formulation shown in Table 5 |
| Oil*² | 20 |
| Silane coupling agent*³ | 4 |
| Zinc white | 5 |
| Stearic acid | 1 |

TABLE 4-continued

| | Parts by weight |
|---|---|
| Sulfur | 1.5 |
| Vulcanization accelerator TT*[4] | 1.5 |
| Vulcanization accelerator M*[5] | 0.5 |

*[1]ULTRASIL VN3 (tradename) (manufactured and sold by Degussa Japan, Japan)
*[2]PW-380 (tradename) (a parafin oil, manufactured and sold by Idemitsu Kosan, Co. Ltd.; or Shellflex 371N (tradename) (a naphthene oil, manufactured and sold by Shell Chemicals Japan, Japan)
*[3]Silane coupling agent Si69 (manufactured and sold by Degussa Japan, Japan) (chemical nomenclature: bis-[3-(triethoxysilyl)-propyl]-tetrasulfide
*[4]chemical nomenclature: tetramethylthiuram disulfide
*[5]chemical nomenclature: 2-mercaptobenzothiazole

TABLE 5

| | Type of polymer | Second-order modifier* | Formulation (mol/Li) | Bound rubber content (wt %) | Processability Viscosity of the raw material polymer (100° C.) | Tensile strength (MPa) | Impact resilience (%) | Compression set (° C.) | ΔG' | Al plate | stainless-steel plate |
|---|---|---|---|---|---|---|---|---|---|---|---|
| Ex. 44 | 1P-1 | — | — | 44 | 78 | 21.4 | 68 | 15 | 0.21 | 8 | 10 |
| Ex. 45 | 1P-3 | — | — | 50 | 70 | 19.5 | 68 | 13 | 0.19 | 11 | 19 |
| Ex. 46 | 1P-4 | — | — | 51 | 71 | 25.5 | 69 | 12 | 0.15 | 9 | 11 |
| Ex. 47 | 1P-13 | — | — | 18 | 88 | 20.0 | 68 | 19 | 0.92 | 8 | 10 |
| Ex. 48 | 2P-1 | — | — | 43 | 90 | 20.3 | 69 | 15 | 0.4 | 19 | 16 |
| Ex. 49 | 1P-24 | D1 | 1.0 | 37 | 130 | 19.5 | 62 | 13 | 2.1 | 16 | 19 |
| Ex. 50 | 2P-16 | — | — | 40 | 115 | 21.5 | 62 | 11 | 0.96 | 17 | 20 |
| Comp. Ex. 5 | NP-1 | — | — | 17 | 91 | 18.4 | 61 | 26 | 2.6 | 1 | 2 |
| Comp. Ex. 6 | NP-2 | — | — | 21 | 88 | 17.0 | 58 | 28 | 5.8 | 2 | 14 |

*D1: maleic anhydride

TABLE 6

| | Functional group-containing resin | Polymer | Functional monomer | Functional oligomer | Izod impact strength (J/m) |
|---|---|---|---|---|---|
| Ex. 51 | PET 80 | 2P-7 20 | — | — | 300 |
| Ex. 52 | PET 80 | 2P-8 20 | — | — | 350 |
| Ex. 53 | PET 80 | 2P-21 20 | — | — | 320 |
| Ex. 54 | PET 80 | 1P-12 20 | D2* | — | 330 |
| Ex. 55 | polyamide 80 | 2P-8 20 | — | — | 380 |
| Ex. 56 | polyamide 80 | 2P-21 20 | — | — | 390 |
| Ex. 57 | polyamide 80 | 1P-6 20 | — | D3** | 400 |
| Comp. Ex. 7 | PET 80 | NP-3 20 | — | — | 35 |
| Comp. Ex. 8 | polyamide 80 | NP-3 20 | — | — | 40 |

*D2: tetraglycidyl-1,3-bisaminomethylcyclohexane
**D3: styrene/maleic anhydride copolymer (Mn 1000)

TABLE 7

| | Polymer type | Formulation (parts by weight) | Formulation of asphalt (parts by weight) | Softening point (° C.) | Elongation (cm) | High temperature storage stability (Difference in softening point) (° C.) |
|---|---|---|---|---|---|---|
| Ex. 59 | 2P-19 | 8.5 | 100 | 86 | 35 | 3 |

TABLE 8

| | | | Ex. 60 | Ex. 61 | Comp. Ex. 9 |
|---|---|---|---|---|---|
| Formulation of crosslinking composition | Type of polymer | | 1P-1 | 1P-1 | NP-1 |
| | Polymer (parts by weight) | | 100 | 100 | 100 |
| | Silica (parts by weight) | | 0 | 20 | 20 |
| | Polypropylene (parts by weight) | | 40 | 40 | 40 |
| | Oil PW380 (parts by weight) | | 60 | 60 | 60 |
| | Organic peroxide (parts by weight) | | 0.5 | 0.5 | 0.5 |
| | Crosslinking agent (parts by weight) | | 2 | 2 | 2 |
| Properties | Tensile strength (MPa) | | 3.1 | 5.1 | 2.0 |
| | Tensile elongation (%) | | 280 | 240 | 230 |
| | Oil resistance (%) | | 195 | 92 | 175 |

TABLE 9

|  |  | Ex. 62 | Ex. 63 | Ex. 64 | Ex. 65 | Ex. 66 | Ex. 67 | Comp. Ex. 10 | Comp. Ex. 11 | Comp. Ex. 12 |
|---|---|---|---|---|---|---|---|---|---|---|
| Formulation of composition | Type of polymer | 1P-1 | 1P-1 | 2P-20 | 2P-24 | 1P-13 | 1P-16 | NP-1 | NP-1 | NP-3 |
|  | Polymer (parts by weight) | 10 | 10 | 10 | 10 | 10 | 10 | 10 | 10 | 10 |
|  | Silica (parts by weight) | — | 1 | 1 | — | — | — | — | 1 | — |
|  | Styrene (parts by weight) | 90 | 90 | 90 | 90 | 67 | 42 | 90 | 90 | 67 |
|  | Acrylonitrile (parts by weight) | — | — | — | — | 23 | — | — | — | 23 |
|  | Methylmethacrylate (parts by weight) | — | — | — | — | — | 48 | — | — | — |
| Properties | Rubber particle diameter (μm) | 1.38 | 1.35 | 0.99 | 1.24 | 0.87 | 0.91 | 0.89 | 1.02 | 0.86 |
|  | Izod impact strength (kgcm/cm) | 17.4 | 13.6 | 13.4 | 16.1 | 12.1 | 13.8 | 8.2 | 8.5 | 6.8 |
|  | Gloss (%) | 78 | 79 | 86 | 79 | 86 | 82 | 78 | 81 | 78 |

TABLE 10

|  |  | Adhesion | Peel strength (gf/cm) | | |
|---|---|---|---|---|---|
|  | Type of polymer | temperature (° C.) | Al plate (100 μm) | PET film (50 μm) | Canvas |
| Ex. 68 | 1P-9 | 180 | 91 | 68 | 1650 |
| Ex. 69 | 2P-19 | 180 | 210 | 220 | 1780 |
| Comp. Ex. 13 | NP-4 | 180 | 28 | 31 | 1250 |

INDUSTRIAL APPLICABILITY

The first-order modified, hydrogenated polymer and the second-order modified polymer of the present invention exhibit strong interaction with other various components, and by virtue of such property, the modified polymers of the present invention can be advantageously used for producing compositions, such as a filler-containing modified polymer composition, a modified polymer composition comprising a thermoplastic resin and/or a rubbery polymer, an adhesive composition, an asphalt composition and a styrene resin composition, which have excellent properties. In addition, various shaped articles obtained by subjecting the modified polymer (the first-order modified, hydrogenated polymer and the second-order modified polymer) and the composition (a polymer composition comprising the above-mentioned modified polymer and a polymer composition comprising a first-order modified polymer for use as a precursor of the second-order modified polymer) of the present invention to extrusion molding, injection molding or the like can be advantageously used in various fields, such as a material for food packages; a material for medical instruments; a raw material for home electric appliances and parts thereof, electronic devices and parts thereof, automobile parts, industrial parts, utensils and toys; a raw material for footwear; a raw material for an adhesive; and an asphalt modifier.

The invention claimed is:

1. A filler-containing modified polymer composition comprising:
   100 parts by weight of a first-order modified, hydrogenated polymer (A-1),
   0.5 to 300 parts by weight of a reinforcing filler (B), and
   0.01 to 20 parts by weight of a second-order modifier (C) having a functional group which is reactive to a functional group of a modifier group of said first-order modified, hydrogenated polymer (A-1), wherein said second-order modifier (C) is at least one member selected from the group consisting of a functional monomer and a functional oligomer,
wherein said first-order modified, hydrogenated polymer (A-1) comprises:
   (1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, said copolymer (1-B) having no or at least one polymer block (H) of said vinyl aromatic hydrocarbon monomer units, and
   (2) a functional group-containing first-order modifier group bonded to said hydrogenated polymer (1),
   said first-order modified, hydrogenated polymer (A-1) having the following characteristics (i) to (iv):
   (i) a content of said vinyl aromatic hydrocarbon monomer units of from 0 to 60 % by weight, based on the weight of said hydrogenated polymer,
   (ii) a vinyl aromatic hydrocarbon block ratio of from 0 to less than 50 % by weight, wherein said vinyl aromatic hydrocarbon block ratio is defined as the percent by weight of the vinyl aromatic hydrocarbon monomer units contained in said at least one polymer block (H) of said vinyl aromatic hydrocarbon monomer units, based on the total weight of vinyl aromatic hydrocarbon monomer units contained in said copolymer (1-B),
   (iii) a weight average molecular weight of from 20,000 to 2,000,000, and
   (iv) a hydrogenation ratio of more than 70 %, as measured with respect to the double bonds in said conjugated diene monomer units,
wherein said functional group containing first-order modifier group (2) comprises at least one functional group represented by a formula selected from the group consisting of the following formulae (a) to (m):

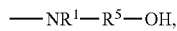 (a)

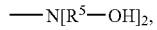 (b)

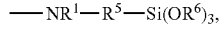 (c)

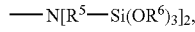 (d)

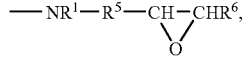 (e)

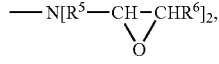 (f)

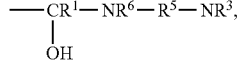 (g)

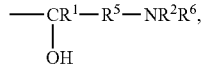 (h)

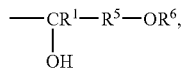 (i)

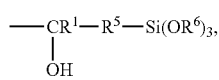 (j)

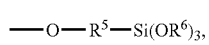 (k)

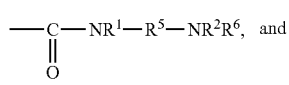 (l)

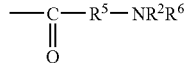 (m)

wherein, in the formulae (a) to (m):

N represents a nitrogen atom, Si represents a silicon atom, O represents an oxygen atom, C represents a carbon atom, and H represents a hydrogen atom, each of $R^1$ to $R^3$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group, each $R^6$ independently represents a hydrogen atom or a $C_1$-$C_8$ alkyl group, wherein each of $R^1$ to $R^5$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group.

2. The filler-containing modified polymer composition of claim 1, wherein said first-order modified, hydrogenated polymer (A-1) is represented by a formula selected from the group consisting of the following formulae (I) to (V):

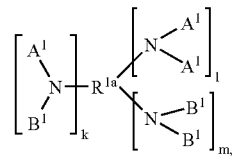 (I)

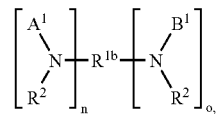 (II)

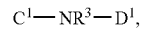 (III)

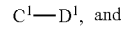 (IV)

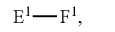 (V)

wherein:

$A^1$ represents a unit which is represented by any one of the following formulae (a-1) and (b-1):

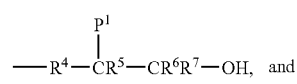 (a-1)

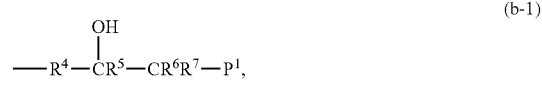 (b-1)

$B^1$ represents a unit which is represented by the following formula (c-1):

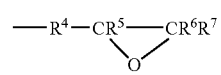 (c-1)

$C^1$ represents a unit which is represented by any one of the following formulae (d-1) and (e-1):

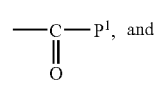 (d-1)

 (e-1)

$D^1$ represents a unit which is represented by the following formula (f-1):

 (f-1)

$E^1$ represents a unit which is represented by the following formula (g-1):

 (g-1)

$F^1$ represents a unit which is represented by any one of the following formulae (h-1) to (j-1):

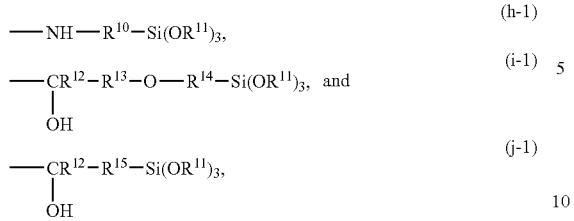

$$\text{---NH---R}^{10}\text{---Si(OR}^{11})_3, \quad (h\text{-}1)$$

$$\text{---}\underset{\underset{\text{OH}}{|}}{\text{C}}\text{R}^{12}\text{---R}^{13}\text{---O---R}^{14}\text{---Si(OR}^{11})_3, \text{ and} \quad (i\text{-}1)$$

$$\text{---}\underset{\underset{\text{OH}}{|}}{\text{C}}\text{R}^{12}\text{---R}^{15}\text{---Si(OR}^{11})_3, \quad (j\text{-}1)$$

wherein, in the formulae (I) to (III) and (a-1) to (j-1):

N represents a nitrogen atom, Si represents a silicon atom, O represents an oxygen atom, C represents a carbon atom, and H represents a hydrogen atom, $P^1$ represents said hydrogenated polymer (1), $R^{1a}$ represents a trivalent aliphatic $C_1$-$C_{48}$ hydrocarbon group, each of $R^{1b}$, $R^4$, $R^8$ to $R^{10}$ and $R^{13}$ to $R^{15}$ independently represents a $C_1$-$C_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$ and $R^{13}$ to $R^{15}$ optionally, independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{15}$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group, and each of k, l, m and o is independently an integer of 0 or more, provided that both k and l are not simultaneously 0, and n is an integer of 1 or more.

3. The filler-containing modified polymer composition according to claim 1, wherein said reinforcing filler (B) is at least one member selected from the group consisting of a silica inorganic filler, a metal oxide, a metal hydroxide and carbon.

4. A crosslinked, filler-containing modified polymer composition obtained by subjecting the filler-containing modified polymer composition of any one of claims 1, 2 and 3 to a crosslinking reaction in the presence of a vulcanizing agent.

5. A modified polymer composition comprising:

1 to 99 parts by weight, relative to 100 parts by weight of the total of components (A-1) and (D), of a first-order modified, hydrogenated polymer (A-1), and 99 to 1 parts by weight, relative to 100 parts by weight of the total of components (A-1) and (D), of (D), which is at least one polymer selected from the group consisting of a thermoplastic resin other than said first-order modified, hydrogenated polymer (A-1) and a rubbery polymer other than said first-order modified, hydrogenated polymer (A-1), and 0.01 to 20 parts by weight, relative to 100 parts by weight of the total of components (A-1) and (D), of a second-order modifier (C) having a functional group which is reactive to a functional group of a modifier group of said first-order modified, hydrogenated polymer (A-1), wherein said second-order modifier (C) is at least one member selected from the group consisting of a functional monomer and a functional oligomer, wherein said first-order modified, hydrogenated polymer (A-1) comprises:

(1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, said copolymer (1-B) having no or at least one polymer block (H) of said vinyl aromatic hydrocarbon monomer units, and (2) a functional group-containing first-order modifier group bonded to said hydrogenated polymer (1), said first-order modified, hydrogenated polymer (A-1) having the following characteristics (i) to (iv):

(i) a content of said vinyl aromatic hydrocarbon monomer units of from 0 to 60 % by weight, based on the weight of said hydrogenated polymer, (ii) a vinyl aromatic hydrocarbon block ratio of from 0 to less than 50 % by weight, wherein said vinyl aromatic hydrocarbon block ratio is defined as the percent by weight of the vinyl aromatic hydrocarbon monomer units contained in said at least one polymer block (H) of said vinyl aromatic hydrocarbon monomer units, based on the total weight of vinyl aromatic hydrocarbon monomer units contained in said copolymer (1-B), (iii) a weight average molecular weight of from 20,000 to 2,000,000, and (iv) a hydrogenation ratio of more than 70 %, as measured with respect to the double bonds in said conjugated diene monomer units, wherein said functional group containing first-order modifier group (2) comprises at least one functional group represented by a formula selected from the group consisting of the following formulae (a) to (m):

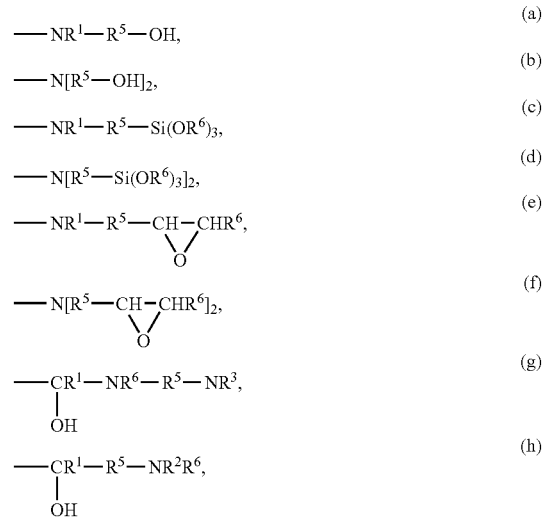

-continued

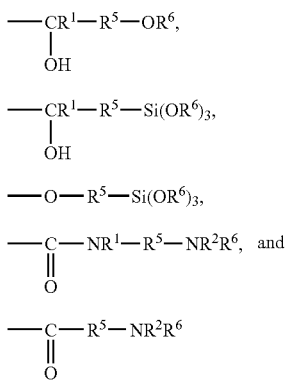

wherein, in the formulae (a) to (m):
N represents a nitrogen atom, Si represents a silicon atom, O represents an oxygen atom, C represents a carbon atom, and H represents a hydrogen atom,
each of $R^1$ to $R^3$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group,
each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group,
each $R^6$ independently represents a hydrogen atom or a $C_1$-$C_8$ alkyl group,
wherein each of $R^1$ to $R^5$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group.

6. The modified polymer composition according to claim 5, wherein said rubbery polymer in component (D) comprises at least one member selected from the group consisting of a conjugated diene polymer comprising conjugated diene monomer units, a random copolymer comprising conjugated diene monomer units and vinyl aromatic hydrocarbon monomer units, a block copolymer comprising conjugated diene monomer units and vinyl aromatic hydrocarbon monomer units, a non-diene polymer and a natural rubber,
said rubbery polymer being unhydrogenated or at least partially hydrogenated.

7. The modified polymer composition according to claim 5, wherein said thermoplastic resin in component (D) is a functional group-containing thermoplastic resin and said rubbery polymer in component (D) is a functional group-containing rubbery polymer, wherein each of said functional group-containing thermoplastic resin and rubbery polymer contains at least one functional group which is reactive to said functional group of said first-order modifier group of said first-order modified, hydrogenated polymer (A-1).

8. The modified polymer composition according to claim 7, wherein said functional group-containing thermoplastic resin is at least one member selected from the group consisting of a polyester resin, a polyamide resin, a polycarbonate resin, a polyurethane resin, a polyphenylene ether resin and a polyoxymethylene resin each of which contains at least one functional group selected from the group consisting of an acid anhydride group, a carboxyl group, a hydroxyl group, an epoxy group, an amino group, a silanol group and an alkoxysilane group.

9. An adhesive composition comprising:
100 parts by weight of a first-order modified, hydrogenated polymer (A-1), and 20 to 400 parts by weight of (E) a tackifier
wherein said first-order modified, hydrogenated polymer (A-1) comprises:
(1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, said copolymer (1-B) having no or at least one polymer block (H) of said vinyl aromatic hydrocarbon monomer units, and
(2) a functional group-containing first-order modifier group bonded to said hydrogenated polymer (1),
said first-order modified, hydrogenated polymer (A-1) having the following characteristics (i) to (iv):
(i) a content of said vinyl aromatic hydrocarbon monomer units of from 0 to 60 % by weight, based on the weight of said hydrogenated polymer,
(ii) a vinyl aromatic hydrocarbon block ratio of from 0 to less than 50 % by weight, wherein said vinyl aromatic hydrocarbon block ratio is defined as the percent by weight of the vinyl aromatic hydrocarbon monomer units contained in said at least one polymer block (H) of said vinyl aromatic hydrocarbon monomer units, based on the total weight of vinyl aromatic hydrocarbon monomer units contained in said copolymer (1-B),
(iii) a weight average molecular weight of from 20,000 to 2,000,000, and
(iv) a hydrogenation ratio of more than 70 %, as measured with respect to the double bonds in said conjugated diene monomer units,
wherein said functional group containing first-order modifier group (2) comprises at least one functional group represented by a formula selected from the group consisting of the following formulae (a) to (m):

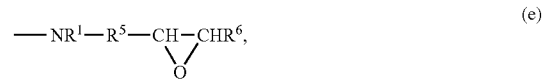
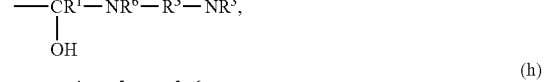

-continued $$\begin{align}
&-CR^1-R^5-OR^6, \quad &(i)\\
&\phantom{-C}|\\
&\phantom{-CR^1-}OH\\
&-CR^1-R^5-Si(OR^6)_3, \quad &(j)\\
&\phantom{-C}|\\
&\phantom{-CR^1-}OH\\
&-O-R^5-Si(OR^6)_3, \quad &(k)\\
&-C-NR^1-R^5-NR^2R^6, \text{ and} \quad &(l)\\
&\phantom{-}\|\\
&\phantom{-}O\\
&-C-R^5-NR^2R^6 \quad &(m)\\
&\phantom{-}\|\\
&\phantom{-}O
\end{align}$$

wherein, In the formulae (a) to (m):

N represents a nitrogen atom, Si represents a silicon atom, O represents an oxygen atom, C represents a carbon atom, and H represents a hydrogen atom, each of $R^1$ to $R^3$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group, each $R^6$ independently represents a hydrogen atom or a $C_1$-$C_8$ alkyl group, wherein each of $R^1$ to $R^5$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group.

10. The adhesive composition according to claim 9, which further comprises 0.01 to 20 parts by weight of a second-order modifier (C) having a functional group which is reactive to said functional group of said modifier group of said first-order modified, hydrogenated polymer (1), wherein said second-order modifier (C) is at least one member selected from the group consisting of a functional monomer and a functional oligomer.

11. An asphalt composition comprising:

0.5 to 50 parts by weight of a first-order modified, hydrogenated polymer (A-1), and 100 parts by weight of (F) an asphalt wherein said first-order modified, hydrogenated polymer (A-1) comprises:

(1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, said copolymer (1-B) having no or at least one polymer block (H) of said vinyl aromatic hydrocarbon monomer units, and (2) a functional group-containing first-order modifier group bonded to said hydrogenated polymer (1), said first-order modified, hydrogenated polymer (A-1) having the following characteristics (i) to (iv):

(i) a content of said vinyl aromatic hydrocarbon monomer units of from 0 to 60% by weight, based on the weight of said hydrogenated polymer, (ii) a vinyl aromatic hydrocarbon block ratio of from 0 to less than 50% by weight, wherein said vinyl aromatic hydrocarbon block ratio is defined as the percent by weight of the vinyl aromatic hydrocarbon monomer units contained in said at least one polymer block (H) of said vinyl aromatic hydrocarbon monomer units, based on the total weight of vinyl aromatic hydrocarbon monomer units contained in said copolymer (1-B), (iii) a weight average molecular weight of from 20,000 to 2,000,000, and (iv) a hydrogenation ratio of more than 70%, as measured with respect to the double bonds in said conjugated diene monomer units, wherein said functional group containing first-order modifier group (2) comprises at least one functional group represented by a formula selected from the group consisting of the following formulae (a) to (m):

$$\begin{align}
&-NR^1-R^5-OH, \quad &(a)\\
&-N[R^5-OH]_2, \quad &(b)\\
&-NR^1-R^5-Si(OR^6)_3, \quad &(c)\\
&-N[R^5-Si(OR^6)_3]_2, \quad &(d)\\
&-NR^1-R^5-CH-CHR^6, \quad &(e)\\
&\phantom{-NR^1-R^5-CH}\backslash\!/\\
&\phantom{-NR^1-R^5-CH-}O\\
&-N[R^5-CH-CHR^6]_2, \quad &(f)\\
&\phantom{-N[R^5-CH}\backslash\!/\\
&\phantom{-N[R^5-CH-}O\\
&-CR^1-NR^6-R^5-NR^3, \quad &(g)\\
&\phantom{-C}|\\
&\phantom{-CR^1-}OH\\
&-CR^1-R^5-NR^2R^6, \quad &(h)\\
&\phantom{-C}|\\
&\phantom{-CR^1-}OH\\
&-CR^1-R^5-OR^6, \quad &(i)\\
&\phantom{-C}|\\
&\phantom{-CR^1-}OH\\
&-CR^1-R^5-Si(OR^6)_3, \quad &(j)\\
&\phantom{-C}|\\
&\phantom{-CR^1-}OH\\
&-O-R^5-Si(OR^6)_3, \quad &(k)\\
&-C-NR^1-R^5-NR^2R^6, \text{ and} \quad &(l)\\
&\phantom{-}\|\\
&\phantom{-}O\\
&-C-R^5-NR^2R^6 \quad &(m)\\
&\phantom{-}\|\\
&\phantom{-}O
\end{align}$$

wherein, in the formulae (a) to (m):

N represents a nitrogen atom, Si represents a silicon atom, O represents an oxygen atom, C represents a carbon atom, and H represents a hydrogen atom, each of $R^1$ to $R^3$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group, each $R^6$ independently represents a hydrogen atom or a $C_1$-$C_8$ alkyl group, wherein each of $R^1$ to $R^5$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group.

12. The asphalt composition according to claim 11, which further comprises 0.01 to 20 parts by weight of a second-order modifier (C) having a functional group which is reactive to said functional group of said modifier group of said first-order modified, hydrogenated polymer (A-1), wherein said second-order modifier (C) is at least one member selected from the group consisting of a functional monomer and a functional oligomer.

13. A styrene resin composition obtained by subjecting a raw material mixture to radical polymerization, said raw material mixture comprising:

2 to 30 parts by weight, relative to 100 parts by weight of the total of components (A-1) and (G), of a first-order modified, hydrogenated polymer (A-1), and 98 to 70 parts by weight, relative to 100 parts by weight of the total of components (A-1) and (G), of (G), which is a vinyl aromatic hydrocarbon monomer or a mixture of a vinyl aromatic hydrocarbon monomer and a comonomer copolymerizable with said vinyl aromatic hydrocarbon monomer wherein said first-order modified, hydrogenated polymer (A-1) comprises:

(1) a hydrogenated polymer obtained by hydrogenating at least one unhydrogenated polymer selected from the group consisting of (1-A) a polymer comprising conjugated diene monomer units and (1-B) a copolymer comprising conjugated diene monomer units and vinyl aromatic hydrocarbon monomer units, said copolymer (1-B) having no or at least one polymer block (H) of said vinyl aromatic hydrocarbon monomer units, and (2) a functional group-containing first-order modifier group bonded to said hydrogenated polymer (1), said first-order modified, hydrogenated polymer (A-1) having the following characteristics (i) to (iv):

(i) a content of said vinyl aromatic hydrocarbon monomer units of from 0 to 60% by weight, based on the weight of said hydrogenated polymer, (ii) a vinyl aromatic hydrocarbon block ratio of from 0 to less than 50% by weight, wherein said vinyl aromatic hydrocarbon block ratio is defined as the percent by weight of the vinyl aromatic hydrocarbon monomer units contained in said at least one polymer block (H) of said vinyl aromatic hydrocarbon monomer units, based on the total weight of vinyl aromatic hydrocarbon monomer units contained in said copolymer (1-B), (iii) a weight average molecular weight of from 20,000 to 2,000,000, and (iv) a hydrogenation ratio of more than 70%, as measured with respect to the double bonds in said conjugated diene monomer units, wherein said functional group containing first-order modifier group (2) comprises at least one functional group represented by a formula selected from the group consisting of the following formulae (a) to (m):

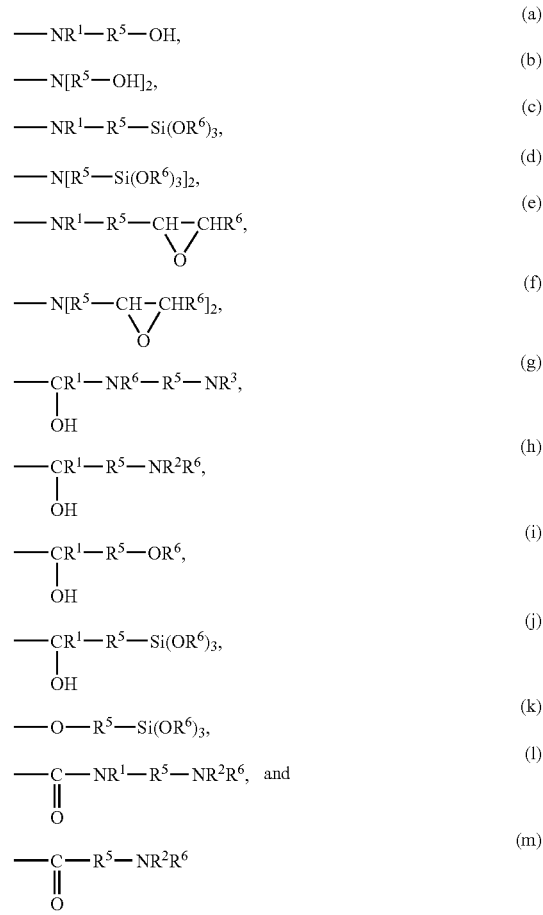

wherein, in the formulae (a) to (m):

N represents a nitrogen atom, Si represents a silicon atom, O represents an oxygen atom, C represents a carbon atom, and H represents a hydrogen atom, each of $R^1$ to $R^3$ independently represents a hydrogen atom or a $C_1$-$C_{24}$ hydrocarbon group which optionally has at least one functional group selected from the group consisting of a hydroxyl group, an epoxy group, an amino group, a silanol group and a $C_1$-$C_{24}$ alkoxysilane group, each $R^5$ independently represents a $C_1$-$C_{48}$ hydrocarbon group and optionally, independently has at least one functional group selected from the group consisting of a hydroxyl group, an epoxy group, an amino group, a silanol group and a $C_1$-$C_{24}$ alkoxysilane group, each $R^6$ independently represents a hydrogen atom or a $C_1$-$C_8$ alkyl group, wherein each of $R^1$ to $R^5$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group.

14. The styrene resin composition according to claim 13 wherein said raw material mixture further comprises 0.01 to 20 parts by weight, relative to 100 parts by weight of the total of components (A-1) and (G), of a second-order modifier (C) having a functional group which is reactive to said functional group of said modifier group of said first-order modified, hydrogenated polymer (A-1), wherein said second-order modifier (C) is at least one member selected from the group consisting of a functional monomer and a functional oligomer.

15. A method for producing the styrene resin composition of claim 13, comprising:

(1) providing a raw material mixture comprising said first-order modified, hydrogenated polymer (A-1), (G) a vinyl aromatic hydrocarbon monomer or a mixture of a vinyl aromatic hydrocarbon monomer and a comonomer copolymerizable with said vinyl aromatic hydrocarbon monomer, and optionally at least one member selected from the group consisting of a second-order modifier (C) having a functional group which is reactive to said functional group of said modifier group of said first-order modified, hydrogenated polymer (A-1), wherein said second-order modifier (C) is at least one member selected from the group consisting of a functional monomer and a functional oligomer, and a reinforcing filler (B), and (2) subjecting said raw material mixture to radical polymerization, thereby obtaining a styrene resin composition.

16. The modified polymer composition according to claim 5, wherein said first-order modified, hydrogenated polymer (A-1) is represented by a formula selected from the group consisting of the following formulae (I) to (V):

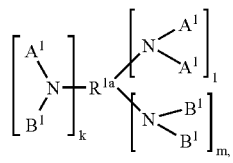  (I)

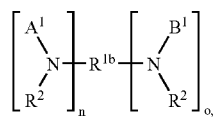  (II)

$C^1-NR^3-D^1$,  (III)

$C^1-D^1$, and  (IV)

$E^1-F^1$,  (V)

wherein:

$A^1$ represents a unit which is represented by any one of the following formulae (a-1) and (b-1):

$$-R^4-CR^5-CR^6R^7-OH,$$  (a-1)
with $P^1$ substituent

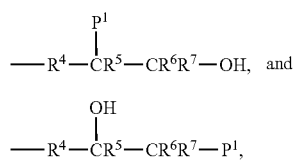  (b-1)

$B^1$ represents a unit which is represented by the following formula (c-1):

  (c-1)

$C^1$ represents a unit which is represented by any one of the following formulae (d-1) and (e-1):

  (d-1)

  (e-1)

$D^1$ represents a unit which is represented by the following formula (f-1):

$-R^8-NHR^3$  (f-1)

$E^1$ represents a unit which is represented by the following formula (g-1):

$-R^9-P^1$, and  (g-1)

$F^1$ represents a unit which is represented by any one of the following formulae (h-1) to (j-1):

$-NH-R^{10}-Si(OR^{11})_3$,  (h-1)

  (i-1)

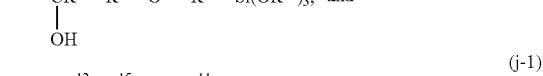  (j-1)

wherein, in the formulae (I) to (III) and (a-1) to (j-1):

N represents a nitrogen atom, Si represents a silicon atom, O represents an oxygen atom, C represents a carbon atom, and H represents a hydrogen atom, $P^1$ represents said hydrogenated polymer (1), $R^{1a}$ represents a trivalent aliphatic $C_1$-$C_{48}$ hydrocarbon group, each of $R^{1b}$, $R^4$, $R^8$ to $R^{10}$ and $R^{13}$ to $R^{15}$ independently represents a $C_1$-$C_{48}$ alkylene group, each of $R^2$, $R^3$ and $R^{11}$ independently represents a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^3$, $R^4$, $R^8$ to $R^{10}$ and $R^{13}$ to $R^{15}$ optionally, independently has at least one functional group selected from the group consisting of a hydroxyl group, an epoxy group, an amino group, a silanol group and a $C_1$-$C_{24}$ alkoxysilane group, each of $R^5$ to $R^7$ and $R^{12}$ independently represents a hydrogen atom, a $C_1$-$C_{48}$ alkyl group, a $C_6$-$C_{48}$ aryl group, an alkylaryl group comprised of $C_1$-$C_{48}$ alkyl and $C_6$-$C_{48}$ aryl, an aralkyl group comprised of $C_1$-$C_{48}$ alkyl and $C_6$-$C_{48}$ aryl, or a $C_3$-$C_{48}$ cycloalkyl group, wherein each of $R^{1a}$, $R^{1b}$, $R^2$ to $R^4$ and $R^8$ to $R^{15}$ optionally, independently has bonded thereto at least one atom selected from the group consisting of an oxygen atom, a nitrogen atom, a sulfur atom and a silicon atom, said at least one atom being present in a linkage other than a hydroxyl group, an epoxy group, an amino group, a silanol group and an alkoxysilane group, and each of k, l, m and o is independently an integer of 0 or more, provided that both k and l are not simultaneously 0, and n is an integer of 1 or more.

* * * * *

UNITED STATES PATENT AND TRADEMARK OFFICE
CERTIFICATE OF CORRECTION

PATENT NO. : 7,498,387 B2
APPLICATION NO. : 10/510571
DATED : March 3, 2009
INVENTOR(S) : Takaaki Matsuda et al.

It is certified that error appears in the above-identified patent and that said Letters Patent is hereby corrected as shown below:

Claim 1, Column 89, line 56, "$C_1$-$C_8$alkyl" should read --$C_1$-$C_8$ alkyl--.

Claim 2, Column 90, line 60, "–$R^8$–$NHR^3$" should read -- –$R^8$–$NHR^3$,--.

Claim 2, Column 90, line 67, "(h-1)to" should read --(h-1) to--.

Claim 2, Column 91, line 22, "$R^2$,$R^3$" should read --$R^2$, $R^3$--.

Claim 2, Column 91, line 23, "$C_6$-$C^{48}$" should read --$C_6$-$C_{48}$--.

Claim 9, Column 95, line 19, "In" should read --in--.

Claim 16, Column 100, line 26, "–$R^8$–$NHR^3$" should read -- –$R^8$–$NHR^3$,--.

Signed and Sealed this

Second Day of June, 2009

JOHN DOLL
*Acting Director of the United States Patent and Trademark Office*